US012578555B2

(12) United States Patent
Yeh et al.

(10) Patent No.: US 12,578,555 B2
(45) Date of Patent: Mar. 17, 2026

(54) PHOTOGRAPHING LENS ASSEMBLY, IMAGE CAPTURING UNIT AND ELECTRONIC DEVICE

(71) Applicant: LARGAN PRECISION CO., LTD., Taichung City (TW)

(72) Inventors: Kuan-Ting Yeh, Taichung City (TW); Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 350 days.

(21) Appl. No.: 18/208,723

(22) Filed: Jun. 12, 2023

(65) Prior Publication Data

US 2024/0385415 A1 Nov. 21, 2024

(30) Foreign Application Priority Data

May 5, 2023 (TW) ................................. 112116801

(51) Int. Cl.
*G02B 13/00* (2006.01)
*G02B 13/02* (2006.01)

(52) U.S. Cl.
CPC ......... *G02B 13/0045* (2013.01); *G02B 13/02* (2013.01); *G02B 13/009* (2013.01)

(58) Field of Classification Search
CPC .. G02B 15/142; G02B 13/0045; G02B 13/02; G02B 13/009; G02B 9/60
USPC .......................................................... 359/714
See application file for complete search history.

(56) References Cited

U.S. PATENT DOCUMENTS

| | | | |
|---|---|---|---|
| 2,600,208 A | 6/1952 | Cook | |
| 4,324,458 A | 4/1982 | Sato | |
| 11,061,213 B2 | 7/2021 | Yao et al. | |
| 2013/0208178 A1 | 8/2013 | Park | |
| 2019/0258028 A1* | 8/2019 | Huang | H04N 23/55 |
| 2020/0341238 A1 | 10/2020 | Kai | |
| 2022/0050274 A1* | 2/2022 | Tang | H04N 23/90 |

(Continued)

FOREIGN PATENT DOCUMENTS

| | | |
|---|---|---|
| CN | 110161659 A | 8/2019 |
| CN | 110989134 A | 4/2020 |

(Continued)

OTHER PUBLICATIONS

Extended European Search Report dated Apr. 9, 2024 as received in Application No. 23179298.7.

*Primary Examiner* — Stephone B Allen
*Assistant Examiner* — Boutsikaris Leonidas
(74) *Attorney, Agent, or Firm* — Maschoff Brennan

(57) ABSTRACT

A photographing lens assembly includes five lens elements which are, in order from an object side to an image side along an optical path, a first lens element, a second lens element, a third lens element, a fourth lens element and a fifth lens element. Each of the five lens elements has an object-side surface facing toward the object side and an image-side surface facing toward the image side. The first lens element has positive refractive power. The third lens element has negative refractive power, the object-side surface of the third lens element is convex in a paraxial region thereof, and the image-side surface of the third lens element is concave in a paraxial region thereof. At least one of the object-side surface and the image-side surface of at least one lens element of the photographing lens assembly is aspheric.

33 Claims, 57 Drawing Sheets

(56) References Cited

U.S. PATENT DOCUMENTS

| | | | |
|---|---|---|---|
| 2022/0113520 A1* | 4/2022 | Kim | G03B 17/17 |
| 2022/0121001 A1 | 4/2022 | Xu | |
| 2022/0171168 A1 | 6/2022 | Jung et al. | |
| 2022/0187578 A1* | 6/2022 | Yeh | G02B 9/60 |
| 2022/0276473 A1 | 9/2022 | Chen et al. | |
| 2022/0365313 A1 | 11/2022 | Chen | |
| 2024/0302629 A1* | 9/2024 | Seo | G02B 13/00 |

FOREIGN PATENT DOCUMENTS

| | | | |
|---|---|---|---|
| CN | 210514766 | U | 5/2020 |
| CN | 111712749 | A | 9/2020 |
| CN | 112505897 | A | 3/2021 |
| CN | 112532818 | A | 3/2021 |
| CN | 112612126 | A | 4/2021 |
| CN | 112799211 | A | 5/2021 |
| CN | 113568129 | A | 10/2021 |
| CN | 113759515 | A | 12/2021 |
| CN | 215340513 | U | 12/2021 |
| CN | 113946029 | A | 1/2022 |
| CN | 114167572 | A | 3/2022 |
| CN | 114296210 | A | 4/2022 |
| CN | 114527556 | A | 5/2022 |
| CN | 115480375 | A | 12/2022 |
| CN | 115561881 | A | 1/2023 |
| EP | 4 102 280 | A1 | 12/2022 |
| JP | S62-231919 | A | 10/1987 |
| JP | 2021-033180 | A | 3/2021 |
| TW | I748795 | B | 12/2021 |
| WO | 2021/119925 | A1 | 6/2021 |
| WO | 2021/185201 | A1 | 9/2021 |
| WO | 2021/203838 | A1 | 10/2021 |
| WO | 2022/035134 | A1 | 2/2022 |
| WO | 2022/126661 | A1 | 6/2022 |
| WO | 2022/151157 | A1 | 7/2022 |
| WO | 2022/231258 | A1 | 11/2022 |
| WO | 2022/265348 | A1 | 12/2022 |

* cited by examiner

PHOTOGRAPHING LENS ASSEMBLY, IMAGE CAPTURING UNIT AND ELECTRONIC DEVICE

RELATED APPLICATIONS

This application claims priority to Taiwan Application 112116801, filed on May 5, 2023, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

Specifically, in recent years, electronic devices such as electronic products have been required for lightness and thinness, so it is difficult for a conventional optical lens to simultaneously meet the requirements of high-specification and compactness, especially a small lens featuring a large aperture or a telephoto function. However, as the optical zoom requirement becomes stricter (e.g., increasing the optical zoom magnification, etc.), the conventional telephoto lens becomes unable to catch the technology requirements and thus have problems such as an overly long total length, an overly small aperture, insufficient quality and inability in compactness. Therefore, it needs to introduce different optical features to overcome the abovementioned problems for meeting the requirements.

SUMMARY

According to one aspect of the present disclosure, a photographing lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, the first lens element has positive refractive power. Preferably, the third lens element has negative refractive power. Preferably, the object-side surface of the third lens element is convex in a paraxial region thereof. Preferably, the image-side surface of the third lens element is concave in a paraxial region thereof. Preferably, at least one of the object-side surface and the image-side surface of at least one lens element of the photographing lens assembly is aspheric.

When an axial distance between the object-side surface of one lens element closest to the object side and the image-side surface of another lens element closest to the image side in the photographing lens assembly with an infinite object distance is TDL, an axial distance between the image-side surface of the another lens element closest to the image side and an image surface in the photographing lens assembly with the infinite object distance is BLL, an axial distance between the object-side surface of the first lens element and the image surface is TL, a maximum image height of the photographing lens assembly is ImgH, a central thickness of the third lens element is CT3, an axial distance between the third lens element and the fourth lens element is T34, an axial distance between the object-side surface of the first lens element and the image-side surface of the second lens element is Dr1r4, and an axial distance between the object-side surface of the third lens element and the image-side surface of the another lens element closest to the image side is Dr5rL, the following conditions are preferably satisfied:

$$0.15 < TDL/BLL < 0.70;$$
$$6.0 < TL/ImgH < 9.5;$$
$$0.25 < CT3/T34 < 2.0; \text{ and}$$
$$0.66 < Dr1r4/Dr5rL < 1.50.$$

According to another aspect of the present disclosure, a photographing lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, the first lens element has positive refractive power. Preferably, the third lens element has negative refractive power. Preferably, the object-side surface of the third lens element is convex in a paraxial region thereof. Preferably, the image-side surface of the third lens element is concave in a paraxial region thereof. Preferably, the object-side surface of the fourth lens element is concave in a paraxial region thereof. Preferably, the image-side surface of the fourth lens element is convex in a paraxial region thereof.

When an axial distance between the object-side surface of one lens element closest to the object side and the image-side surface of another lens element closest to the image side in the photographing lens assembly with an infinite object distance is TDL, an axial distance between the image-side surface of the another lens element closest to the image side and an image surface in the photographing lens assembly with the infinite object distance is BLL, an axial distance between the object-side surface of the first lens element and the image surface is TL, a maximum image height of the photographing lens assembly is ImgH, a focal length of the third lens element is f3, and a curvature radius of the object-side surface of the third lens element is R5, the following conditions are preferably satisfied:

$$0.15 < TDL/BLL < 0.70;$$

$$6.0 < TL/ImgH < 10.0; \text{ and}$$

$$-8.00 < f3/R5 < -1.50.$$

According to another aspect of the present disclosure, a photographing lens assembly includes two lens groups. The two lens groups are, in order from an object side to an image side along an optical path, a first lens group and a second lens group. The two lens groups include at least four lens elements. The first lens group includes at least one lens element, and the second lens group includes at least one lens element. Each of the at least four lens elements has an object-side surface facing toward the object side and an image-side surface facing toward the image side.

Preferably, the photographing lens assembly has a first state corresponding to an infinite object distance and a second state corresponding to a short object distance. Preferably, when an imaged object at infinity moves to be at a close distance, the photographing lens assembly performs a movement focus process to change the first state to the second state thereof. Preferably, the second lens group moves towards the image side with respect to the first lens group along a direction in parallel with an optical axis during the movement focus process in which the first state is changed to the second state. Preferably, all lens elements of each of the first lens group and the second lens group have no relative movement with respect to one another during the movement focus process. Preferably, a lens element closest to the object side in the second lens group has the image-side surface being concave in a paraxial region thereof. Preferably, the photographing lens assembly further includes a reflective element. Preferably, the reflective element is located between the imaged object and an image surface. Preferably, the reflective element has at least two reflective surfaces.

When an axial distance between the object-side surface of one lens element closest to the object side and the image-side surface of another lens element closest to the image side in the photographing lens assembly with the infinite object distance is TDL, and an axial distance between the image-side surface of the another lens element closest to the image side and the image surface in the photographing lens assembly with the infinite object distance is BLL, the following condition is preferably satisfied:

$$0.15 < TDL/BLL < 0.70.$$

According to another aspect of the present disclosure, an image capturing unit includes one of the aforementioned photographing lens assemblies and an image sensor, wherein the image sensor is disposed on the image surface of the photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing lens assembly includes two lens groups. The two lens groups are, in order from an object side to an image side along an optical path, a first lens group and a second lens group. The two lens groups include at least four lens elements, wherein the first lens group includes at least one lens element, and the second lens group includes at least one lens element. Therefore, it is favorable for obtaining a proper balance between the size of the photographing lens assembly, the object distance range, the movement focus, the image quality and the assembly difficulty. Moreover, the two lens groups can include five lens elements, and the five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side. In one aspect, the first lens group can include the first lens element and the second lens element, and the second lens group can include the third lens element and the fourth lens element. In another aspect, the first lens group can include the first lens element and the second lens element, and the second lens group can include the third lens element, the fourth lens element and the fifth lens element. When the total number of lens elements of the photographing lens assembly is four, the first lens element can also be considered as one lens element closest to the object side, and the fourth lens element can also be considered as another lens element closest to the image side. When the total number of lens elements of the photographing lens assembly is five, the first lens element can also be considered as one lens element closest to the object side, and the fifth lens element can also be considered as another lens element closest to the image side.

Figure 1:
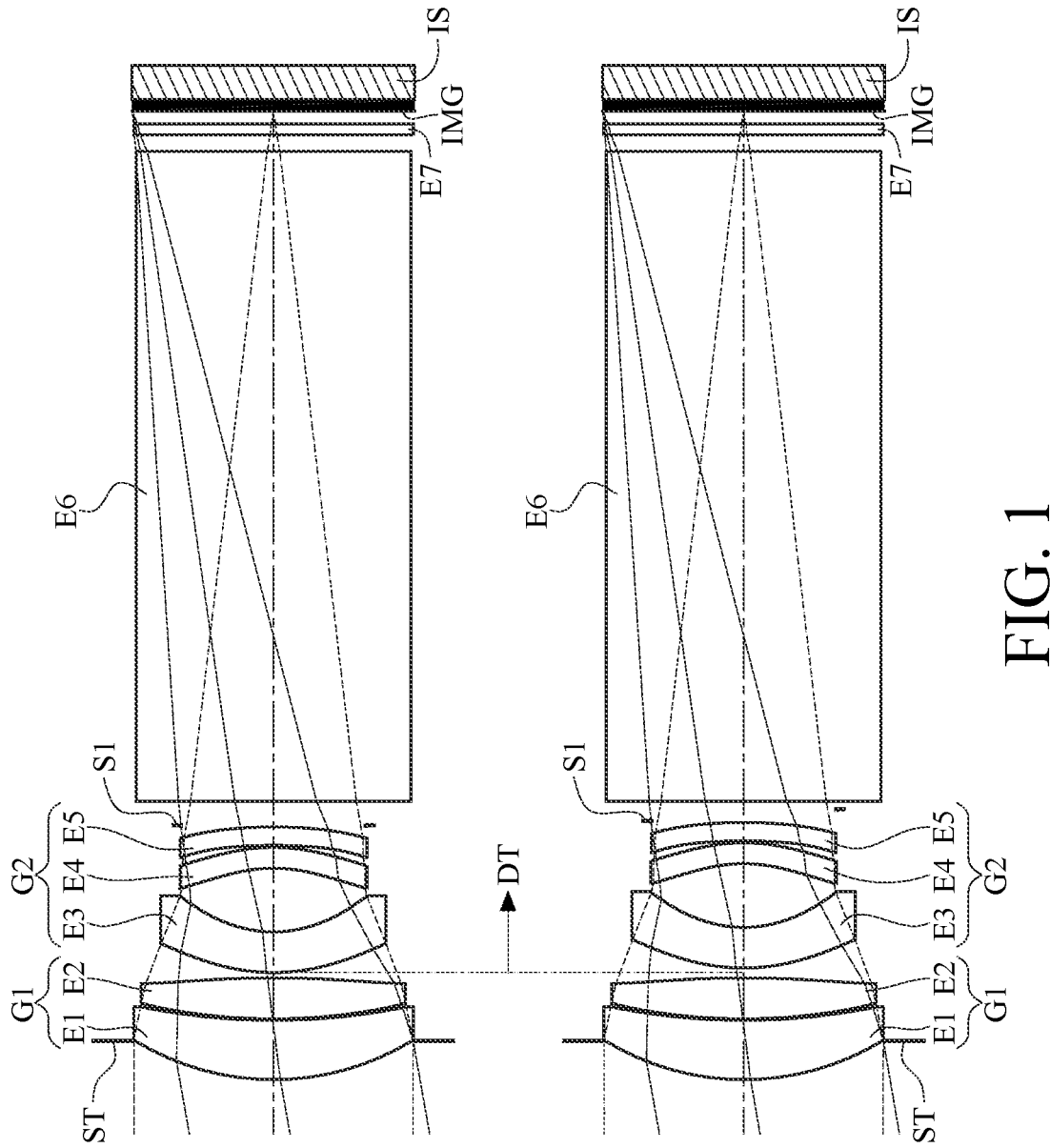
FIG. 1 is a schematic view of an image capturing unit respectively corresponding to an infinite object distance and a short object distance according to the 1st embodiment of the present disclosure.

The photographing lens assembly has a first state corresponding to an infinite object distance and a second state corresponding to a short object distance, wherein the first state refers to a state of the photographing lens assembly with an imaged object at infinity, and the second state refers to a state of the photographing lens assembly with an imaged object at a close distance. When an imaged object at infinity moves to be at the close distance, the photographing lens assembly can perform a movement focus process to change the first state to the second state thereof. Conversely, when an imaged object at the close distance moves to be at infinity, the photographing lens assembly can also perform the movement focus process to change the second state to the first state thereof. Please refer to FIG. 1, which is a schematic view of a photographing lens assembly of an image capturing unit respectively at the first state (corresponding to the infinite object distance) and the second state (corresponding to the short object distance) according to the 1st embodiment of the present disclosure. The upper part of FIG. 1 shows the photographing lens assembly at the first state, and the lower part of FIG. 1 shows the photographing lens assembly at the second state. Moreover, the second lens group can move towards the image side with respect to the first lens group along a direction in parallel with an optical axis during the movement focus process in which the first state is changed to the second state. Therefore, it is favorable for achieving macro photography and simplifying the optical design and mechanism. Moreover, all lens elements of each of the first lens group and the second lens group can have no relative movement with respect to one another during the movement focus process. Therefore, it is favorable for simplifying the mechanism. In the present disclosure, a/the short object distance or a/the close distance refers to a position of an imaged object, which is obviously closer to the photographing lens assembly than infinity. Moreover, a/the short object distance or a/the close distance refers to an axial distance between an imaged object and one lens element closest to the object side of the photographing lens assembly (e.g., the first lens element) which is equal to or less than 1 meter.

The first lens element can have positive refractive power. Therefore, it is favorable for reducing the size of the photographing lens assembly. The image-side surface of the first lens element can be concave in a paraxial region thereof. Therefore, it is favorable for adjusting the refractive power of the first lens element, which is favorable for correcting spherical aberration.

The second lens element can have positive refractive power. Therefore, it is favorable for satisfying the compactness requirement of the photographing lens assembly. The object-side surface of the second lens element can be convex in a paraxial region thereof. Therefore, it is favorable for enhancing the symmetry of the photographing lens assembly and improving image quality.

The third lens element can have negative refractive power. Therefore, it is favorable for balancing the optical path direction from the first lens group and correcting spherical aberration, which is favorable for maintaining a proper back focal length thereof. The object-side surface of the third lens element can be convex in a paraxial region thereof. Therefore, it is favorable for providing a proper convergence ability on the object-side surface of the third lens element so as to achieve the compactness requirement. The image-side surface of the third lens element can be concave in a paraxial region thereof. Therefore, it is favorable for assisting in balancing the back focal length of the photographing lens assembly while correcting off-axis aberrations. In one aspect, the third lens element can be a lens element closest to the object side in the second lens group.

The object-side surface of the fourth lens element can be concave in a paraxial region thereof. Therefore, it is favorable for balancing the light receiving ability of the photographing lens assembly at an object end thereof and correcting field curvature and distortion. The image-side surface of the fourth lens element can be convex in a paraxial region thereof. Therefore, it is favorable for controlling the light incident angle on the image surface so as to facilitate the configuration of a light-folding element.

The first lens element can be made of glass material. Therefore, the selection of the glass material is favorable for reducing the sensitivity of the lens element to environmental factors so as to be highly stable and applicable to various scenarios. At least one of the second lens element through the another lens element closest to the image side can be made of plastic material. Therefore, it is favorable for enhancing the plasticity of the lens element so as to reduce manufacturing cost.

According to the present disclosure, at least one of the object-side surface and the image-side surface of at least one lens element of the photographing lens assembly can be aspheric. Therefore, it is favorable for increasing the flexibility of optical design, which is favorable for correcting off-axis aberrations.

Figure 35:
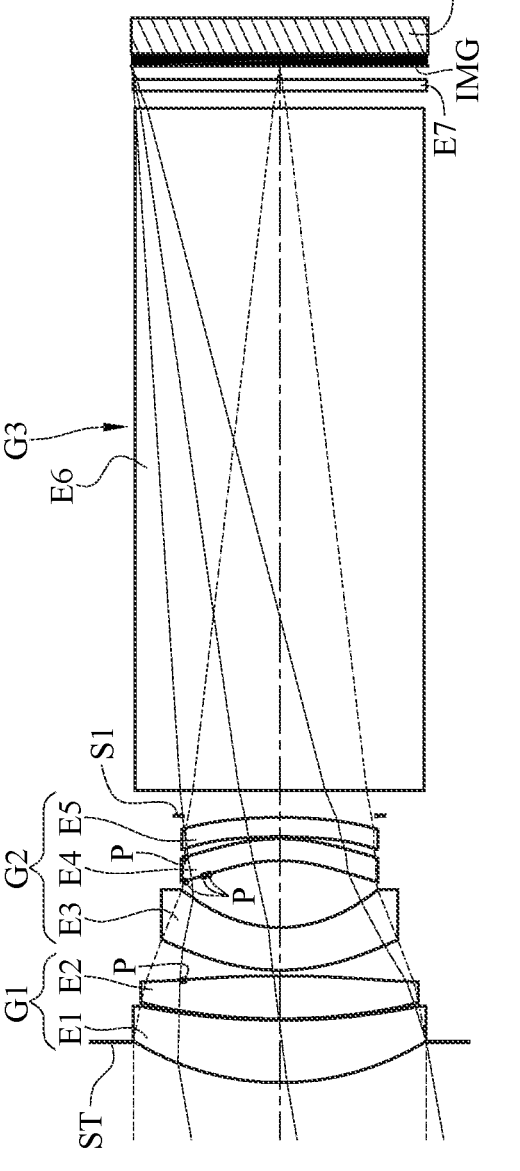
FIG. 35 shows a schematic view of several inflection points of several lens elements according to the 1st embodiment of the present disclosure.

According to the present disclosure, at least one of the object-side surface and the image-side surface of at least one lens element of the photographing lens assembly can have at least one inflection point. Therefore, it is favorable for increasing the design flexibility of the lens shape. Please refer to FIG. 35, which shows a schematic view of inflection points P of the image-side surface of the second lens element E2, the object-side surface of the fourth lens element E4 and the image-side surface of the fourth lens element E4 according to the 1st embodiment of the present disclosure. The inflection points of the image-side surface of the second lens element, the object-side surface of the fourth lens element and the image-side surface of the fourth lens element in FIG. 35 are only exemplary. Each of the object-side surfaces and the image-side surfaces of the lens elements in the 1st and other embodiments of the present disclosure can also have one or more inflection points.

Figure 37:
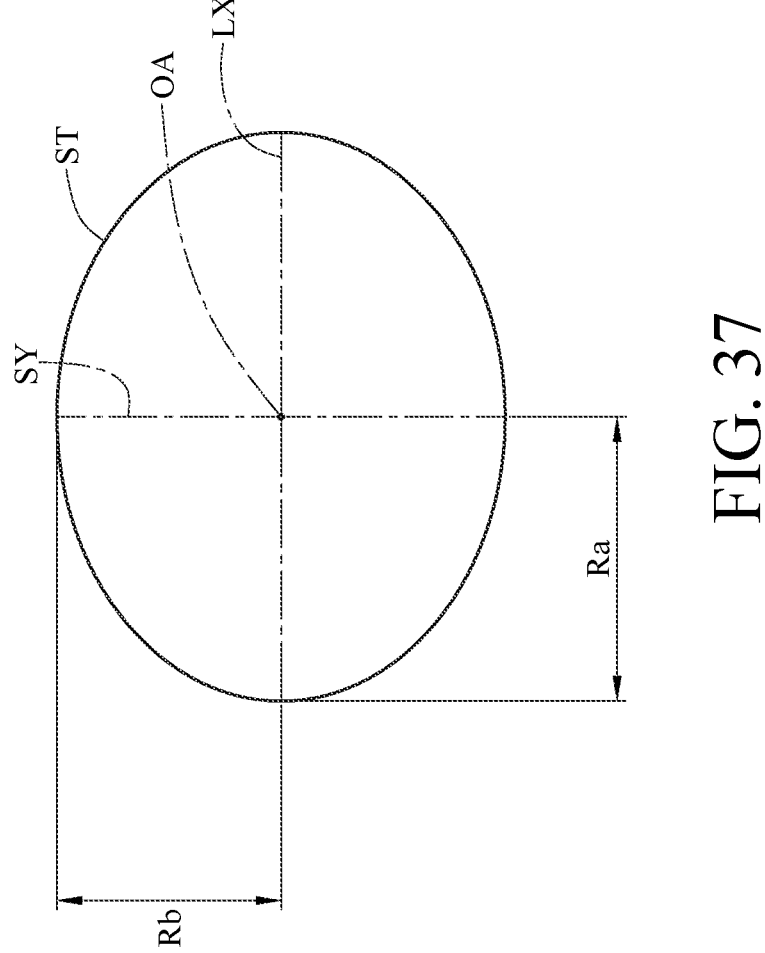
FIG. 37 shows a schematic view of a shape of an aperture stop according to one embodiment of the present disclosure.
Figure 38:
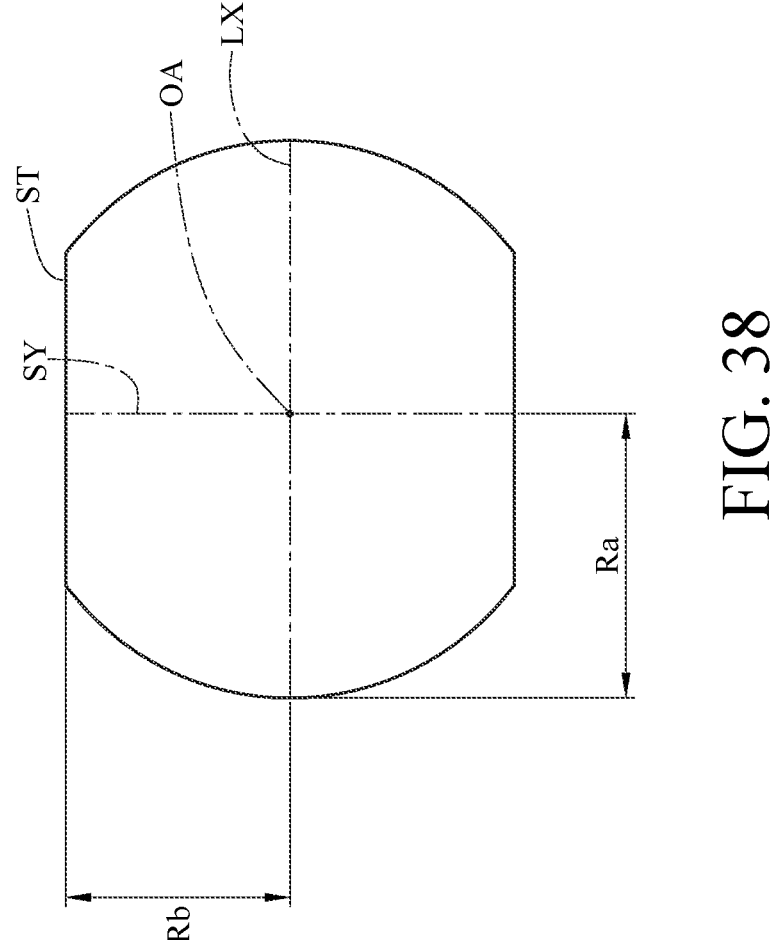
FIG. 38 shows a schematic view of another shape of an aperture stop according to one embodiment of the present disclosure.

According to the present disclosure, the photographing lens assembly can further include an aperture stop. The aperture stop can be located between the imaged object and the second lens element. Therefore, it is favorable for ensuring a relatively large entrance pupil of the photographing lens assembly for receiving a relatively large amount of light while controlling the field of view so as to achieve telephoto photography. Moreover, the aperture stop can have a major axis direction and a minor axis direction which are perpendicular to the optical axis and are different from each other, and an effective radius of the aperture stop in the major axis direction is different from an effective radius of the aperture stop in the minor axis direction. Therefore, it is favorable for adjusting the shape of the aperture stop so as to reduce stray light. For example, please refer to FIG. 37 and FIG. 38, which show schematic views of non-circular aperture stops according to the present disclosure, wherein FIG. 37 shows a schematic view of a shape of an aperture stop according to one embodiment of the present disclosure, and FIG. 38 shows a schematic view of another shape of an aperture stop according to one embodiment of the present disclosure. As shown in FIG. 37, in some configurations of the present disclosure, a shape of an aperture stop ST is elliptical, and the aperture stop ST has a major axis direction LX and a minor axis direction SY that are perpendicular to an optical axis OA. The major axis direction LX and the minor axis direction SY are two different directions, and an effective radius Ra of the aperture stop ST in the major axis direction LX is greater than an effective radius Rb of the aperture stop ST in the minor axis direction SY. As shown in FIG. 38, in some other configurations of the present disclosure, an aperture stop ST is shaped to have trimmed edges at an outer periphery thereof, and the aperture stop ST has a major axis direction LX and a minor axis direction SY that are perpendicular to an optical axis OA. The major axis direction LX and the minor axis direction SY are two different directions, and an effective radius Ra of the aperture stop ST in the major axis direction LX is greater than an effective radius Rb of the aperture stop ST in the minor axis direction SY.

According to the present disclosure, at least one reflective element with an optical path folding function can be optionally disposed between an imaged object and the image surface on the imaging optical path. The optical path can be deflected at least once through the reflective element, which is favorable for reducing the system size, such that the photographing lens assembly can have a deflected optical path and can be more flexible in space arrangement, and therefore the dimensions of an electronic device is not restricted by the total track length of the photographing lens assembly, thereby reducing mechanical limitation, miniaturizing the photographing lens assembly, and thus achieving various specification requirements.

Figure 39:
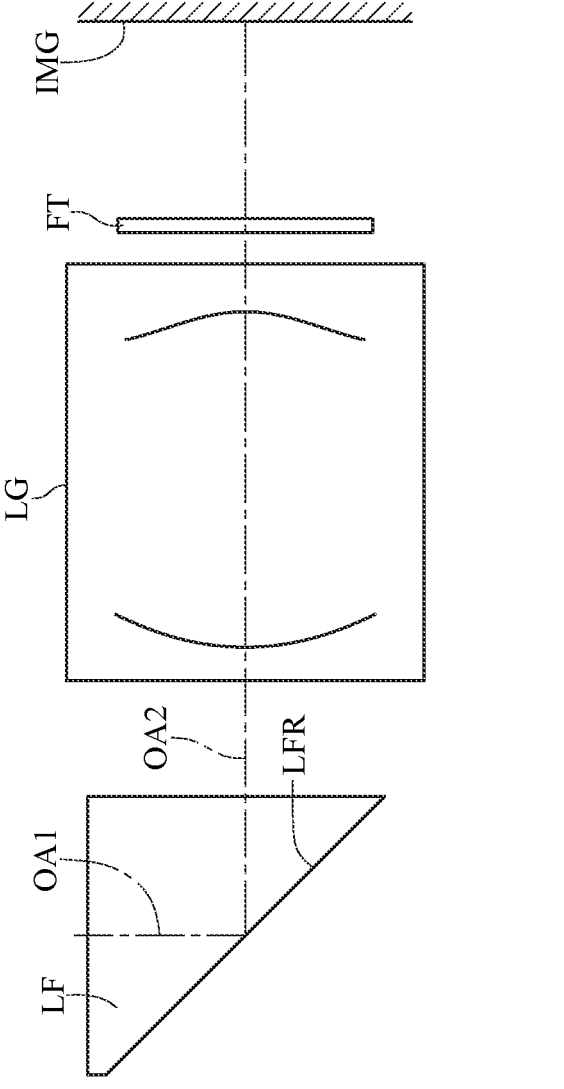
FIG. 39 shows a schematic view of a configuration of a reflective element in a photographing lens assembly according to one embodiment of the present disclosure.

Moreover, the reflective element can also be located at an object side of the object-side surface of the first lens element, that is, located between an imaged object and the first lens element. Moreover, the reflective element can also be located at an image side of the image-side surface of the another lens element closest to the image side, that is, located between the another lens element closest to the image side and the image surface. Moreover, the reflective element can be a prism or a mirror, but the present disclosure is not limited thereto. Please refer to FIG. 39, which shows a schematic view of a configuration of a reflective element in a photographing lens assembly according to one embodiment of the present disclosure. As shown in FIG. 39, in order from an imaged object (not shown in the figure) to an image surface IMG of the photographing lens assembly, an optical path can enter a reflective element LF along a first optical axis OA1, be deflected off at a reflective surface LFR of the reflective element LF, and then pass through a lens group LG and a filter FT along a second optical axis OA2. The reflective element LF is a prism disposed between the imaged object and the lens group LG of the photographing lens assembly. However, the present disclosure is not limited thereto. In some other embodiments, the reflective element can also be disposed between the lens group and the image surface of the photographing lens assembly.

Figure 40:
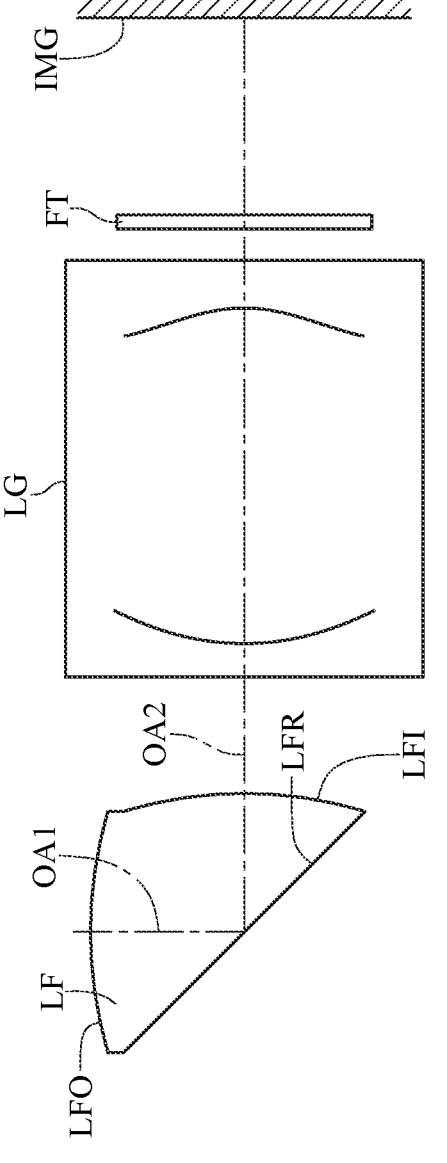
FIG. 40 shows a schematic view of another configuration of a reflective element in a photographing lens assembly according to one embodiment of the present disclosure.

Moreover, in the aspect that the reflective element is a prism, the reflective element can have an object-side surface or an image-side surface being convex in a paraxial region thereof. Therefore, it is favorable for providing additional refractive power for the photographing lens assembly so as to reduce the size of the photographing lens assembly and improve image quality while making the overall appearance to have a three-dimensional visual effect. Please refer to FIG. 40, which shows a schematic view of another configuration of a reflective element in a photographing lens assembly according to one embodiment of the present disclosure. As shown in FIG. 40, in order from an imaged object (not shown in the figure) to an image surface IMG of the photographing lens assembly, an optical path can enter a reflective element LF via an object-side surface LFO of the reflective element LF along a first optical axis OA1, be deflected off at a reflective surface LFR of the reflective element LF, and then pass through an image-side surface LFI of the reflective element LF, a lens group LG and a filter FT along a second optical axis OA2. The object-side surface LFO of the reflective element LF can be convex towards the imaged object in a paraxial region thereof, and the image-side surface LFI of the reflective element LF can be convex towards the lens group LG in a paraxial region thereof.

Figure 41:
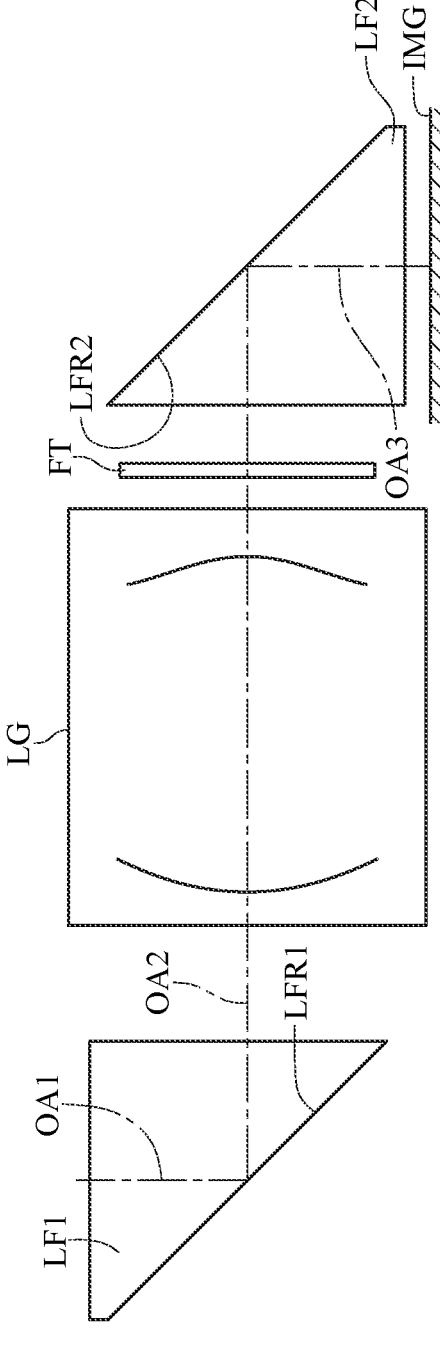
FIG. 41 shows a schematic view of a configuration of two reflective elements in a photographing lens assembly according to one embodiment of the present disclosure.

In addition, at least two reflective elements can also be optionally disposed between an imaged object and the image surface on the imaging optical path of the photographing lens assembly. Please refer to FIG. 41, which shows a schematic view of a configuration of two reflective elements in a photographing lens assembly according to one embodiment of the present disclosure. As shown in FIG. 41, in order from an imaged object (not shown in the figures) to an image surface IMG of the photographing lens assembly, an optical path can enter a first reflective element LF1 along a first optical axis OA1, be deflected off at a reflective surface LFR1 of the first reflective element LF1, pass through a lens group LG and a filter FT along a second optical axis OA2, enter a second reflective element LF2 to be deflected off at a reflective surface LFR2 of the second reflective element LF2, and then extend onto the image surface IMG along a third optical axis OA3. The first reflective element LF1 is disposed between the imaged object and the lens group LG of the photographing lens assembly, the second reflective element LF2 is disposed between the lens group LG and the image surface IMG of the photographing lens assembly, and the travelling direction of light on the first optical axis OA1 can be the same direction as the travelling direction of light on the third optical axis OA3 as shown in FIG. 41.

Figure 42:
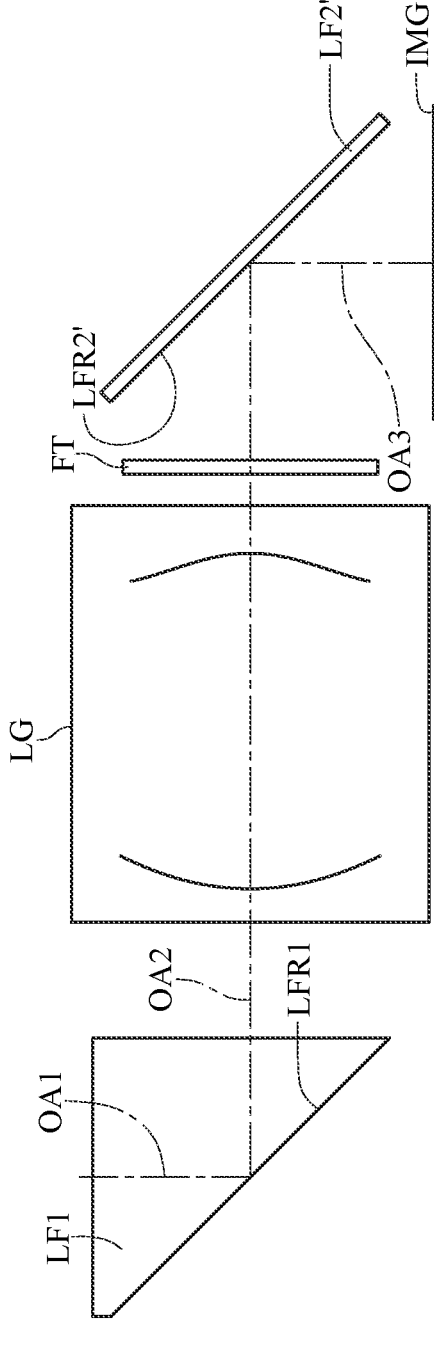
FIG. 42 shows a schematic view of another configuration of two reflective elements in a photographing lens assembly according to one embodiment of the present disclosure.

In addition, the at least two reflective elements optionally disposed between the imaged object and the image surface on the imaging optical path of the photographing lens assembly can be different types. Please refer to FIG. 42, which shows a schematic view of another configuration of two reflective elements in a photographing lens assembly according to one embodiment of the present disclosure. As shown in FIG. 42, a second reflective element LF2' of the photographing lens assembly is a mirror, which is different from the second reflective element LF2 as being a prism in the arrangement of FIG. 41. The optical path along a second optical axis OA2 can also be deflected off at a reflective surface LFR2' of the second reflective element LF2' and then extend onto the image surface IMG along a third optical axis OA3. The arrangement of FIG. 42 is similar to that of FIG. 41, and the description is not repeated herein. The photographing lens assembly can be optionally provided with three or more reflective elements, and the present disclosure is not limited to the type, amount and position of the reflective elements of the embodiments disclosed in the aforementioned figures.

Figure 43:
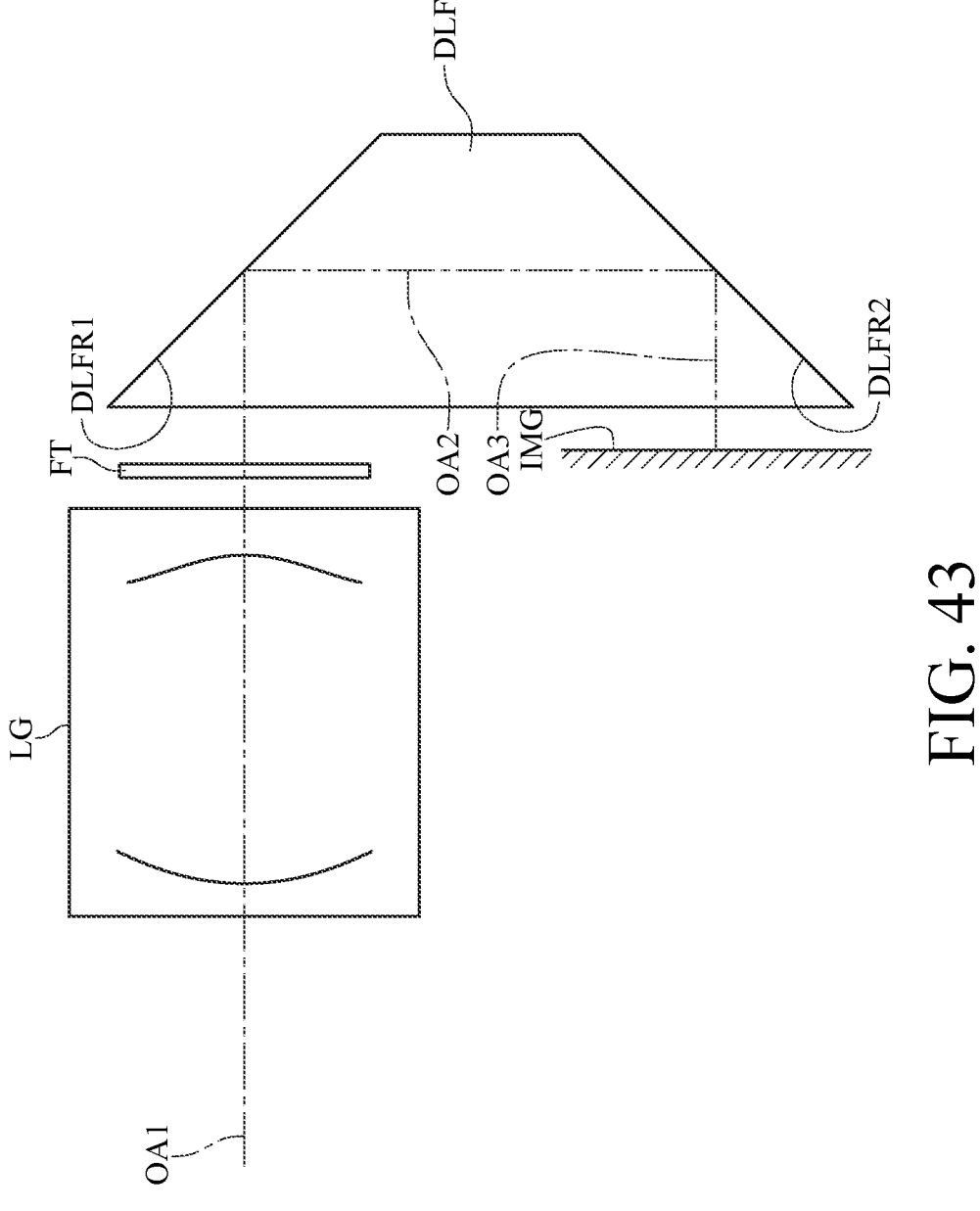
FIG. 43 shows a schematic view of a configuration of a double-reflective element in a photographing lens assembly according to one embodiment of the present disclosure.

In addition, one reflective element can have at least two reflective surfaces, at least three reflective surfaces or at least four reflective surfaces. It can also be considered as that the optical path can be deflected once, twice, three times, four times or even more times in one reflective element. Please refer to FIG. 43, which shows a schematic view of a configuration of a double-reflective element in a photographing lens assembly according to one embodiment of the present disclosure. As shown in FIG. 43, in order from an imaged object (not shown in the figure) to an image surface IMG of the photographing lens assembly, an optical path can pass through a lens group LG and a filter FT along a first optical axis OA1, enter a double-reflective element DLF to be deflected off at a first reflective surface DLFR1 of the double-reflective element DLF, extend along a second optical axis OA2 to be deflected off again at a second reflective surface DLFR2 of the double-reflective element DLF, and then extend onto the image surface IMG along a third optical axis OA3. The double-reflective element DLF is disposed between the filter FT and the image surface IMG of the photographing lens assembly, and the travelling direction of light on the first optical axis OA1 can be an opposite direction from the travelling direction of light on the third optical axis OA3 as shown in FIG. 43.

Figure 44:
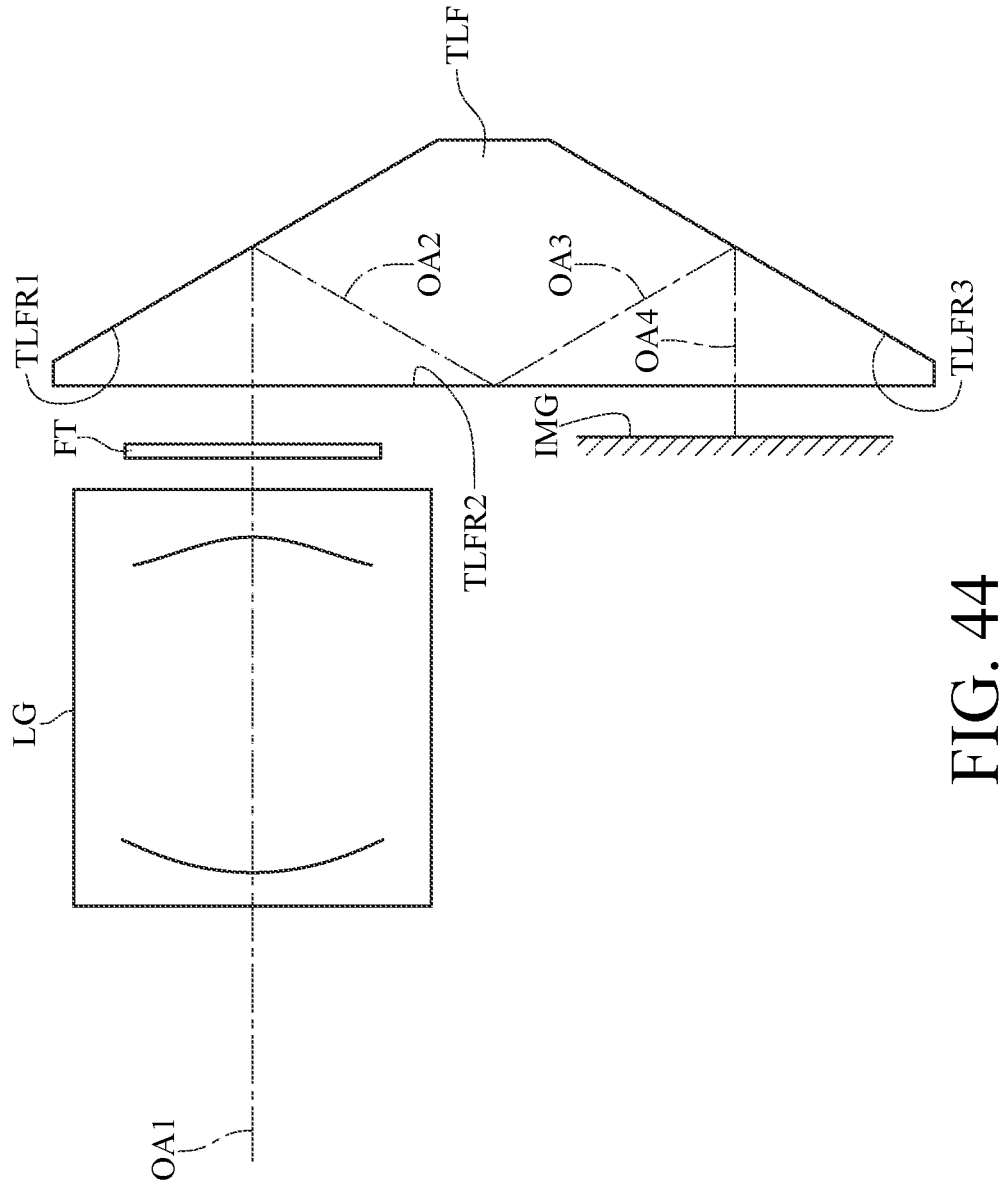
FIG. 44 shows a schematic view of a configuration of a triple-reflective element in a photographing lens assembly according to one embodiment of the present disclosure.

In addition, the angle between the normal direction of the reflective surface and the optical axis is not limited to 45 degrees. Other angles can be arranged according to actual requirements such as space arrangement. Please refer to FIG. 44, which shows a schematic view of a configuration of a triple-reflective element in a photographing lens assembly according to one embodiment of the present disclosure. As shown in FIG. 44, in order from an imaged object (not shown in the figure) to an image surface IMG of the photographing lens assembly, an optical path can pass through a lens group LG and a filter FT along a first optical axis OA1, enter a triple-reflective element TLF to be deflected off at a first reflective surface TLFR1 of the triple-reflective element TLF, extend along a second optical axis OA2 to be deflected off again at a second reflective surface TLFR2 of the triple-reflective element TLF, extend along a third optical axis OA3 to be deflected off further again at a third reflective surface TLFR3 of the triple-reflective element TLF, and then extend onto the image surface IMG along a fourth optical axis OA4. The triple-reflective element TLF is disposed between the filter FT and the image surface IMG of the photographing lens assembly, the travelling direction of light on the first optical axis OA1 can be an opposite direction from the travelling direction of light on the fourth optical axis OA4 as shown in FIG. 44, the angle between the second optical axis OA2 and the normal direction of the first reflective surface TLFR1 of the triple-reflective element TLF is less than 45 degrees, and the angle between the third optical axis OA3 and the normal direction of the third reflective surface TLFR3 of the triple-reflective element TLF is less than 45 degrees.

Figure 45:
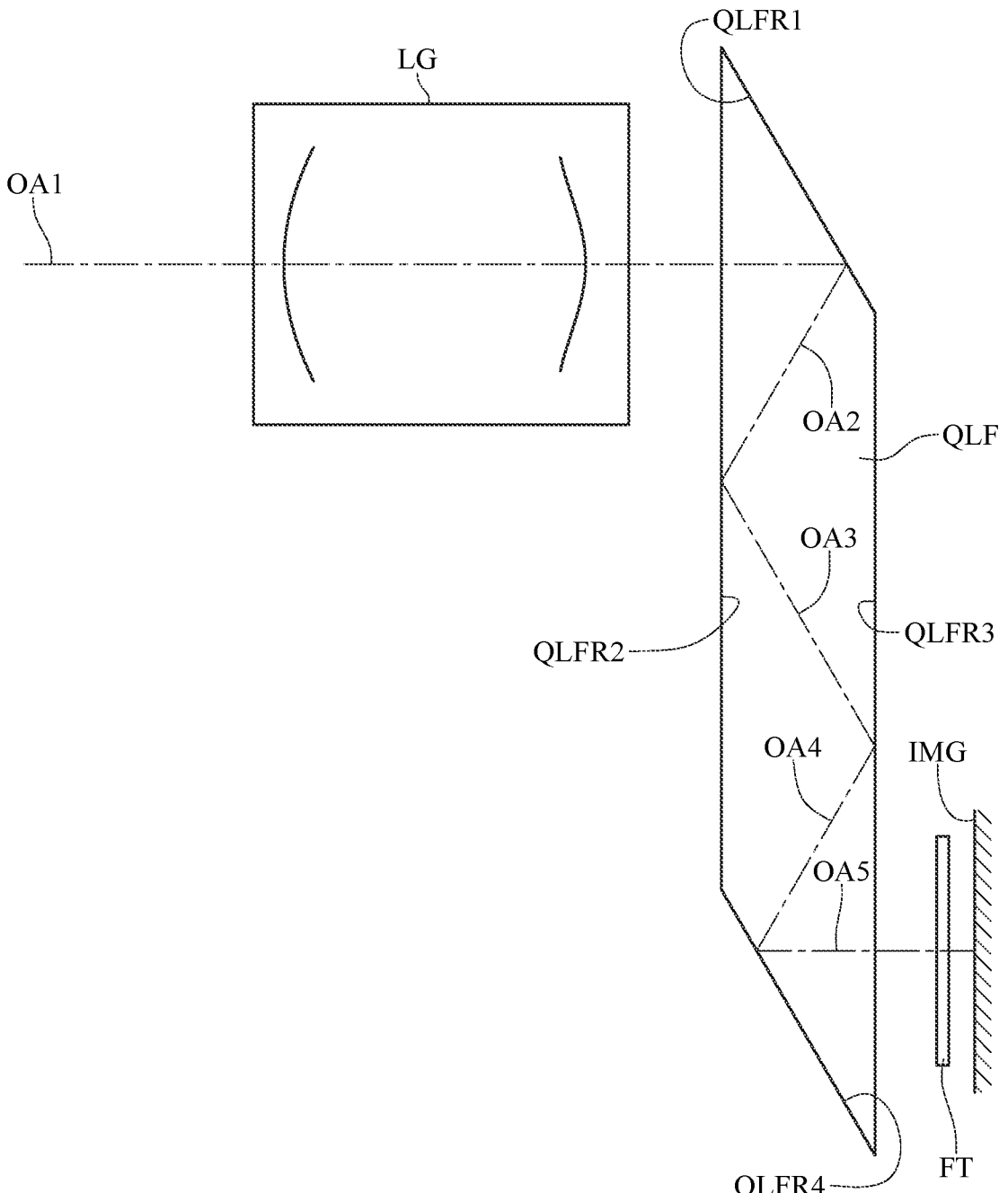
FIG. 45 shows a schematic view of a configuration of a quadruple-reflective element in a photographing lens assembly according to one embodiment of the present disclosure.

In addition, the reflective element can also be disposed between the lens group and the filter. Please refer to FIG. 45, which shows a schematic view of a configuration of a quadruple-reflective element in a photographing lens assembly according to one embodiment of the present disclosure. As shown in FIG. 45, in order from an imaged object (not shown in the figure) to an image surface IMG of the photographing lens assembly, an optical path can pass through a lens group LG along a first optical axis OA1, enter a quadruple-reflective element QLF to be deflected off at a first reflective surface QLFR1 of the quadruple-reflective element QLF, extend along a second optical axis OA2 to be deflected off again at a second reflective surface QLFR2 of the quadruple-reflective element QLF, extend along a third optical axis OA3 to be deflected off further again at a third reflective surface QLFR3 of the quadruple-reflective element QLF, extend along a fourth optical axis OA4 to be deflected off still further again at a fourth reflective surface QLFR4 of the quadruple-reflective element QLF, and then extend onto the image surface IMG via a filter FT along a fifth optical axis OA5. The quadruple-reflective element QLF is disposed between the lens group LG and the filter FT of the photographing lens assembly, and the travelling direction of light on the first optical axis OA1 can be an same direction from the travelling direction of light on the fifth optical axis OA5 as shown in FIG. 45.

Figure 46:
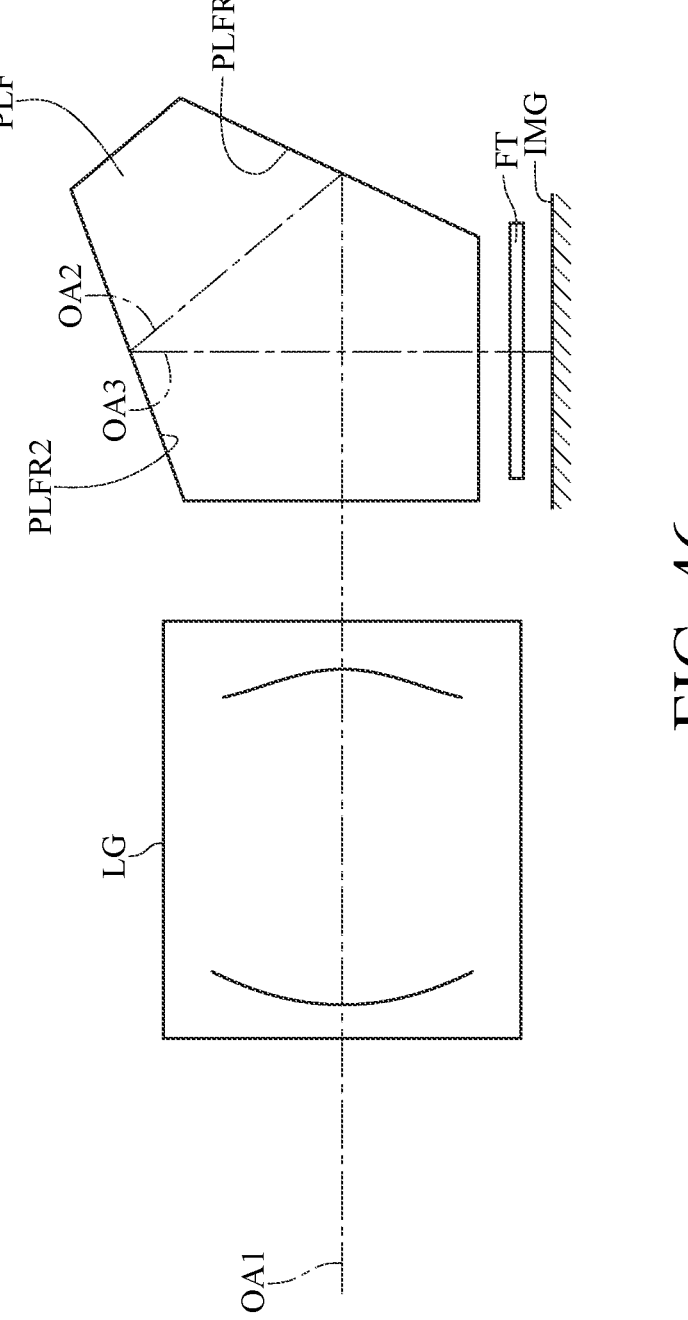
FIG. 46 shows a schematic view of further another configuration of a reflective element in a photographing lens assembly according to one embodiment of the present disclosure.

In addition, the optical path in the reflective element can have intersection. Please refer to FIG. 46, which shows a schematic view of further another configuration of a reflective element in a photographing lens assembly according to one embodiment of the present disclosure. As shown in FIG. 46, in order from an imaged object (not shown in the figure) to an image surface IMG of the photographing lens assembly, an optical path can pass through a lens group LG along a first optical axis OA1, enter a reflective element PLF as being a pentaprism to be deflected off at a first reflective surface PLFR1 of the reflective element PLF, extend along a second optical axis OA2 to be deflected off again at a second reflective surface PLFR2 of the reflective element PLF, extend along a third optical axis OA3 to intersect the first optical axis OA1, and then extend onto the image surface IMG via a filter FT. The reflective element PLF is disposed between the lens group LG and the image surface IMG of the photographing lens assembly, and the travelling direction of light on the first optical axis OA1 can be perpendicular to the travelling direction of light on the third optical axis OA3 as shown in FIG. 46.

Figure 47:
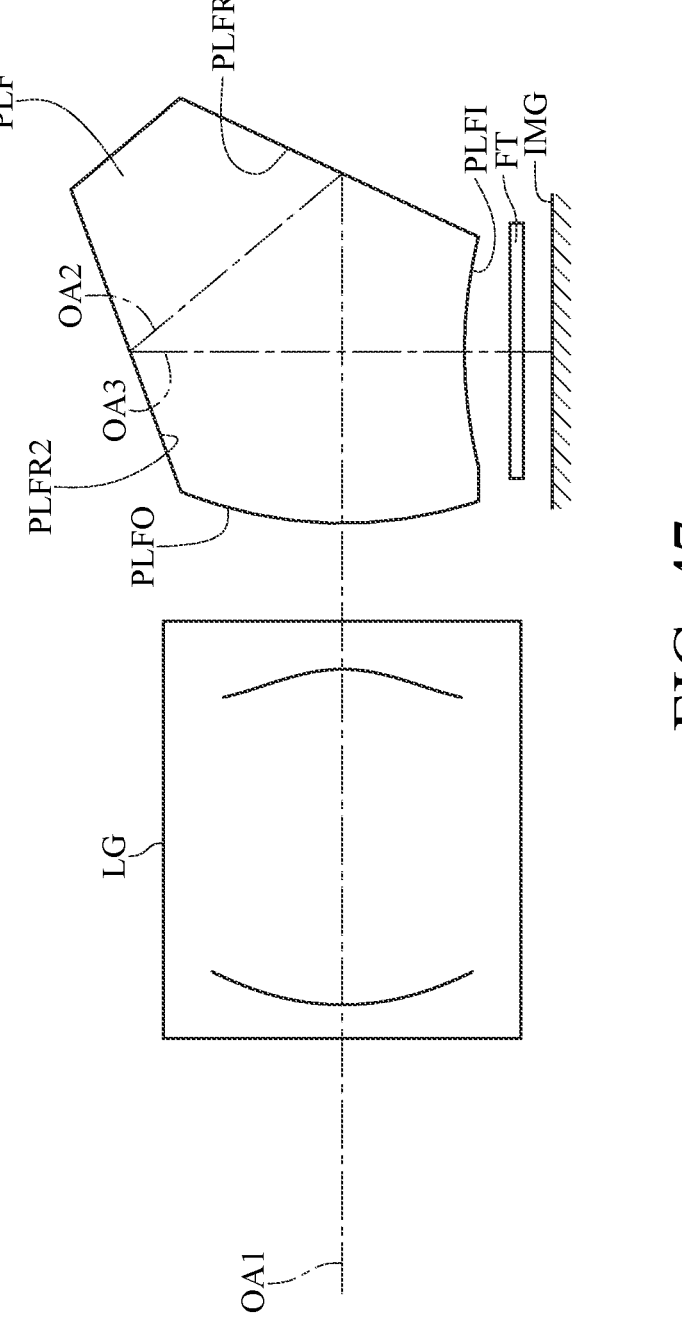
FIG. 47 shows a schematic view of still another configuration of a reflective element in a photographing lens assembly according to one embodiment of the present disclosure.

In addition, the surface of the reflective element can be planar surface, spherical surface, aspheric surface or free-form surface according to the optical design requirements, but the present disclosure is not limited thereto. Please refer to FIG. 47, which shows a schematic view of still further another configuration of a reflective element in a photographing lens assembly according to one embodiment of the present disclosure. As shown in FIG. 47, in order from an imaged object (not shown in the figure) to an image surface IMG of the photographing lens assembly, an optical path can pass through a lens group LG along a first optical axis OA1, enter a reflective element PLF as being a pentaprism to be deflected off at a first reflective surface PLFR1 of the reflective element PLF, extend along a second optical axis OA2 to be deflected off again at a second reflective surface PLFR2 of the reflective element PLF, extend along a third optical axis OA3 to intersect the first optical axis OA1, and then extend onto the image surface IMG via a filter FT. The object-side surface PLFO of the reflective element PLF can be convex towards the lens group LG in a paraxial region thereof, and the image-side surface PLFI of the reflective element PLF can be concave away from the image surface IMG in a paraxial region thereof.

In addition, in order to reduce the size of the photographing lens assembly, the length and the width of the lens element may be different from each other, and the length, the width and the height of the prism may be different from one another, as shown as the double-reflective element DLF, the triple-reflective element TLF, the quadruple-reflective element QLF and the reflective element PLF in FIG. 43 to FIG. 47. Moreover, an angle between a vector of the optical axis at the object side and that at the image side can be any angle, not limited to 0 degrees, 90 degrees or 180 degrees, as shown as the reflective element LF in FIG. 50 to FIG. 52 described later. Moreover, the reflective element can consist of more than one prism depending on the design requirements. Moreover, the prism can be made of glass material or plastic material depending on the design requirements.

When an axial distance between the object-side surface of the one lens element closest to the object side and the image-side surface of the another lens element closest to the image side in the photographing lens assembly with the infinite object distance is TDL, and an axial distance between the image-side surface of the another lens element closest to the image side and the image surface in the photographing lens assembly with the infinite object distance is BLL, the following condition is satisfied: $0.15<TDUBLL<0.70$. Therefore, it is favorable for properly adjusting the back focal length so as to fold the optical path. Moreover, the following condition can also be satisfied: $0.30<TDUBLL<0.60$.

When an axial distance between the object-side surface of the first lens element and the image surface is TL, and a maximum image height of the photographing lens assembly (which can be half of a diagonal length of an effective photosensitive area of an image sensor) is ImgH, the following condition can be satisfied: $6.0<TUImgH<10.0$. Therefore, it is favorable for balancing the optical total track length and image height of the photographing lens assembly, which is favorable for reducing the lens size and forming a telephoto structure. Moreover, the following condition can also be satisfied: $6.0<TUImgH<9.5$. Moreover, the following condition can also be satisfied: $6.2<TUImgH<8.0$.

When a central thickness of the third lens element is CT3, and an axial distance between the third lens element and the fourth lens element is T34, the following condition can be satisfied: $0.25<CT3/T34<2.0$. Therefore, it is favorable for providing sufficient space between the third lens element and the fourth lens element so as to achieve various application designs. Moreover, the following condition can also be satisfied: $0.30<CT3/T34<1.5$. Moreover, the following condition can also be satisfied: $0.40<CT3/T34<1.0$.

When an axial distance between the object-side surface of the first lens element and the image-side surface of the second lens element is Dr1r4, and an axial distance between the object-side surface of the third lens element and the image-side surface of the another lens element closest to the image side is Dr5rL, the following condition can be satisfied: $0.66<Dr1r4/Dr5rL<1.50$. Therefore, it is favorable for balancing the ratio of the central thicknesses of the first lens group and the second lens group so as to control the size of the photographing lens assembly. Moreover, the following condition can also be satisfied: $0.68<Dr1r4/Dr5rL<1.20$.

When a focal length of the third lens element is f3, and a curvature radius of the object-side surface of the third lens element is R5, the following condition can be satisfied: $-8.00<f3/R5<-1.50$. Therefore, it is favorable for coordinating the configuration between the lens shape and the refractive power of the third lens element, so that the photographing lens assembly can maintain a relatively small outer diameter and a proper back focal length when achieving the ability of correcting off-axis aberrations. Moreover, the following condition can also be satisfied: $-6.00<f3/R5<-1.7$. Moreover, the following condition can also be satisfied: $-4.00<f3/R5<-2.2$.

When a focal length of the first lens element is f1, and a focal length of the second lens element is f2, the following condition can be satisfied: $0.3<f1/f2<1.6$. Therefore, it is favorable for balancing the refractive powers of the first lens element and the second lens element, which is favorable for enhancing the symmetry of the photographing lens assembly and reducing the size of light spot at the central field of view. Moreover, the following condition can also be satisfied: $0.4<f1/f2<1.4$.

When the axial distance between the object-side surface of the first lens element and the image surface is TL, and a focal length of the photographing lens assembly with the infinite object distance is fL, the following condition can be satisfied: $1.15<TL/fL<1.5$. Therefore, it is favorable for adjusting to a relatively good field of view of the photographing lens assembly so as to be applicable to various field. Moreover, the following condition can also be satisfied: $1.18<TL/fL<1.4$.

When half of a maximum field of view of the photographing lens assembly with the infinite object distance is HFOVL, the following condition can be satisfied: $5.0$ [deg.] $<HFOVL<20.0$ [deg.]. Therefore, it is favorable for providing a proper field of view of the photographing lens assembly for telephoto application. Moreover, the following condition can also be satisfied: $8.0$ [deg.] $<HFOVL<15.0$ [deg.].

When the focal length of the first lens element is f1, the focal length of the third lens element is f3, a focal length of the fourth lens element is f4, and a focal length of the fifth lens element is f5, the following condition can be satisfied: $0<(|f1|+|f3|)/(|f4|+|f5|)<0.55$. Therefore, it is favorable for ensuring sufficiently strong refractive powers of the first lens element and the third lens element so as to achieve the compactness feature of the photographing lens assembly. Moreover, the following condition can also be satisfied: $0.1<(|f1|+|f3|)/(|f4|+|f5|)<0.50$.

When a curvature radius of the object-side surface of the first lens element is R1, and the curvature radius of the object-side surface of the third lens element is R5, the following condition can be satisfied: $-0.23<(R1-R5)/(R1+R5)<0.5$. Therefore, it is favorable for providing a relatively strong refraction ability on the object-side surface of the first lens element and the object-side surface of the third lens element so as to control the optical path. Moreover, the following condition can also be satisfied: $-0.10<(R1-R5)/(R1+R5)<0.3$. Moreover, the following condition can also be satisfied: $0<(R1-R5)/(R1+R5)<0.2$.

When the curvature radius of the object-side surface of the third lens element is R5, and a curvature radius of the image-side surface of the third lens element is R6, the following condition can be satisfied: 0.5<R5/R6<2.3. Therefore, it is favorable for adjusting the lens shape of the third lens element, which is favorable for adjusting the back focal length. Moreover, the following condition can also be satisfied: 1.0<R5/R6<2.0. Moreover, the following condition can also be satisfied:

$$1.3 < R5/R6 < 1.8.$$

When an Abbe number of the second lens element is V2, and an Abbe number of the fourth lens element is V4, the following condition can be satisfied: 1.3<V2/V4<4.0. Therefore, it is favorable for adjusting material distribution of lens elements so as to correct chromatic aberration. Moreover, the following condition can also be satisfied: 2.0<V2/V4<3.5.

When an axial distance between the aperture stop and the image surface is SL, and the axial distance between the object-side surface of the first lens element and the image surface is TL, the following condition can be satisfied: 0.88<SL/TL<1.05. Therefore, it is favorable for controlling the position of the aperture stop, which is favorable for obtaining a proper balance between the light incident amount and the lens size. Moreover, the following condition can also be satisfied: 0.90<SL/TL<0.98.

When a displacement in parallel with the optical axis from an axial vertex of the object-side surface of the third lens element to a maximum effective radius position of the object-side surface of the third lens element is Sag3R1, and a displacement in parallel with the optical axis from an axial vertex of the image-side surface of the third lens element to a maximum effective radius position of the image-side surface of the third lens element is Sag3R2, the following condition can be satisfied: 0.55<|Sag3R1/Sag3R2|<0.90. Therefore, it is favorable for providing an ability to control the light beam direction at the periphery of the third lens element, which is favorable for controlling the light incident angle on the image surface and preventing generating stray light after light passing through the light-folding element. Moreover, the following condition can also be satisfied: 0.60<|Sag3R1/Sag3R2|<0.85. Please be noted that the abovementioned displacement has a positive value if the displacement faces towards the image side, and has a negative value if the displacement faces towards the object side.

When a maximum effective radius of the object-side surface of the first lens element is Y1R1, and a maximum effective radius of the image-side surface of the another lens element closest to the image side is YNR2, the following condition can be satisfied: 1.0<Y1R1/YNR2<2.0. Therefore, it is favorable for controlling the size of light beam so as to prevent affecting compactness of the lens due to an overly large outer diameter of lens elements. Moreover, the following condition can also be satisfied: 1.2<Y1R1/YNR2<1.7.

When the maximum image height of the photographing lens assembly is ImgH, and the maximum effective radius of the object-side surface of the first lens element is Y1R1, the following condition can be satisfied: 0.7<ImgH/Y1R1<1.3. Therefore, it is favorable for reducing the light incident angle on the image surface so as to reduce the outer diameter of the photographing lens assembly. Moreover, the following condition can also be satisfied: 0.9<ImgH/Y1R1<1.15.

When the focal length of the second lens element is f2, and the focal length of the third lens element is f3, the following condition can be satisfied: −2.2<f2/f3<0. Therefore, it is favorable for coordinating the refractive power distribution so as to balance the back focal length of the photographing lens assembly. Moreover, the following condition can also be satisfied: −1.8<f2/f3<−0.5.

When the focal length of the photographing lens assembly with the infinite object distance is fL, and a composite focal length of the fourth lens element and the fifth lens element is f45, the following condition can be satisfied: 0.14<fL/|f45|<0.52. Therefore, it is favorable for adjusting the refractive power configuration of the fourth lens element and the fifth lens element, which is favorable for correcting aberrations. Moreover, the following condition can also be satisfied: 0.15<fL/|f45|<0.48.

When the curvature radius of the object-side surface of the third lens element is R5, and a curvature radius of the object-side surface of the fifth lens element is R9, the following condition can be satisfied: −10.0<(R5−R9)/(R5+R9)<−0.50. Therefore, it is favorable for effectively balancing the lens shapes of the third lens element and the fifth lens element, so that a relatively strong ability to control the optical path can be provided by the third lens element and can be balanced by the fifth lens element. Moreover, the following condition can also be satisfied: −5.0<(R5-R9)/(R5+R9)<−0.60.

When a central thickness of the first lens element is CT1, a central thickness of the fourth lens element is CT4, and a central thickness of the fifth lens element is CT5, the following condition can be satisfied: 1.0<CT1/(CT4+CT5)<2.5. Therefore, it is favorable for balancing the ratio of the central thicknesses of the object end and the image end thereof so as to facilitate lens assembly and increase yield rate. Moreover, the following condition can also be satisfied: 1.2<CT1/(CT4+CT5)<2.2. When an Abbe number of the first lens element is V1, and the Abbe number of the second lens element is V2, the following condition can be satisfied: 0.5<V1/V2<2.0. Therefore, it is favorable for effectively correcting convergence positions at different wavelengths so as to prevent overlapped images. Moreover, the following condition can also be satisfied: 0.7<V1/V2<1.5. Moreover, the following condition can also be satisfied: 0.9<V1/V2<1.2.

Figure 36:
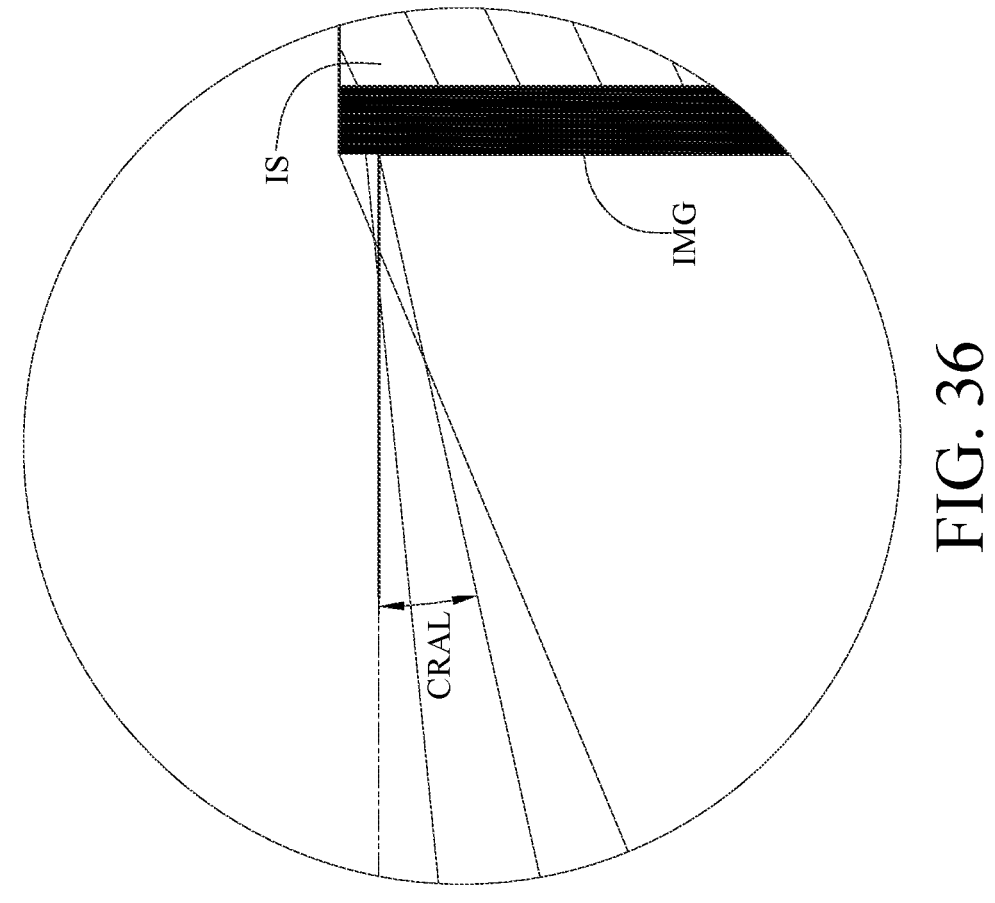
FIG. 36 shows a schematic view of CRAL according to the 1st embodiment of the present disclosure.

When a chief ray angle of a maximum field of view on the image surface of the photographing lens assembly with the infinite object distance is CRAL, the following condition can be satisfied: 1.0 [deg.]<CRAL<20.0 [deg.]. Therefore, it is favorable for controlling the light incident angle on the image surface so as to simplify the configuration of the light-folding element. Moreover, the following condition can also be satisfied: 5.0 [deg.]<CRAL<15.0 [deg.]. Please refer to FIG. 36, which shows a schematic view of CRAL according to the 1st embodiment of the present disclosure.

When the focal length of the photographing lens assembly with the infinite object distance is fL, and a focal length of the photographing lens assembly with the short object distance is fS, the following condition can be satisfied: 0.90<fL/fS<1.20. Therefore, it is favorable for taking the size and image quality of the photographing lens assembly into account in telephoto and macro photography. Moreover, the following condition can also be satisfied: 0.95<fL/fS<1.15.

When the axial distance between the object-side surface of the one lens element closest to the object side and the image-side surface of the another lens element closest to the image side in the photographing lens assembly with the infinite object distance is TDL, and an axial distance between the object-side surface of the one lens element closest to the object side and the image-side surface of the another lens element closest to the image side in the photographing lens assembly with the short object distance is TDS, the following condition can be satisfied: 0.90<TDL/TDS<1.00. Therefore, it is favorable for reducing the movement amount of the lens groups during focusing so as to simplify the mechanism. Moreover, the following condition can also be satisfied: 0.95<TDL/TDS<0.995.

When a focal length of the first lens group is fG1, and a focal length of the second lens group is fG2, the following condition can be satisfied: −1.00<fG1/fG2<−0.40. Therefore, it is favorable for reducing the movement amount of the lens groups during focusing by strengthening the refractive power of the second lens group. Moreover, the following condition can also be satisfied: −0.85<fG1/fG2<−0.60.

When the focal length of the photographing lens assembly with the infinite object distance is fL, and the axial distance between the image-side surface of the another lens element closest to the image side and the image surface in the photographing lens assembly with the infinite object distance is BLL, the following condition can be satisfied: 0.90<fL/BLL<1.30. Therefore, it is favorable for adjusting to a relatively good field of view of the photographing lens assembly in telephoto photography so as to be applicable in various fields. Moreover, the following condition can also be satisfied: 1.00<fL/BLL<1.20.

When the focal length of the photographing lens assembly with the short object distance is fS, and an axial distance between the image-side surface of the another lens element closest to the image side and the image surface in the photographing lens assembly with the short object distance is BLS, the following condition can be satisfied: 0.90<fS/BLS<1.30. Therefore, it is favorable for adjusting to a relatively good field of view of the photographing lens assembly in macro photography so as to increase freedom of photography. Moreover, the following condition can also be satisfied: 1.00<fS/BLS<1.20.

When an f-number of the photographing lens assembly with the infinite object distance is FnoL, and an f-number of the photographing lens assembly with the short object distance is FnoS, the following condition can be satisfied: 0.90<FnoL/FnoS<1.10. Therefore, it is favorable for balancing the depth of field and illuminance in telephoto and macro photography, and enhancing the light incident amount to improve image quality. Moreover, the following condition can also be satisfied: 0.95<FnoL/FnoS<1.05.

According to the present disclosure, the aforementioned features and conditions can be utilized in numerous combinations so as to achieve corresponding effects.

According to the present disclosure, the lens elements of the photographing lens assembly can be made of either glass or plastic material. When the lens elements are made of glass material, the refractive power distribution of the photographing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photographing lens assembly can include at least one stop, such as an aperture stop, a glare stop or a field stop. Said glare stop or said field stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the present disclosure, the photographing lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing lens assembly can include one or more optical elements for limiting the form of light passing through the photographing lens assembly. Each optical element can be, but not limited to, a filter, a polarizer, etc., and each optical element can be, but not limited to, a single-piece element, a composite component, a thin film, etc. The optical element can be located at the object side or the image side of the photographing lens assembly or between any two adjacent lens elements so as to allow light in a specific form to pass through, thereby meeting application requirements.

According to the present disclosure, the photographing lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the photographing lens assembly can further include a light-blocking element. The light-blocking element can have a non-circular opening, and the non-circular opening can have different effective radii in different directions which are perpendicular to the optical axis. Therefore, it is favorable for coordinating with the shape of non-circular lens elements or aperture stop so as to effectively save the space and make full use of the light passing through said non-circular lens elements or aperture stop, thereby reducing stray light.

Moreover, the light-blocking element can be provided with a wavy structure or a jagged structure at a periphery of an inner hole portion thereof.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
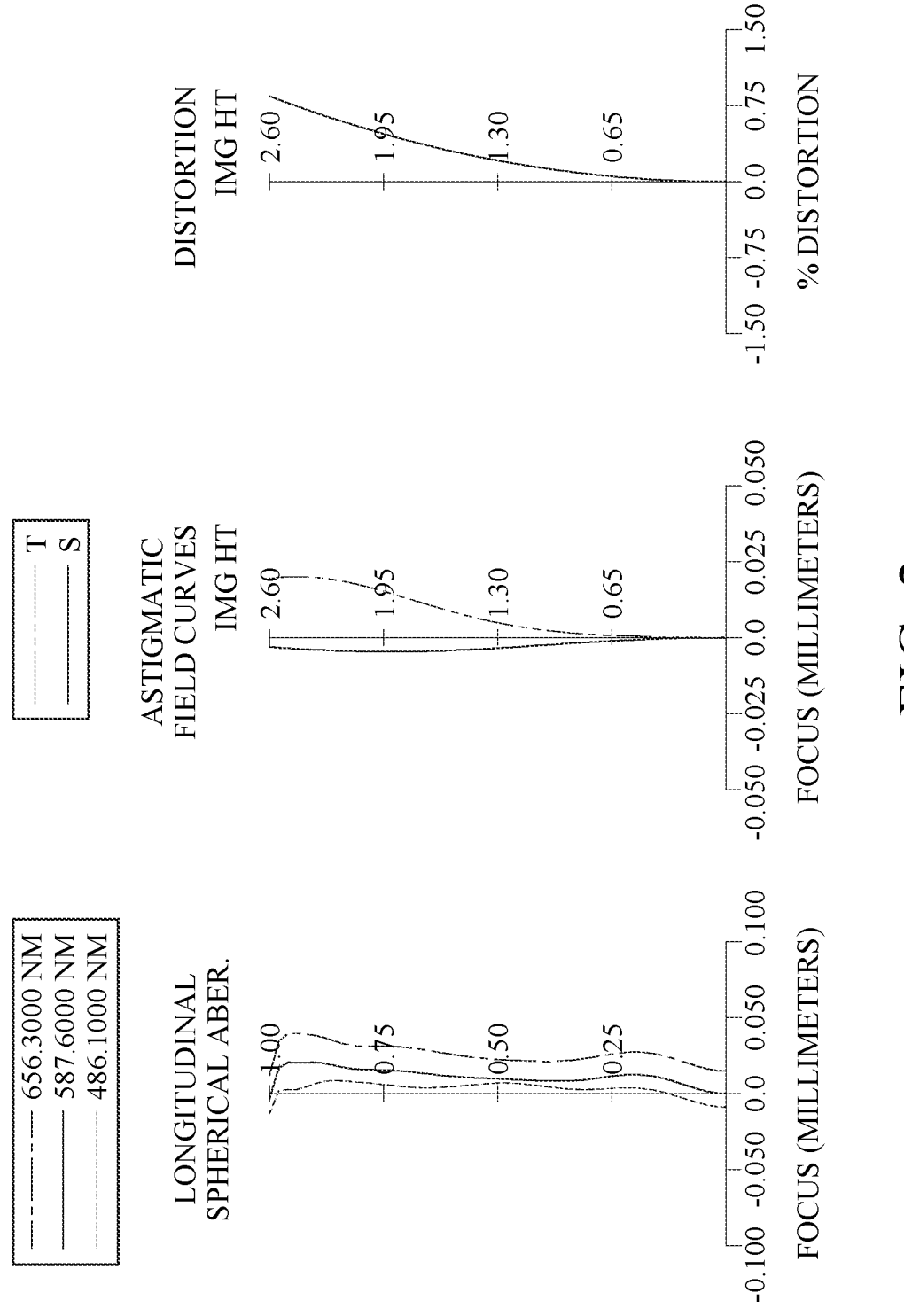
FIG. 2 shows spherical aberration curves, astigmatic field curves and a distortion curve of the image capturing unit corresponding to the infinite object distance according to the 1st embodiment.
Figure 3:
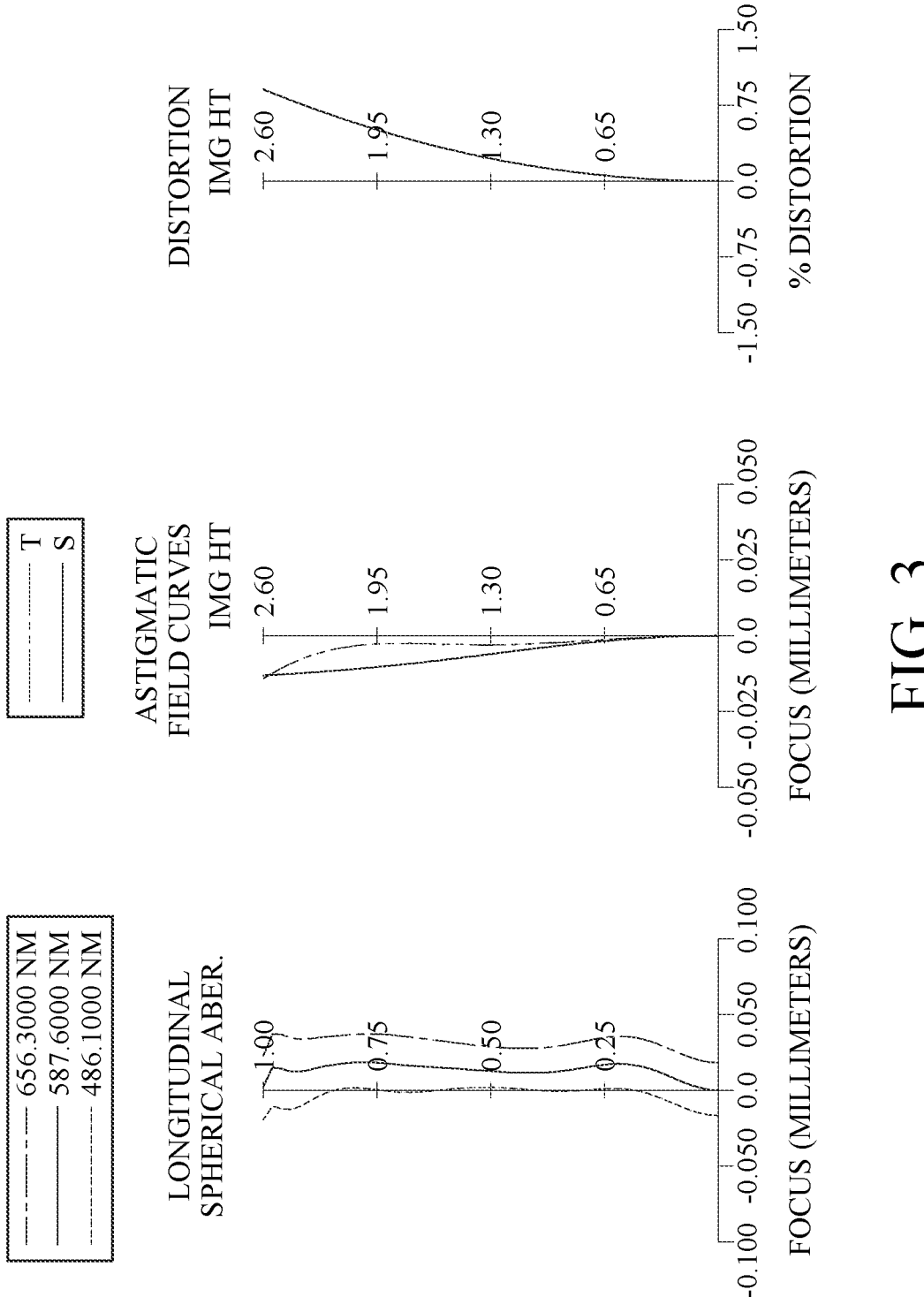
FIG. 3 shows spherical aberration curves, astigmatic field curves and a distortion curve of the image capturing unit corresponding to the short object distance according to the 1st embodiment.

FIG. 1 is a schematic view of an image capturing unit respectively at the first state (corresponding to an infinite object distance) and the second state (corresponding to a short object distance) according to the 1st embodiment of the present disclosure. FIG. 2 shows, in order from left to right, spherical aberration curves, astigmatic field curves and a distortion curve of the image capturing unit at the first state according to the 1st embodiment. FIG. 3 shows, in order from left to right, spherical aberration curves, astigmatic field curves and a distortion curve of the image capturing unit at the second state according to the 1st embodiment. The upper part of FIG. 1 shows the photographing lens assembly at the first state, and the lower part of FIG. 1 shows the photographing lens assembly at the second state. In FIG. 1, the image capturing unit 1 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 1, the second lens group G2 moves relative to the first lens group G1 along an optical axis in the movement focus process. Furthermore, through the movement focus process, the photographing lens assembly has a first state as shown in the upper part of FIG. 1 and a second state as shown in the lower part of FIG. 1. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has one inflection point. The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

Figure 48:
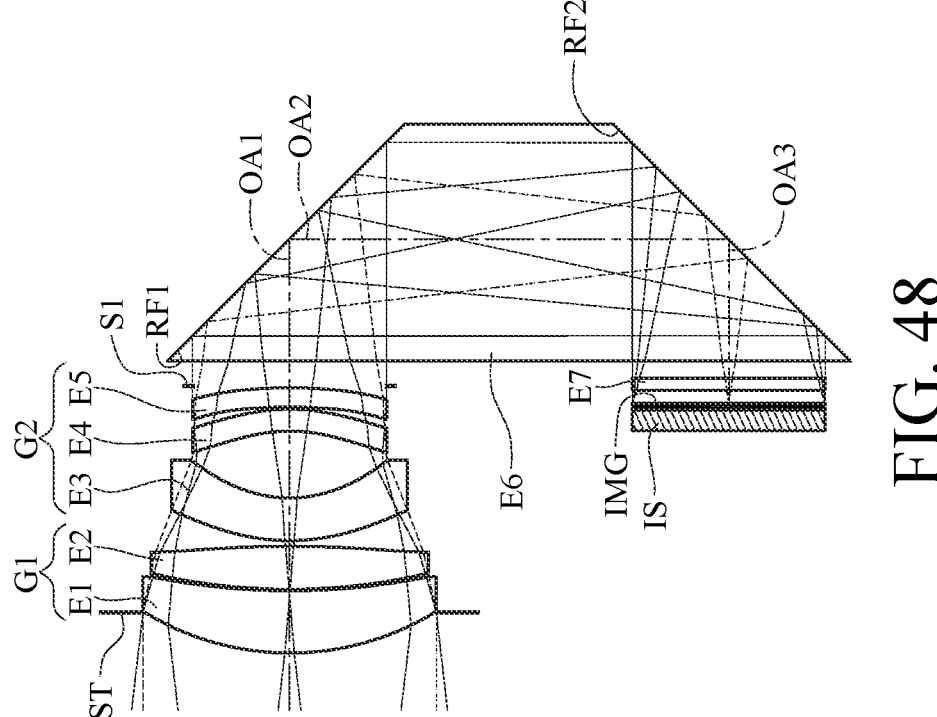
FIG. 48 shows a schematic view of a configuration of a reflective element in the image capturing unit according to the 1st embodiment of the present disclosure.
Figure 49:
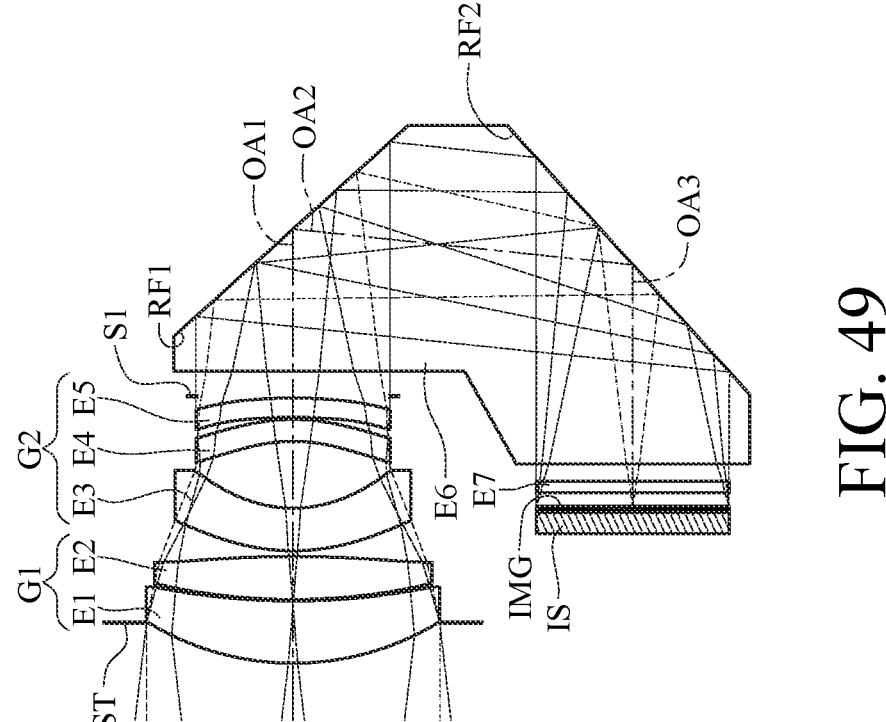
FIG. 49 shows a schematic view of another configuration of a reflective element in the image capturing unit according to the 1st embodiment of the present disclosure.
Figure 50:
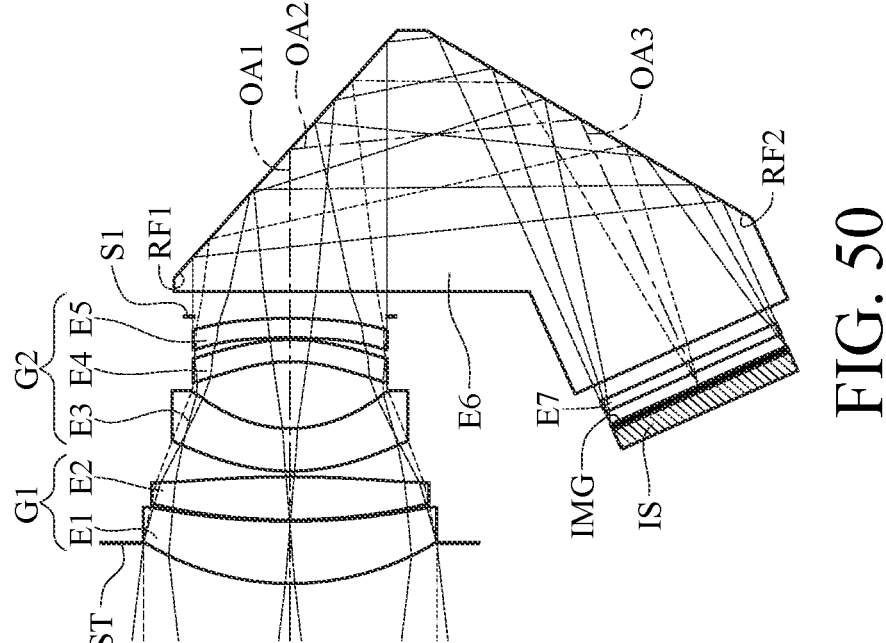
FIG. 50 shows a schematic view of further another configuration of a reflective element in the image capturing unit according to the 1st embodiment of the present disclosure.
Figure 51:
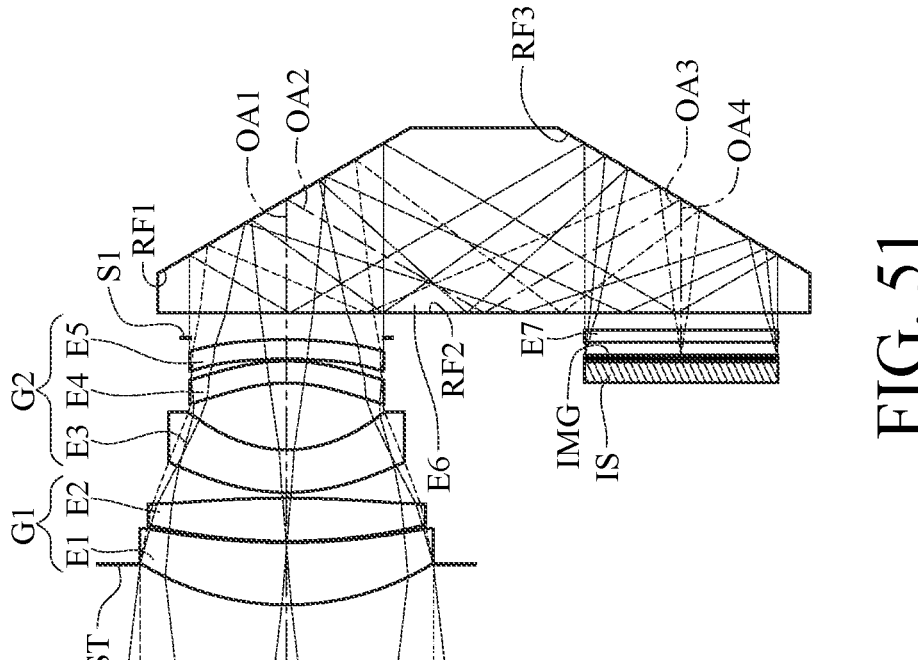
FIG. 51 shows a schematic view of still another configuration of a reflective element in the image capturing unit according to the 1st embodiment of the present disclosure.
Figure 52:
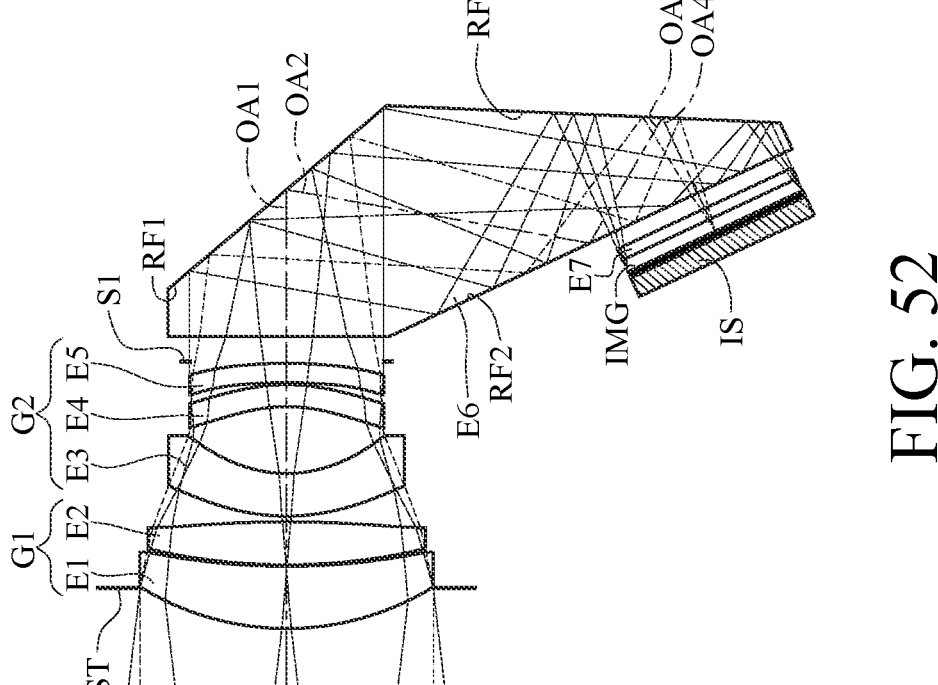
FIG. 52 shows a schematic view of still further another configuration of a reflective element in the image capturing unit according to the 1st embodiment of the present disclosure.
Figure 53:
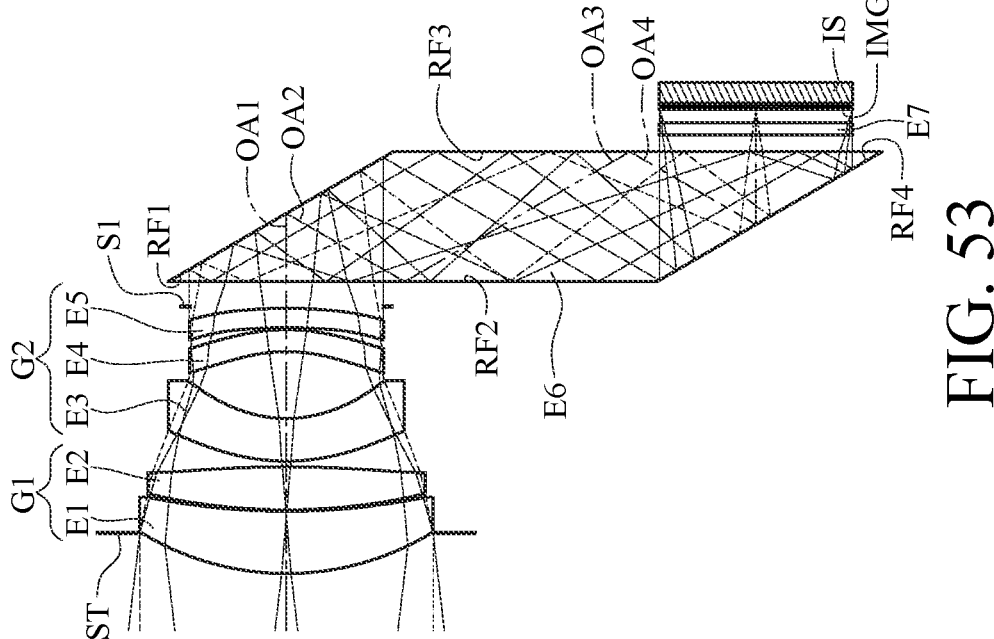
FIG. 53 shows a schematic view of still further another configuration of a reflective element in the image capturing unit according to the 1 St embodiment of the present disclosure.
Figure 54:
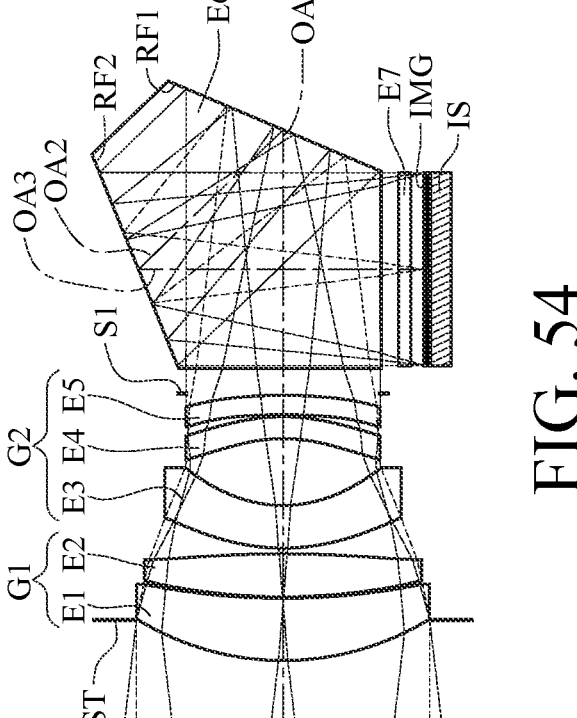
FIG. 54 shows a schematic view of still further another configuration of a reflective element in the image capturing unit according to the 1st embodiment of the present disclosure.
Figure 55:
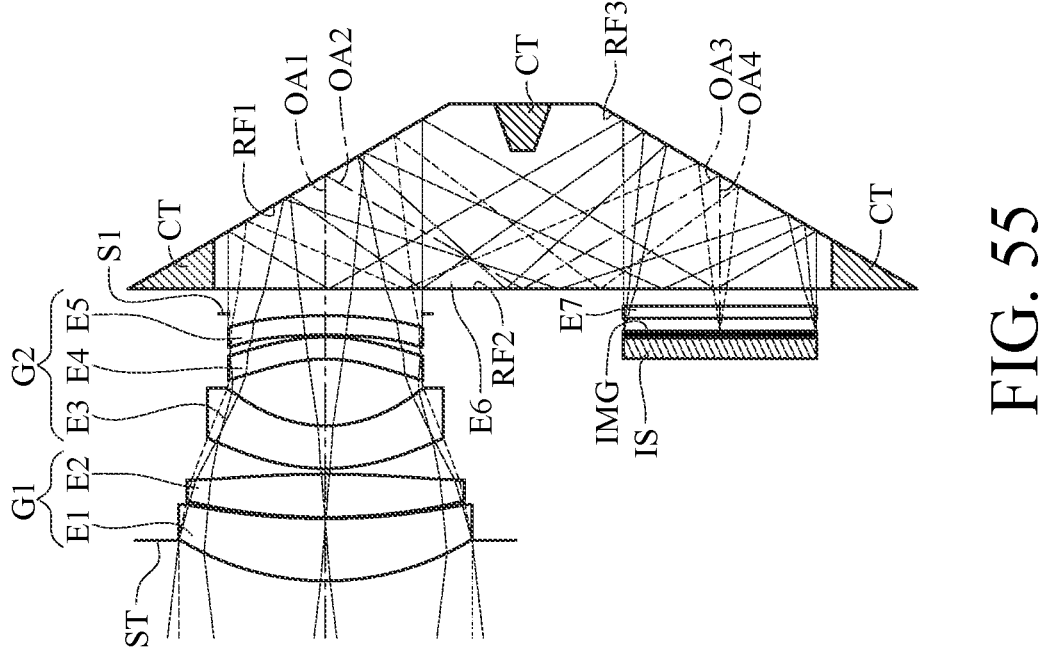
FIG. 55 shows a schematic view of still further another configuration of a reflective element in the image capturing unit according to the 1st embodiment of the present disclosure.
Figure 56:
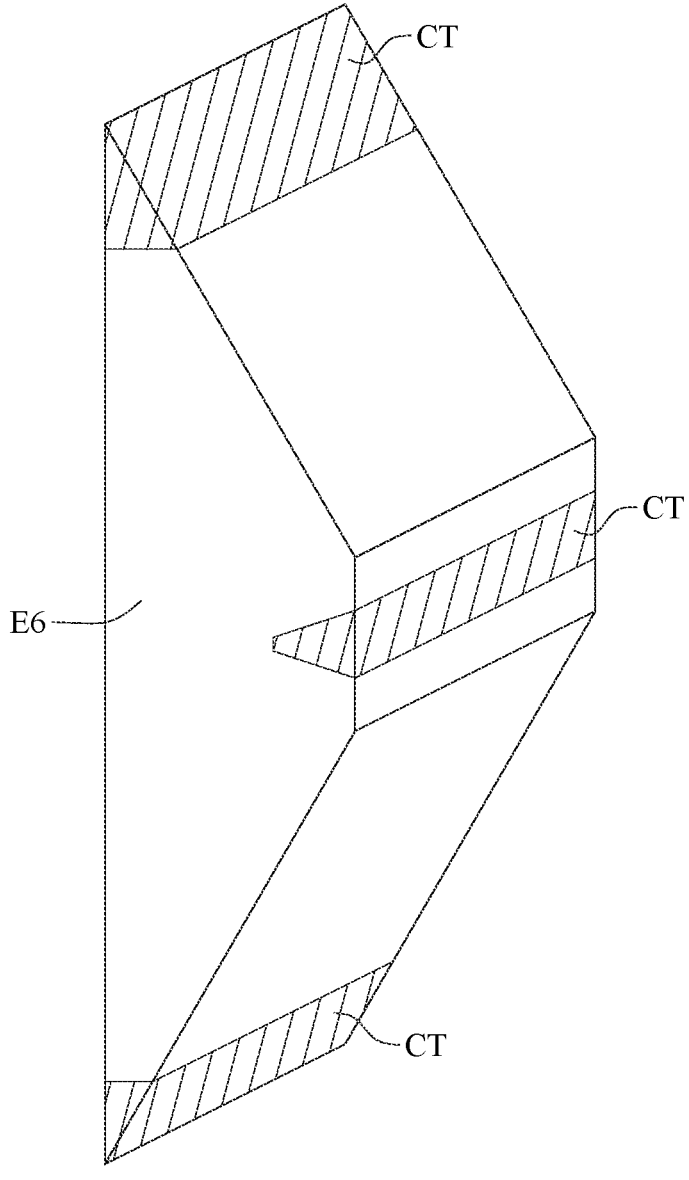
FIG. 56 shows a perspective view of the reflective element in FIG. 55.
Figure 57:
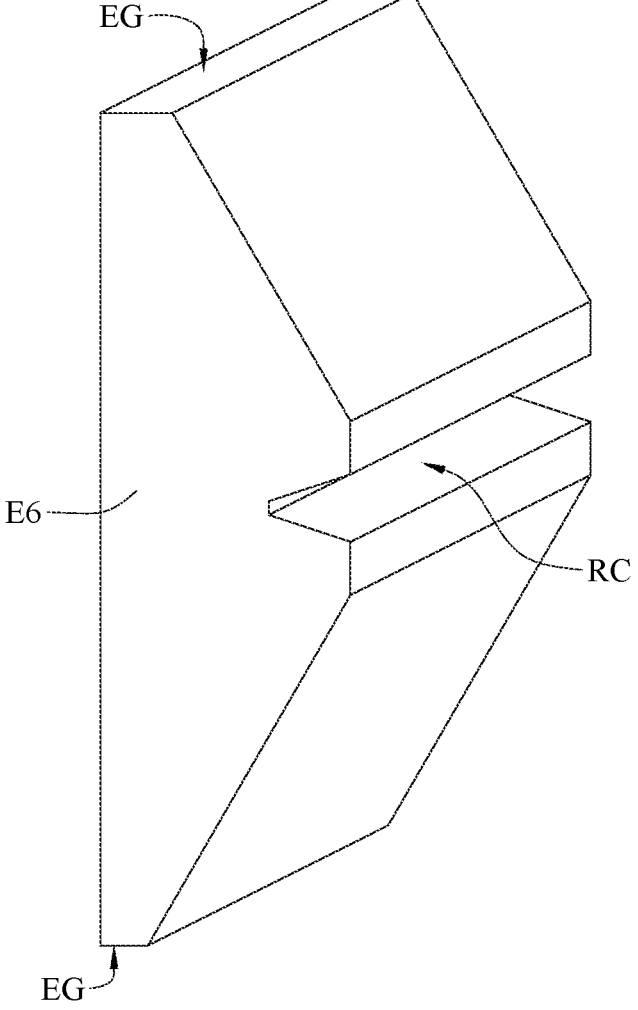
FIG. 57 shows a perspective view of the reflective element in FIG. 56 with partial blocks being trimmed.

The reflective element E6 is made of glass material. The reflective element E6 is a prism which provides an optical path folding function. For simplicity, the light-folding effect generated by the reflective element E6 in FIG. 1 is omitted. The reflective element E6 can have various forms as shown in FIG. 48 to FIG. 54. As shown in FIG. 48, the reflective element E6 can be a double-reflective element which can deflect the optical path twice, wherein the reflective surfaces RF1 and RF2 of the reflective element E6 respectively deflect a first optical axis OA1 into a second optical axis OA2 and deflect the second optical axis OA2 into a third optical axis OA3. The detail can be referred to the description related to FIG. 43, which will not be repeated again. As shown in FIG. 49, the reflective element E6 can also be a double-reflective element which can deflect the optical path twice, wherein the reflective surfaces RF1 and RF2 of the reflective element E6 respectively deflect a first optical axis OA1 into a second optical axis OA2 and deflect the second optical axis OA2 into a third optical axis OA3. The reflective element E6 in FIG. 49 can provide different optical paths therein with different deflecting angles by the shape thereof different from that of FIG. 48. As shown in FIG. 50, the reflective element E6 can also be a double-reflective element which can deflect the optical path twice, wherein the reflective surfaces RF1 and RF2 of the reflective element E6 respectively deflect a first optical axis OA1 into a second optical axis OA2 and deflect the second optical axis OA2 into a third optical axis OA3. The reflective element E6 in FIG. 50 can provide different optical paths therein with different deflecting angles by the shape thereof different from that of FIG. 48 and FIG. 49, such that the vector of the optical axis at the object end is angled to the vector of the optical axis at the image end by an obtuse angle. As shown in FIG. 51, the reflective element E6 can be a triple-reflective element which can deflect the optical path three times, wherein the reflective surfaces RF1, RF2 and RF3 of the reflective element E6 respectively deflect a first optical axis OA1 into a second optical axis OA2, deflect the second optical axis OA2 into a third optical axis OA3, and deflect the third optical axis OA3 into a fourth optical axis OA4. The detail can be referred to the description related to FIG. 44, which will not be repeated again. As shown in FIG. 52, the reflective element E6 can also be a triple-reflective element which can deflect the optical path three times, wherein the reflective surfaces RF1, RF2 and RF3 of the reflective element E6 respectively deflect a first optical axis OA1 into a second optical axis OA2, deflect the second optical axis OA2 into a third optical axis OA3, and deflect the third optical axis OA3 into a fourth optical axis OA4. The reflective element E6 in FIG. 52 can provide different optical paths therein with different deflecting angles by the shape thereof different from that of FIG. 51, such that the vector of the optical axis at the object end is angled to the vector of the optical axis at the image end by an acute angle. As shown in FIG. 53, the reflective element E6 can be a quadruple-reflective element which can deflect the optical path four times, wherein the reflective surfaces RF1, RF2, RF3 and RF4 of the reflective element E6 respectively deflect a first optical axis OA1 into a second optical axis OA2, deflect the second optical axis OA2 into a third optical axis OA3, deflect the third optical axis OA3 into a fourth optical axis OA4, and deflect the fourth optical axis OA4 into a fifth optical axis OA5. The detail can be referred to the description related to FIG. 45, which will not be repeated again. As shown in FIG. 54, the reflective element E6 can be a pentaprism which can deflect the optical path twice, wherein the reflective surfaces RF1 and RF2 of the reflective element E6 respectively deflect a first optical axis OA1 into a second optical axis OA2 and deflect the second optical axis OA2 into a third optical axis OA3. The detail can be referred to the description related to FIG. 46, which will not be repeated again. Moreover, the reflective element E6 can be an element having trimmed edges EG and a recess RC, as shown in FIG. 57, by removing non-optical effective blocks CT of an element with a trapezoidal section, as shown in FIGS. 55 and 56. By doing so, it is favorable for reducing lens size and thus further achieving the compactness of the overall module. Please be noted that the reflective element E6 as shown in FIG. 57 can also be achieved by combining of two or more prisms, and the present disclosure is not limited thereto.

The filter E7 is made of glass material and located between the reflective element E6 and the image surface IMG, and will not affect the focal length of the photographing lens assembly. The image sensor IS is disposed on or near the image surface IMG.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20 and 22.

In the photographing lens assembly of the image capturing unit 1 according to the 1 St embodiment, the first lens element E1 is one lens element closest to the object side surface, and the fifth lens element E5 is another lens element closest to the image side surface.

When a focal length of the photographing lens assembly with the infinite object distance is fL, an f-number of the photographing lens assembly with the infinite object distance is FnoL, half of a maximum field of view of the photographing lens assembly with the infinite object distance is HFOVL, an axial distance between the object-side surface of the one lens element closest to the object side and the image-side surface of the another lens element closest to the image side in the photographing lens assembly with the infinite object distance is TDL, an axial distance between the image-side surface of the another lens element closest to the image side and the image surface IMG in the photographing lens assembly with the infinite object distance is BLL, and a chief ray angle of a maximum field of view on the image surface IMG of the photographing lens assembly with the infinite object distance is CRAL, the following conditions are satisfied: fL=14.53 [mm]; FnoL=2.82; HFOVL=10.0 [deg.]; TDL=4.666 [mm]; BLL=13.211 [mm]; and CRAL=12.6 [deg.]. In this embodiment, TDL is an axial distance between the object-side surface of the first lens element E1 and the image-side surface of the fifth lens element E5 in the photographing lens assembly with the infinite object distance, and BLL is an axial distance between the image-side surface of the fifth lens element E5 and the image surface IMG in the photographing lens assembly with the infinite object distance.

When a focal length of the photographing lens assembly with the short object distance is fS, an f-number of the photographing lens assembly with the short object distance is FnoS, half of a maximum field of view of the photographing lens assembly with the short object distance is HFOVS, an axial distance between the object-side surface of the one lens element closest to the object side and the image-side surface of the another lens element closest to the image side in the photographing lens assembly with the short object distance is TDS, an axial distance between the image-side surface of the another lens element closest to the image side and the image surface IMG in the photographing lens assembly with the short object distance is BLS, and a chief ray angle of a maximum field of view on the image surface IMG of the photographing lens assembly with the short object distance is CRAS, the following conditions are satisfied: fS=14.29 [mm]; FnoS=2.84; HFOVS=10.0 [deg.]; TDS=4.749 [mm]; BLS=13.128 [mm]; and GRAS=12.6 [deg.]. In this embodiment, TDS is an axial distance between the object-side surface of the first lens element E1 and the image-side surface of the fifth lens element E5 in the photographing lens assembly with the short object distance, and BLS is an axial distance between the image-side surface of the fifth lens element E5 and the image surface IMG in the photographing lens assembly with the short object distance.

An axial distance between an imaged object and a most-object-side surface of the first lens group G1 is defined as D0, which can also be considered as an object distance of the imaged object. An axial distance between a most-image-side surface of the first lens group G1 and a most-object-side surface of the second lens group G2 is defined as D1. An axial distance between a most-image-side surface of the second lens group G2 and a surface immediately at an image side of the second lens group G2 is defined as D2. In this embodiment, D0 is an axial distance between an imaged object and the aperture stop ST, D1 is an axial distance between the image-side surface of the second lens element E2 and the object-side surface of the third lens element E3, and D2 is an axial distance between the stop S1 and an object-side surface of the reflective element E6. The photographing lens assembly is changeable between the first state and the second state through the movement focus process, and the values of D0 to D2 vary accordingly. When the photographing lens assembly is at the first state, the aforementioned parameters have the following values: D0=∞(infinity); D1=0.100 [mm]; and D2=0.439 [mm]. When the photographing lens assembly is at the second state, the aforementioned parameters have the following values: D0=800.000 [mm]; D1=0.183 [mm]; and D2=0.356 [mm].

When a focal length of the first lens group G1 is fG1, and a focal length of the second lens group G2 is fG2, the following conditions are satisfied: fG1=7.12 [mm]; and fG2=−9.97 [mm].

When the focal length of the photographing lens assembly with the infinite object distance is fL, and the focal length of the photographing lens assembly with the short object distance is fS, the following condition is satisfied: fL/fS=1.02.

When the focal length of the first lens group G1 is fG1, and the focal length of the second lens group G2 is fG2, the following condition is satisfied: fG1/fG2=−0.71.

When the focal length of the photographing lens assembly with the infinite object distance is fL, and the axial distance between the image-side surface of the another lens element closest to the image side and the image surface IMG in the photographing lens assembly with the infinite object distance is BLL, the following condition is satisfied: fL/BLL=1.10.

When the focal length of the photographing lens assembly with the short object distance is fS, and the axial distance between the image-side surface of the another lens element closest to the image side and the image surface IMG in the photographing lens assembly with the short object distance is BLS, the following condition is satisfied: fS/BLS=1.09.

When the axial distance between the object-side surface of the one lens element closest to the object side and the image-side surface of the another lens element closest to the image side in the photographing lens assembly with the infinite object distance is TDL, and the axial distance between the object-side surface of the one lens element closest to the object side and the image-side surface of the another lens element closest to the image side in the photographing lens assembly with the short object distance is TDS, the following condition is satisfied: TDL/TDS=0.98.

When the f-number of the photographing lens assembly with the infinite object distance is FnoL, and the f-number of the photographing lens assembly with the short object distance is FnoS, the following condition is satisfied: FnoL/FnoS=0.99.

When an axial distance between the object-side surface of the first lens element E1 and the image surface IMG is TL, and a maximum image height of the photographing lens assembly is ImgH, the following condition is satisfied: TL/ImgH When the axial distance between the object-side surface of the first lens element E1 and the image surface IMG is TL, and the focal length of the photographing lens assembly with the infinite object distance is fL, the following condition is satisfied: TL/fL=1.23.

When the axial distance between the object-side surface of the one lens element closest to the object side and the image-side surface of the another lens element closest to the image side in the photographing lens assembly with the infinite object distance is TDL, and the axial distance between the image-side surface of the another lens element closest to the image side and the image surface IMG in the photographing lens assembly with the infinite object distance is BLL, the following condition is satisfied: TDL/BLL=0.35.

When an axial distance between the aperture stop ST and the image surface IMG is SL, and the axial distance between the object-side surface of the first lens element E1 and the image surface IMG is TL, the following condition is satisfied:

$$SL/TL = 0.96.$$

When a focal length of the first lens element E1 is f1, and a focal length of the second lens element E2 is f2, the following condition is satisfied: f1/f2=1.24.

When the focal length of the second lens element E2 is f2, and the focal length of the third lens element E3 is f3, the following condition is satisfied: f2/f3=−1.03.

When the focal length of the photographing lens assembly with the infinite object distance is fL, and a composite focal length of the fourth lens element E4 and the fifth lens element E5 is f45, the following condition is satisfied: fL/|f45|=0.29.

When the focal length of the first lens element E1 is f1, the focal length of the third lens element E3 is f3, a focal length of the fourth lens element E4 is f4, and a focal length of the fifth lens element E5 is f5, the following condition is satisfied:

$$(|f1| + |f3|)/(|f4| + |f5|) = 0.12.$$

When the focal length of the third lens element E3 is f3, and a curvature radius of the object-side surface of the third lens element E3 is R5, the following condition is satisfied: f3/R5=−3.28.

When the curvature radius of the object-side surface of the third lens element E3 is R5, and a curvature radius of the image-side surface of the third lens element E3 is R6, the following condition is satisfied: R5/R6=1.61.

When a curvature radius of the object-side surface of the first lens element E1 is R1, and the curvature radius of the object-side surface of the third lens element E3 is R5, the following condition is satisfied: (R1−R5)/(R1+R5)=0.15.

When the curvature radius of the object-side surface of the third lens element E3 is R5, and a curvature radius of the object-side surface of the fifth lens element E5 is R9, the following condition is satisfied: (R5−R9)/(R5+R9)=−2.42.

When an axial distance between the object-side surface of the first lens element E1 and the image-side surface of the second lens element E2 is Dr1r4, and an axial distance between the object-side surface of the third lens element E3 and the image-side surface of the another lens element closest to the image side is Dr5rL, the following condition is satisfied: Dr1r4/Dr5rL=0.70. In this embodiment, Dr5rL is an axial distance between the object-side surface of the third lens element E3 and the image-side surface of the fifth lens element E5.

When a central thickness of the third lens element E3 is CT3, and an axial distance between the third lens element E3 and the fourth lens element E4 is T34, the following condition is satisfied: CT3/T34=0.64. In this embodiment, an axial distance between two adjacent lens elements is a distance in a paraxial region between two adjacent lens surfaces of the two adjacent lens elements.

When a central thickness of the first lens element E1 is CT1, a central thickness of the fourth lens element E4 is CT4, and a central thickness of the fifth lens element E5 is CT5, the following condition is satisfied: CT1/(CT4+CT5) =1.51.

When an Abbe number of the first lens element E1 is V1, and an Abbe number of the second lens element E2 is V2, the following condition is satisfied: V1/V2=1.14.

When the Abbe number of the second lens element E2 is V2, and an Abbe number of the fourth lens element E4 is V4, the following condition is satisfied: V2/V4=2.39.

When a maximum effective radius of the object-side surface of the first lens element E1 is Y1R1, and a maximum effective radius of the image-side surface of the another lens element closest to the image side is YNR2, the following condition is satisfied: Y1R1/YNR2=1.48. In this embodiment, YNR2 is a maximum effective radius of the image-side surface of the fifth lens element E5.

When the maximum image height of the photographing lens assembly is ImgH, and the maximum effective radius of the object-side surface of the first lens element E1 is Y1R1, the following condition is satisfied: ImgH/Y1R1=1.01.

When a displacement in parallel with the optical axis from an axial vertex of the object-side surface of the third lens element E3 to a maximum effective radius position of the object-side surface of the third lens element E3 is Sag3R1, and a displacement in parallel with the optical axis from an axial vertex of the image-side surface of the third lens element E3 to a maximum effective radius position of the image-side surface of the third lens element E3 is Sag3R2, the following condition is satisfied: |Sag3R1/Sag3R2|=0.79. In this embodiment, the direction of Sag3R1 faces the image side, and thus the value of Sag3R1 is positive; the direction of Sag3R2 faces the image side, and thus the value of Sag3R2 is positive.

The detailed optical data of the 1st embodiment are shown in Table 1A and Table 1B, and the aspheric surface data are shown in Table 1C below.

TABLE 1A

| 1st Embodiment | | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Ape. Stop | Plano | | −0.719 | | | | |
| 2 | Lens 1 | 4.8917 | (SPH) | 1.093 | Glass | 1.517 | 64.2 | 15.17 |
| 3 | | 12.0207 | (SPH) | 0.030 | | | | |
| 4 | Lens 2 | 10.6690 | (ASP) | 0.757 | Plastic | 1.545 | 56.1 | 12.19 |
| 5 | | −17.1760 | (ASP) | D1 | | | | |
| 6 | Lens 3 | 3.5968 | (ASP) | 0.750 | Plastic | 1.639 | 23.5 | −11.79 |

TABLE 1A-continued

| | | | | 1st Embodiment | | | | |
|---|---|---|---|---|---|---|---|---|
| Surface # | | Curvature Radius | | Thickness | Material | Index | Abbe # | Focal Length |
| 7 | | 2.2361 | (ASP) | 1.175 | | | | |
| 8 | Lens 4 | −2.8276 | (ASP) | 0.386 | Plastic | 1.639 | 23.5 | −37.65 |
| 9 | | −3.3750 | (ASP) | 0.035 | | | | |
| 10 | Lens 5 | −8.6608 | (ASP) | 0.340 | Plastic | 1.566 | 37.4 | 178.07 |
| 11 | | −8.0887 | (ASP) | 0.030 | | | | |
| 12 | Stop | Plano | | D2 | | | | |
| 13 | Reflective element | Plano | | 12.000 | Glass | 1.516 | 64.1 | — |
| 14 | | Plano | | 0.300 | | | | |
| 15 | Filter | Plano | | 0.210 | Glass | 1.516 | 64.1 | — |
| 16 | | Plano | | 0.232 | | | | |
| 17 | Image | Plano | | — | | | | |

Note:
Reference wavelength is 587.6 nm (d-line).
An effective radius of the stop S1 (Surface 12) is 1.71 mm.

In Table 1A, the curvature radius, the thickness and the focal length are shown in millimeters (mm). Surface numbers 0-17 represent the surfaces sequentially arranged from the object side to the image side along the optical axis.

TABLE 1B

| Optical data for photographing lens assembly with infinite object distance and short object distance | | | |
|---|---|---|---|
| | Infinite object distance (First state) | | Short object distance (Second state) |
| fL [mm] | 14.53 | fS [mm] | 14.29 |
| FnoL | 2.82 | FnoS | 2.84 |
| HFOVL [deg.] | 10.0 | HFOVS [deg.] | 10.0 |
| D0 [mm] | ∞ | D0 [mm] | 800.000 |
| D1 [mm] | 0.100 | D1 [mm] | 0.183 |
| D2 [mm] | 0.439 | D2 [mm] | 0.356 |
| TDL [mm] | 4.666 | TDS [mm] | 4.749 |
| BLL [mm] | 13.211 | BLS [mm] | 13.128 |
| fG1 [mm] | 7.12 | fG1 [mm] | 7.12 |
| fG2 [mm] | −9.97 | fG2 [mm] | −9.97 |
| CRAL [deg.] | 12.6 | CRAS [deg.] | 12.6 |

Table 1B shows optical data of the first state and the second state of the photographing lens assembly in different focusing conditions. It should be understood that only two movement focusing conditions (i.e., the first state and the second state) are disclosed in this embodiment, but the present disclosure is not limited thereto. The photographing lens assembly of this embodiment can further have other focal lengths corresponding to the intermediate range of the first state and the second state in other movement focusing conditions besides the first state and the second state for different object distances.

It can be known from Table 1B, the photographing lens assembly performs the movement focus process according to the object distance, and the second lens group G2 is moved relative to the first lens group G1 along the optical axis in the movement focus process. In specific, when the object distance D0 varies to 800.000 millimeters from infinity, the photographing lens assembly changes to the second state from the first state, the axial distance between the first lens group G1 and the second group G2 increases to 0.183 millimeters of the second state from 0.100 millimeters of the first state, and the axial distance between the second lens group G2 and the reflective element E6 decreases to 0.356 millimeters of the second state from 0.439 millimeters of the first state. That is, when the object distance decreases, the second lens group G2 moves along the optical axis towards the image side relative to the first lens group G1 during the movement focus process.

TABLE 1C

| | | | Aspheric Coefficients | |
|---|---|---|---|---|
| Surface # | 4 | 5 | 6 | 7 |
| k= | −3.307600E+01 | −3.426440E+01 | −5.188240E+00 | 2.589860E−02 |
| A4= | 4.818347E−03 | 4.841205E−03 | 5.631492E−03 | −2.247181E−02 |
| A6= | −1.461637E−03 | −4.268684E−03 | 1.643939E−03 | 1.337943E−02 |
| A8= | 1.828979E−04 | 2.067701E−03 | −4.349707E−03 | −1.517403E−02 |
| A10= | 1.000724E−04 | −4.424443E−04 | 5.177592E−03 | 1.705926E−02 |
| A12= | −5.464836E−05 | −4.449533E−05 | −3.596139E−03 | −1.432779E−02 |
| A14= | 1.217515E−05 | 5.453966E−05 | 1.523934E−03 | 7.626313E−03 |
| A16= | −1.326948E−06 | −1.503286E−05 | −4.032541E−04 | −2.443216E−03 |
| A18= | 5.767136E−08 | 2.109795E−06 | 6.510432E−05 | 4.258876E−04 |
| A20= | — | −1.552551E−07 | −5.862167E−06 | −3.087716E−05 |
| A22= | — | 4.805062E−09 | 2.254937E−07 | — |
| Surface # | 8 | 9 | 10 | 11 |
| k= | −7.863910E−02 | −6.820190E−02 | 2.924210E+00 | −1.203720E+00 |
| A4= | −4.682586E−03 | −3.429429E−03 | 1.247861E−02 | 1.214113E−02 |
| A6= | 4.764523E−02 | 4.980532E−02 | −8.616112E−04 | −1.886134E−02 |

TABLE 1C-continued

| | | Aspheric Coefficients | | |
|---|---|---|---|
| A8= | −3.435281E−02 | −4.928028E−02 | −1.518282E−02 | 1.556359E−02 |
| A10= | 1.023542E−02 | 1.661836E−02 | −3.929360E−04 | −1.353311E−02 |
| A12= | 1.302898E−03 | 4.318461E−03 | 1.152902E−02 | 8.593968E−03 |
| A14= | −1.478767E−03 | −4.649928E−03 | −6.952146E−03 | −3.110420E−03 |
| A16= | 1.383739E−04 | 1.151019E−03 | 1.633899E−03 | 5.733881E−04 |
| A18= | 6.739234E−05 | −7.945305E−05 | −1.391244E−04 | −4.199370E−05 |
| A20= | −1.177645E−05 | −3.375296E−06 | — | — |

In Table 1C, k represents the conic coefficient of the equation of the aspheric surface profiles. A4-A22 represent the aspheric coefficients ranging from the 4th order to the 22th order. The tables presented below for each embodiment are the corresponding schematic parameter and aberration curves, and the definitions of the tables are the same as Table 1A to Table 1C of the 1st embodiment. Therefore, an explanation in this regard will not be provided again.

2nd Embodiment

Figure 4:
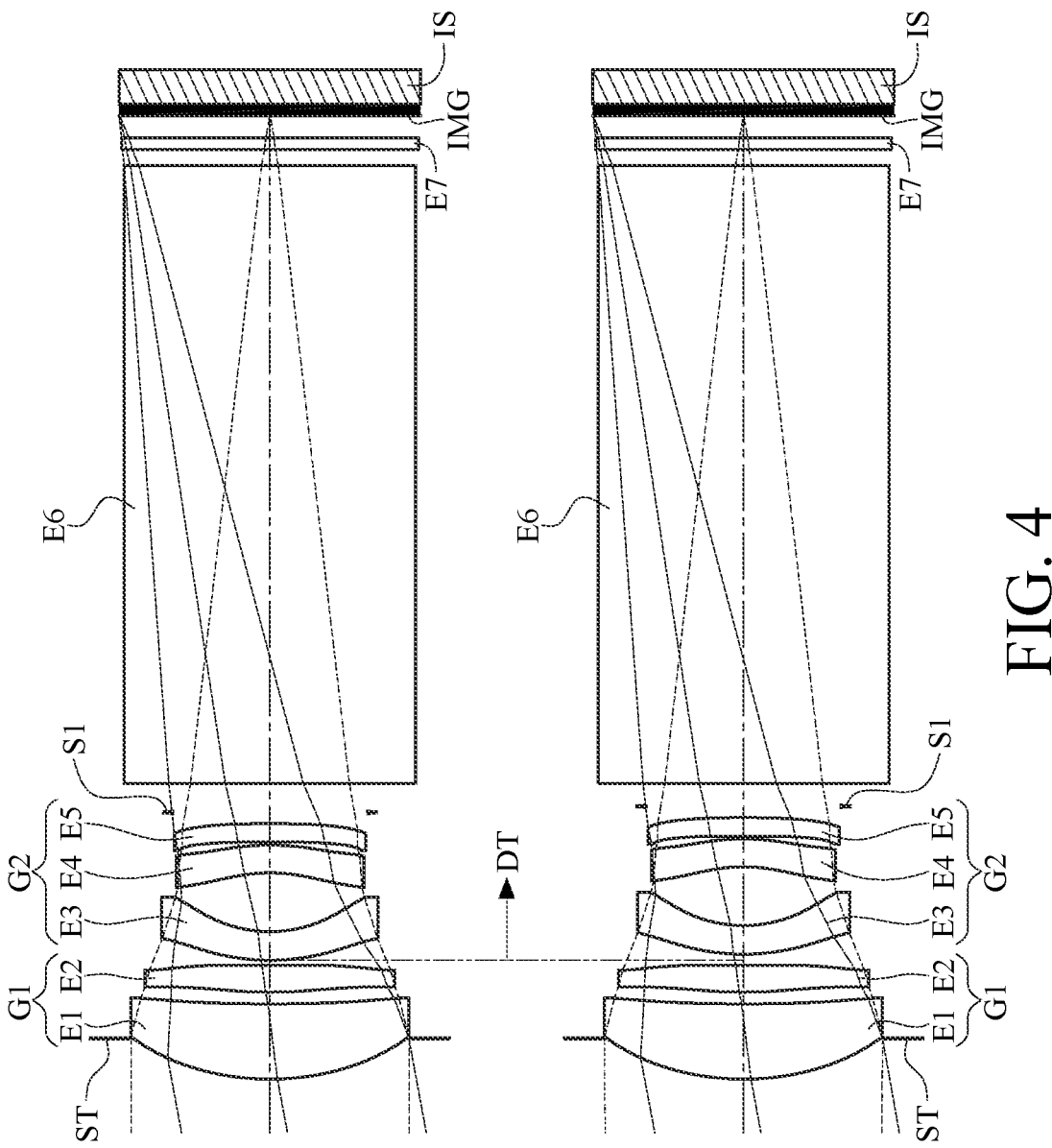
FIG. 4 is a schematic view of an image capturing unit respectively corresponding to an infinite object distance and a short object distance according to the 2nd embodiment of the present disclosure.
Figure 5:
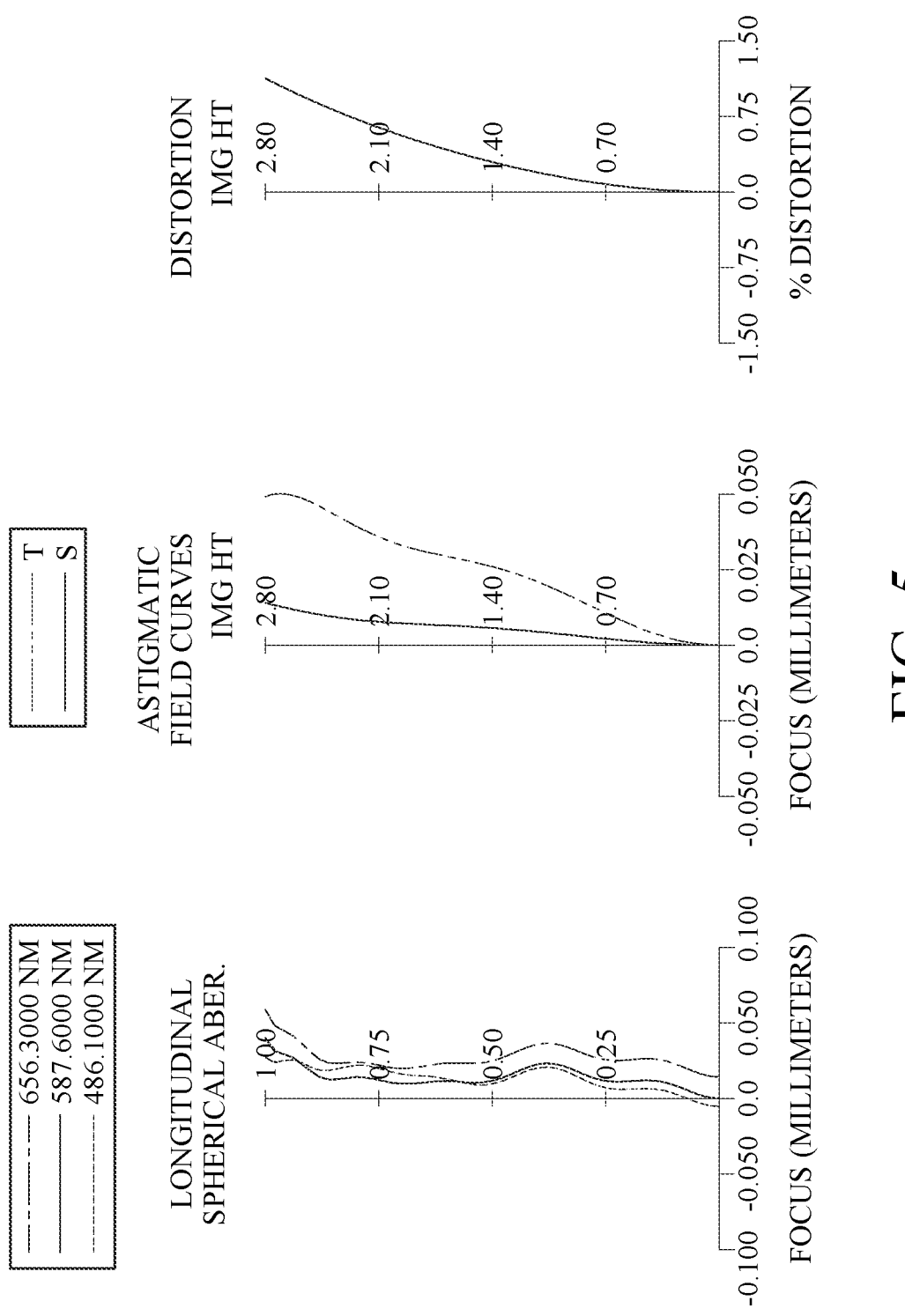
FIG. 5 shows spherical aberration curves, astigmatic field curves and a distortion curve of the image capturing unit corresponding to the infinite object distance according to the 2nd embodiment.
Figure 6:
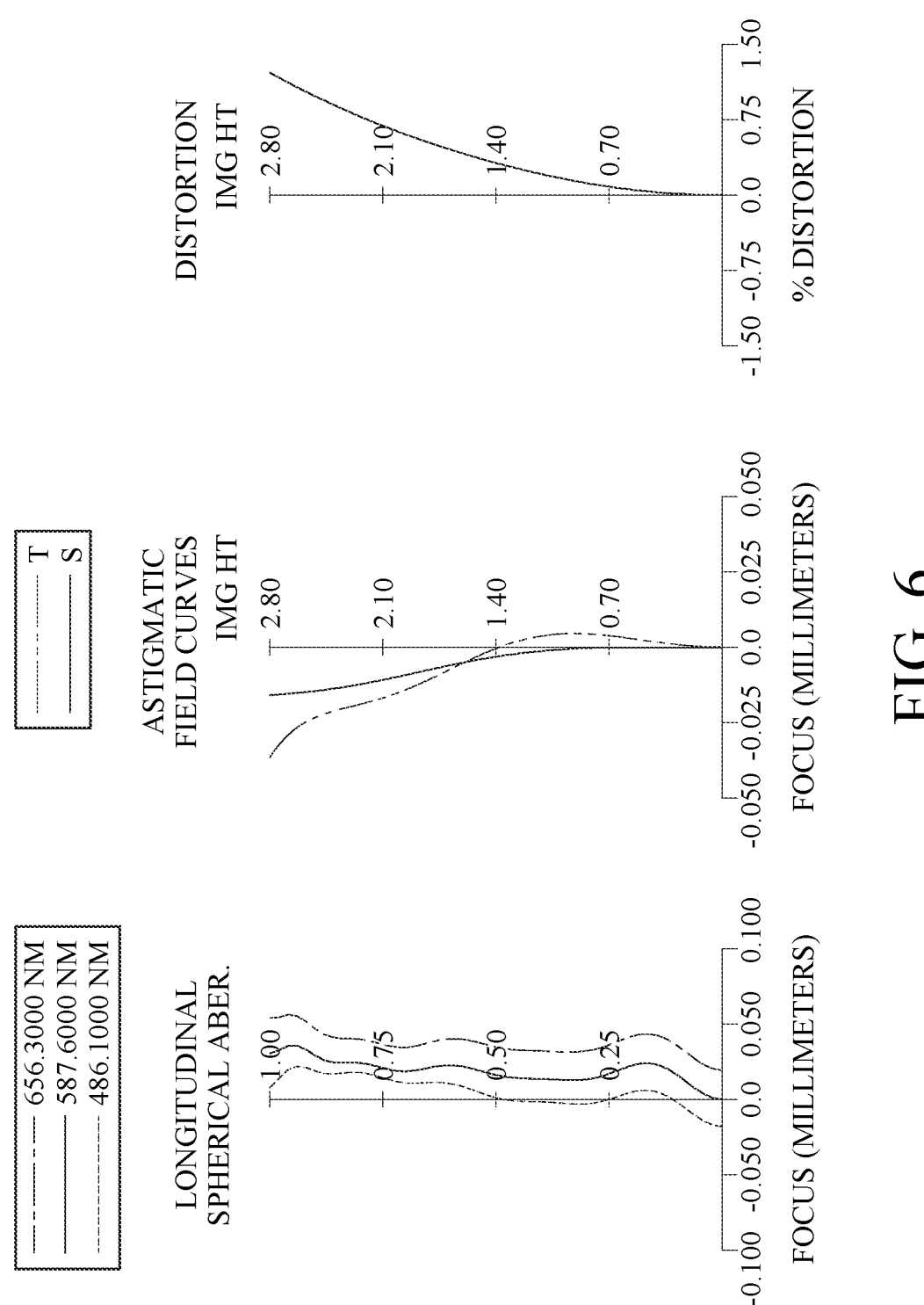
FIG. 6 shows spherical aberration curves, astigmatic field curves and a distortion curve of the image capturing unit corresponding to the short object distance according to the 2nd embodiment.

FIG. 4 is a schematic view of an image capturing unit respectively at the first state (corresponding to an infinite object distance) and the second state (corresponding to a short object distance) according to the 2nd embodiment of the present disclosure. FIG. 5 shows, in order from left to right, spherical aberration curves, astigmatic field curves and a distortion curve of the image capturing unit at the first state according to the 2nd embodiment. FIG. 6 shows, in order from left to right, spherical aberration curves, astigmatic field curves and a distortion curve of the image capturing unit at the second state according to the 2nd embodiment. The upper part of FIG. 4 shows the photographing lens assembly at the first state, and the lower part of FIG. 4 shows the photographing lens assembly at the second state. In FIG. 4, the image capturing unit 2 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 4, the second lens group G2 moves relative to the first lens group G1 along an optical axis in the movement focus process. Furthermore, through the movement focus process, the photographing lens assembly has a first state as shown in the upper part of FIG. 4 and a second state as shown in the lower part of FIG. 4. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has two inflection points.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The reflective element E6 is made of glass material and is a prism which provides an optical path folding function. For simplicity, the light-folding effect generated by the reflective element E6 in FIG. 4 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 2nd embodiment are shown in Table 2A and Table 2B, and the aspheric surface data are shown in Table 2C below.

In Table 2B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance

TABLE 2A

| | | | | | | Abbe | Focal |
|---|---|---|---|---|---|---|---|
| Surface # | | Curvature Radius | Thickness | Material | Index | # | Length |
| 0 | Object | Plano | D0 | | | | |
| 1 | Ape. Stop | Plano | −0.749 | | | | |
| 2 | Lens 1 | 5.0157 (ASP) | 1.400 | Glass | 1.589 | 61.3 | 9.85 |
| 3 | | 33.1208 (ASP) | 0.217 | | | | |
| 4 | Lens 2 | 8.6625 (ASP) | 0.498 | Plastic | 1.534 | 56.0 | 18.05 |
| 5 | | 83.3333 (ASP) | D1 | | | | |
| 6 | Lens 3 | 3.8715 (ASP) | 0.533 | Plastic | 1.587 | 28.3 | −11.21 |
| 7 | | 2.3138 (ASP) | 1.093 | | | | |
| 8 | Lens 4 | −3.1105 (ASP) | 0.518 | Plastic | 1.639 | 23.5 | −17.89 |
| 9 | | −4.5515 (ASP) | 0.054 | | | | |
| 10 | Lens 5 | −57.5081 (ASP) | 0.345 | Plastic | 1.614 | 25.6 | 40.09 |
| 11 | | −17.2703 (ASP) | 0.207 | | | | |
| 12 | Stop | Plano | D2 | | | | |
| 13 | Reflective element | Plano | 11.500 | Glass | 1.516 | 64.1 | — |
| 14 | | Plano | 0.300 | | | | |
| 15 | Filter | Plano | 0.210 | Glass | 1.516 | 64.1 | — |
| 16 | | Plano | 0.414 | | | | |
| 17 | Image | Plano | — | | | | |

Note:
Reference wavelength is 587.6 nm (d-line).
An effective radius of the stop S1 (Surface 12) is 1.82 mm.

TABLE 2B

| Optical data for photographing lens assembly with infinite object distance and short object distance | | | |
|---|---|---|---|
| | Infinite object distance (First state) | | Short object distance (Second state) |
| fL [mm] | 14.84 | fS [mm] | 14.43 |
| FnoL | 2.87 | FnoS | 2.90 |
| HFOVL [deg.] | 10.6 | HFOVS [deg.] | 10.5 |
| D0 [mm] | ∞ | D0 [mm] | 500.000 |
| D1 [mm] | 0.096 | D1 [mm] | 0.208 |
| D2 [mm] | 0.539 | D2 [mm] | 0.427 |
| TDL [mm] | 4.754 | TDS [mm] | 4.866 |
| BLL [mm] | 13.170 | BLS [mm] | 13.058 |
| fG1 [mm] | 6.66 | fG1 [mm] | 6.66 |
| fG2 [mm] | −8.78 | fG2 [mm] | −8.78 |
| CRAL [deg.] | 13.3 | CRAS [deg.] | 13.4 | between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

TABLE 2C

| | Aspheric Coefficients | | | |
|---|---|---|---|---|
| Surface # | 2 | 3 | 4 | 5 |
| k= | 5.255990E−01 | 9.277880E+01 | −9.485350E+01 | −9.732010E+01 |
| A4= | −9.402696E−04 | −3.521198E−03 | 2.701191E−02 | 2.463808E−02 |
| A6= | 1.272241E−03 | 4.215150E−03 | −3.625808E−02 | −6.192586E−02 |
| A8= | −4.609133E−04 | −1.958389E−03 | 2.050212E−02 | 5.425658E−02 |
| A10= | 9.129038E−05 | 4.993102E−04 | −6.251504E−03 | −2.865508E−02 |
| A12= | −9.057860E−06 | −6.766483E−05 | 8.148902E−04 | 1.005815E−02 |
| A14= | 3.509606E−07 | 3.686973E−06 | 9.448485E−05 | −2.404080E−03 |
| A16= | — | — | −5.630399E−05 | 3.875301E−04 |
| A18= | — | — | 9.583472E−06 | −4.030913E−05 |
| A20= | — | — | −7.731793E−07 | 2.438188E−06 |
| A22= | — | — | 2.514290E−08 | −6.465320E−08 |

TABLE 2C-continued

| | | Aspheric Coefficients | | |
|---|---|---|---|---|
| Surface # | 6 | 7 | 8 | 9 |
| k= | −7.361190E+00 | 4.624990E−03 | −4.666170E−01 | −1.871210E−01 |
| A4= | −6.767436E−03 | −5.606758E−02 | −2.568936E−02 | 3.350101E−03 |
| A6= | 1.952137E−02 | 9.396796E−02 | 1.338232E−01 | 1.991026E−02 |
| A8= | −6.482358E−03 | −7.960829E−02 | −1.871299E−01 | −6.680484E−02 |
| A10= | −3.915157E−03 | 3.646177E−02 | 1.773004E−01 | 1.273203E−01 |
| A12= | 3.835214E−03 | −1.092742E−02 | −1.157760E−01 | −1.231018E−01 |
| A14= | −1.397849E−03 | 3.104939E−03 | 5.177069E−02 | 6.952617E−02 |
| A16= | 2.701257E−04 | −1.138409E−03 | −1.556356E−02 | −2.424323E−02 |
| A18= | −2.711575E−05 | 3.394196E−04 | 3.000486E−03 | 5.156705E−03 |
| A20= | 1.058916E−06 | −5.592698E−05 | −3.342033E−04 | −6.149913E−04 |
| A22= | 7.075066E−09 | 3.718484E−06 | 1.630223E−05 | 3.161134E−05 |

| Surface # | 10 | 11 |
|---|---|---|
| k= | −6.621460E+01 | −5.525910E+00 |
| A4= | 4.771850E−02 | 3.054559E−02 |
| A6= | −1.348729E−01 | −6.981346E−02 |
| A8= | 9.042230E−02 | 4.583254E−02 |
| A10= | 4.151239E−02 | 9.776008E−03 |
| A12= | −1.052004E−01 | −3.693652E−02 |
| A14= | 7.618278E−02 | 2.775444E−02 |
| A16= | −2.994089E−02 | −1.108894E−02 |
| A18= | 6.849393E−03 | 2.568239E−03 |
| A20= | −8.607870E−04 | −3.257673E−04 |
| A22= | 4.625216E−05 | 1.757908E−05 |

In the 2nd embodiment, the equation of the aspheric surface profiles of the aforementioned lens elements is the same as the equation of the 1st embodiment.

Moreover, these parameters shown in Table 2D can be calculated from Table 2A to Table 2C as the following values and satisfy the following conditions:

TABLE 2D

| | | Schematic Parameters | |
|---|---|---|---|
| fL [mm] | 14.84 | TDL/BLL | 0.36 |
| FnoL | 2.87 | SL/TL | 0.96 |
| HFOVL [deg.] | 10.6 | f1/f2 | 0.55 |
| CRAL [deg.] | 13.3 | f2/f3 | −1.61 |
| fS [mm] | 14.43 | fL/\|f45\| | 0.43 |
| FnoS | 2.90 | (\|f1\| + \|f3\|)/(\|f4\| + \|f5\|) | 0.36 |
| HFOVS [deg.] | 10.5 | f3/R5 | −2.90 |
| CRAS [deg.] | 13.4 | R5/R6 | 1.67 |
| fG1 [mm] | 6.66 | (R1 − R5)/(R1 + R5) | 0.13 |
| fG2 [mm] | −8.78 | (R5 − R9)/(R5 + R9) | −1.14 |
| fL/fS | 1.03 | Dr1r4/Dr5rL | 0.83 |
| fG1/fG2 | −0.76 | CT3/T34 | 0.49 |
| fL/BLL | 1.13 | CT1/(CT4 + CT5) | 1.62 |
| fS/BLS | 1.11 | V1/V2 | 1.09 |
| TDL/TDS | 0.98 | V2/V4 | 2.38 |
| FnoL/FnoS | 0.99 | Y1R1/YNR2 | 1.40 |
| TL/ImgH | 6.40 | ImgH/Y1R1 | 1.08 |
| TL/fL | 1.21 | \|Sag3R1/Sag3R2\| | 0.62 |

Please be noted that in this embodiment, Dr5rL is an axial distance between the object-side surface of the third lens element E3 and the image-side surface of the fifth lens element E5, and YNR2 is a maximum effective radius of the image-side surface of the fifth lens element E5.

3rd Embodiment

Figure 7:
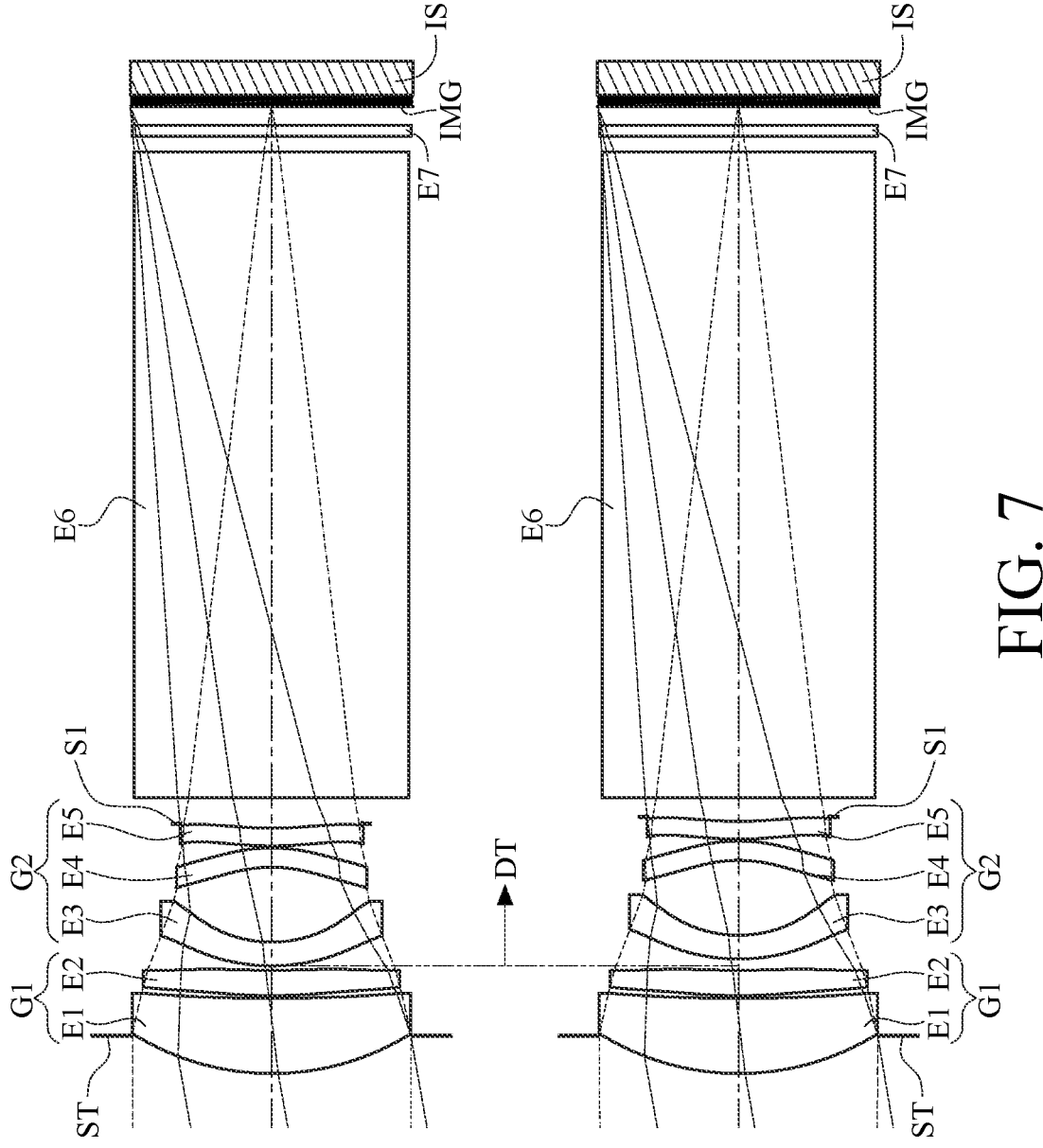
FIG. 7 is a schematic view of an image capturing unit respectively corresponding to an infinite object distance and a short object distance according to the 3rd embodiment of the present disclosure.
Figure 8:
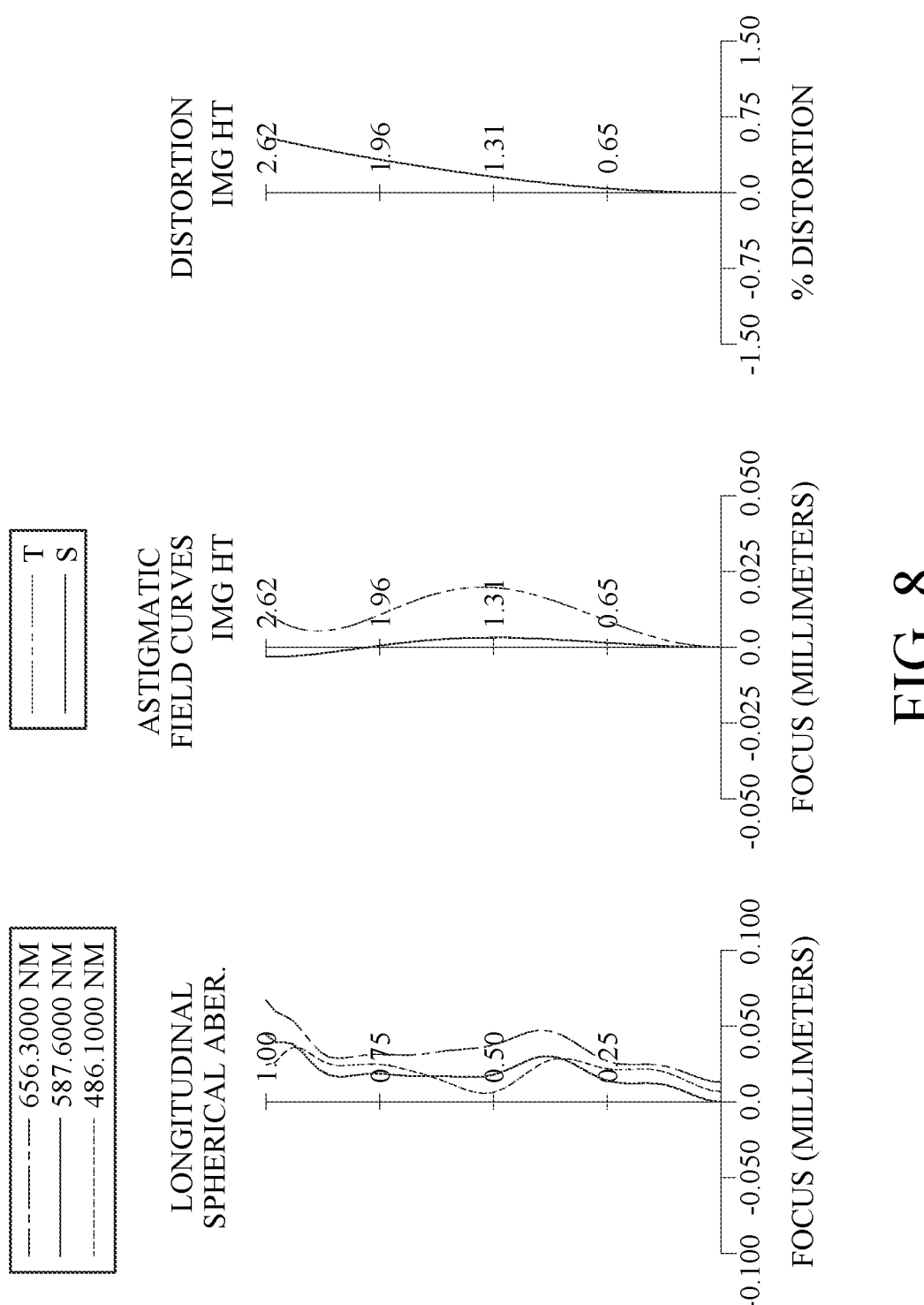
FIG. 8 shows spherical aberration curves, astigmatic field curves and a distortion curve of the image capturing unit corresponding to the infinite object distance according to the 3rd embodiment.
Figure 9:
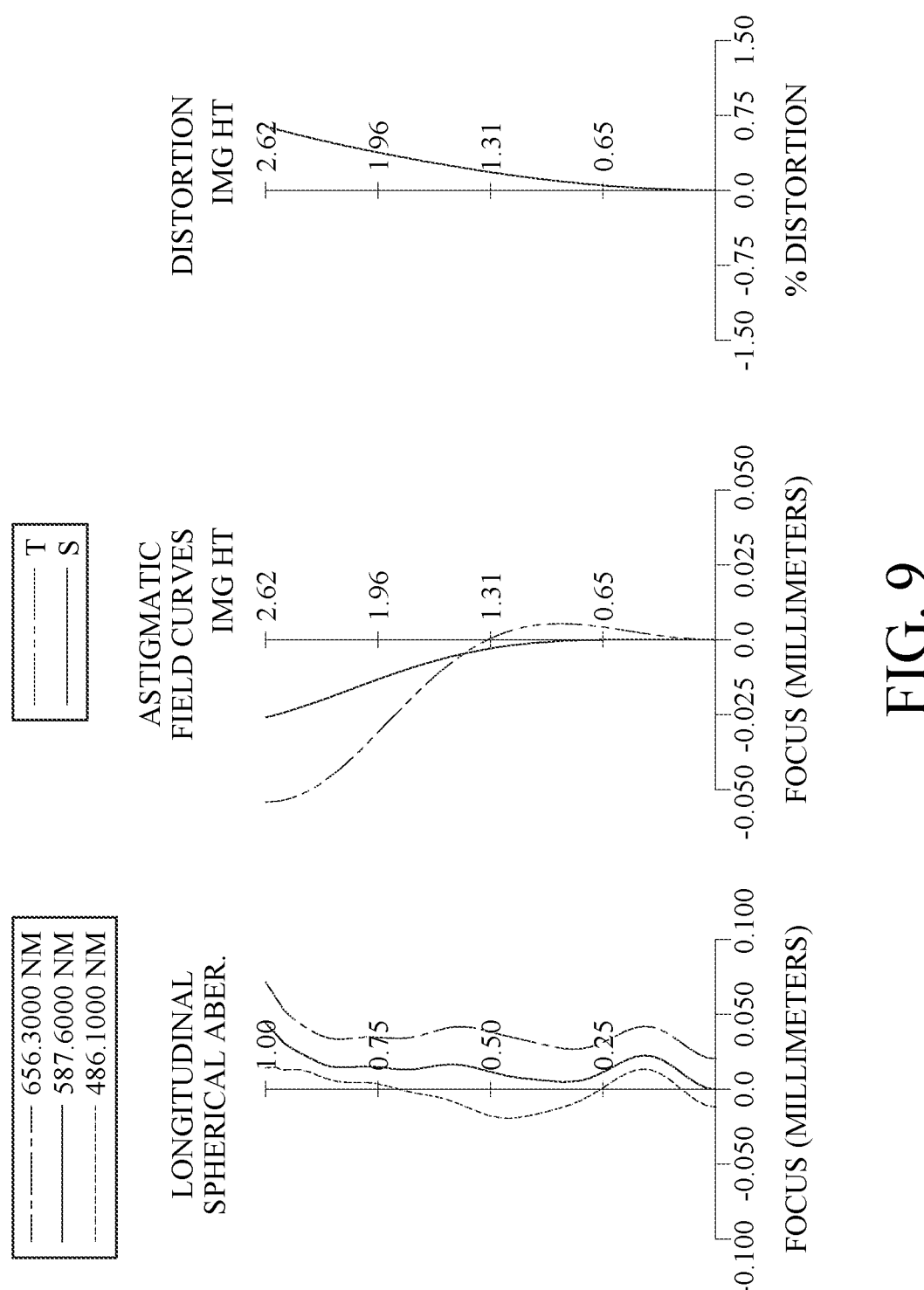
FIG. 9 shows spherical aberration curves, astigmatic field curves and a distortion curve of the image capturing unit corresponding to the short object distance according to the 3rd embodiment.

FIG. 7 is a schematic view of an image capturing unit respectively at the first state (corresponding to an infinite object distance) and the second state (corresponding to a short object distance) according to the 3rd embodiment of the present disclosure. FIG. 8 shows, in order from left to right, spherical aberration curves, astigmatic field curves and a distortion curve of the image capturing unit at the first state according to the 3rd embodiment. FIG. 9 shows, in order from left to right, spherical aberration curves, astigmatic field curves and a distortion curve of the image capturing unit at the second state according to the 3rd embodiment. The upper part of FIG. 7 shows the photographing lens assembly at the first state, and the lower part of FIG. 7 shows the photographing lens assembly at the second state. In FIG. 7, the image capturing unit 3 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 7, the second lens group G2 moves relative to the first lens group G1 along an optical axis in the movement focus process. Furthermore, through the movement focus process, the photographing lens assembly has a first state as shown in the upper part of FIG. 7 and a second state as shown in the lower part of FIG. 7. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points.

paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The reflective element E6 is made of glass material and is a prism which provides an optical path folding function. For simplicity, the light-folding effect generated by the reflective element E6 in FIG. 7 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 3rd embodiment are shown in Table 3A and Table 3B, and the aspheric surface data are shown in Table 3C below.

TABLE 3A

3rd Embodiment

| Surface # | | Curvature Radius | Thickness | Material | Index | Abbe # | Focal Length |
|---|---|---|---|---|---|---|---|
| 0 | Object | Plano | D0 | | | | |
| 1 | Ape. Stop | Plano | −0.701 | | | | |
| 2 | Lens 1 | 4.8703 (SPH) | 1.400 | Glass | 1.589 | 61.3 | 9.65 |
| 3 | | 30.2964 (SPH) | 0.050 | | | | |
| 4 | Lens 2 | 9.3316 (ASP) | 0.474 | Plastic | 1.639 | 23.5 | 23.04 |
| 5 | | 25.0000 (ASP) | D1 | | | | |
| 6 | Lens 3 | 3.3747 (ASP) | 0.441 | Plastic | 1.669 | 19.5 | −11.05 |
| 7 | | 2.1958 (ASP) | 1.392 | | | | |
| 8 | Lens 4 | −2.7164 (ASP) | 0.359 | Plastic | 1.697 | 16.3 | −34.55 |
| 9 | | −3.2279 (ASP) | 0.035 | | | | |
| 10 | Lens 5 | 6.9054 (ASP) | 0.332 | Plastic | 1.566 | 37.4 | 64.42 |
| 11 | | 8.3706 (ASP) | 0.083 | | | | |
| 12 | Stop | Plano | D2 | | | | |
| 13 | Reflective element | Plano | 12.000 | Glass | 1.516 | 64.1 | — |
| 14 | | Plano | 0.284 | | | | |
| 15 | Filter | Plano | 0.210 | Glass | 1.516 | 64.1 | — |
| 16 | | Plano | 0.346 | | | | |
| 17 | Image | Plano | — | | | | |

Note:
Reference wavelength is 587.6 nm (d-line).
An effective radius of the stop S1 (Surface 12) is 1.70 mm.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points.

The fifth lens element E5 with positive refractive power has an object-side surface being convex in a paraxial region thereof and an image-side surface being concave in a

TABLE 3B

Optical data for photographing lens assembly with infinite object distance and short object distance

| | Infinite object distance (First state) | | Short object distance (Second state) |
|---|---|---|---|
| fL [mm] | 14.65 | fS [mm] | 14.27 |
| FnoL | 2.84 | FnoS | 2.86 |
| HFOVL [deg.] | 10.1 | HFOVS [deg.] | 10.0 |
| D0 [mm] | ∞ | D0 [mm] | 500.000 |
| D1 [mm] | 0.080 | D1 [mm] | 0.207 |
| D2 [mm] | 0.481 | D2 [mm] | 0.354 |
| TDL [mm] | 4.563 | TDS [mm] | 4.690 |
| BLL [mm] | 13.404 | BLS [mm] | 13.276 |
| fG1 [mm] | 7.00 | fG1 [mm] | 7.00 |
| fG2 [mm] | −9.88 | fG2 [mm] | −9.88 |
| CRAL [deg.] | 12.5 | CRAS [deg.] | 12.5 |

In Table 3B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

TABLE 3C

| | Aspheric Coefficients | | | |
|---|---|---|---|---|
| Surface # | 4 | 5 | 6 | 7 |
| k= | −9.900000E+01 | −9.900000E+01 | −4.194410E+00 | 2.995610E−02 |
| A4= | 2.333051E−02 | 1.845303E−02 | −1.128951E−02 | −5.458655E−02 |
| A6= | −2.775815E−02 | −4.640298E−02 | 2.190283E−02 | 8.139166E−02 |
| A8= | 1.507100E−02 | 4.093130E−02 | −4.781002E−03 | −6.245773E−02 |
| A10= | −4.906261E−03 | −2.236693E−02 | −3.857438E−03 | 3.289447E−02 |
| A12= | 9.953774E−04 | 8.305456E−03 | 2.834883E−03 | −1.498660E−02 |
| A14= | −1.126141E−04 | −2.123291E−03 | −9.405999E−04 | 5.132176E−03 |
| A16= | 2.731522E−06 | 3.674211E−04 | 2.046984E−04 | −1.102093E−03 |
| A18= | 1.015830E−06 | −4.103881E−05 | −3.132179E−05 | 1.325495E−04 |
| A20= | −1.295701E−07 | 2.665564E−06 | 3.005473E−06 | −9.306696E−06 |
| A22= | 5.158314E−09 | −7.633066E−08 | −1.295948E−07 | 4.895452E−07 |
| Surface # | 8 | 9 | 10 | 11 |
| k= | −3.444820E−01 | −3.204980E−01 | −4.614970E+01 | −7.205100E+01 |
| A4= | −5.557933E−02 | −3.082667E−02 | 6.409957E−02 | 5.503956E−02 |
| A6= | 1.988006E−01 | 9.167766E−02 | −1.521007E−01 | −1.089655E−01 |
| A8= | −2.724606E−01 | −1.296677E−01 | 1.004267E−01 | 5.870336E−02 |
| A10= | 2.638160E−01 | 1.564776E−01 | 4.810439E−02 | 4.510236E−02 |
| A12= | −1.801523E−01 | −1.294193E−01 | −1.229189E−01 | −9.046183E−02 |
| A14= | 8.374143E−02 | 6.760885E−02 | 8.952523E−02 | 6.353187E−02 |
| A16= | −2.568517E−02 | −2.197821E−02 | −3.502599E−02 | −2.475268E−02 |
| A18= | 4.976918E−03 | 4.320232E−03 | 7.914900E−03 | 5.651567E−03 |
| A20= | −5.555505E−04 | −4.712053E−04 | −9.760794E−04 | −7.099763E−04 |
| A22= | 2.748694E−05 | 2.197656E−05 | 5.109349E−05 | 3.802237E−05 |

In the 3rd embodiment, the equation of the aspheric surface profiles of the aforementioned lens elements is the same as the equation of the 1st embodiment.

Moreover, these parameters shown in Table 3D can be calculated from Table 3A to Table 3C as the following values and satisfy the following conditions:

TABLE 3D

| | Schematic Parameters | | |
|---|---|---|---|
| fL [mm] | 14.65 | TDL/BLL | 0.34 |
| FnoL | 2.84 | SL/TL | 0.96 |
| HFOVL [deg.] | 10.1 | f1/f2 | 0.42 |
| CRAL [deg.] | 12.5 | f2/f3 | −2.08 |
| fS [mm] | 14.27 | fL/|f45| | 0.19 |
| FnoS | 2.86 | (|f1| + |f3|)/(|f4| + |f5|) | 0.21 |
| HFOVS [deg.] | 10.0 | f3/R5 | −3.28 |
| CRAS [deg.] | 12.5 | R5/R6 | 1.54 |

TABLE 3D-continued

| | Schematic Parameters | | |
|---|---|---|---|
| fG1 [mm] | 7.00 | (R1 − R5)/(R1 + R5) | 0.18 |
| fG2 [mm] | −9.88 | (R5 − R9)/(R5 + R9) | −0.34 |
| fL/fS | 1.03 | Dr1r4/Dr5rL | 0.75 |
| fG1/fG2 | −0.71 | CT3/T34 | 0.32 |
| fL/BLL | 1.09 | CT1/(CT4 + CT5) | 2.03 |
| fS/BLS | 1.07 | V1/V2 | 2.61 |
| TDL/TDS | 0.97 | V2/V4 | 1.44 |
| FnoL/FnoS | 0.99 | Y1R1/YNR2 | 1.52 |
| TL/ImgH | 6.86 | ImgH/Y1R1 | 1.01 |
| TL/fL | 1.23 | |Sag3R1/Sag3R2| | 0.73 |

Please be noted that in this embodiment, Dr5rL is an axial distance between the object-side surface of the third lens element E3 and the image-side surface of the fifth lens element E5, and YNR2 is a maximum effective radius of the image-side surface of the fifth lens element E5.

4th Embodiment

Figure 10:
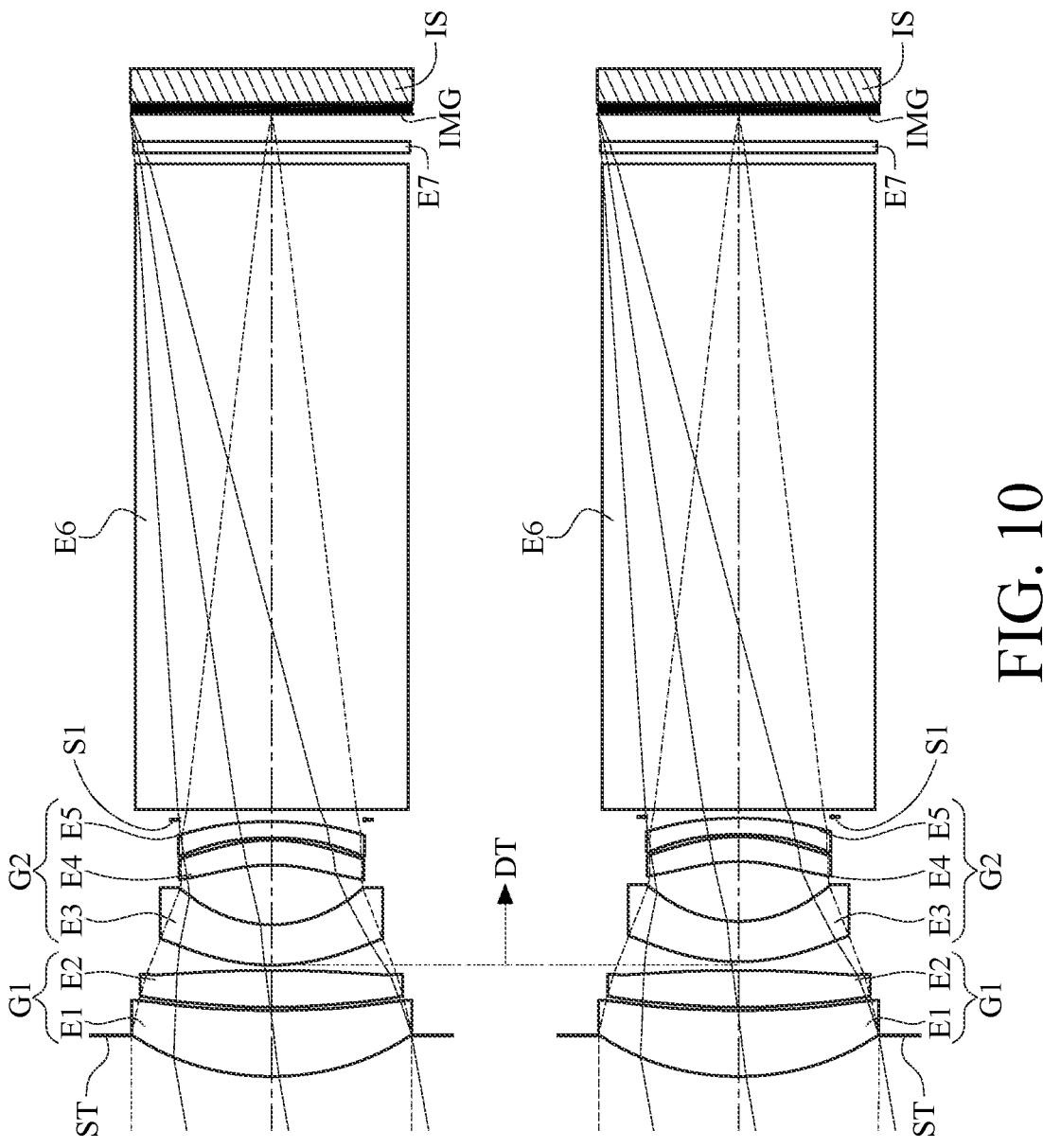
FIG. 10 is a schematic view of an image capturing unit respectively corresponding to an infinite object distance and a short object distance according to the 4th embodiment of the present disclosure.
Figure 11:
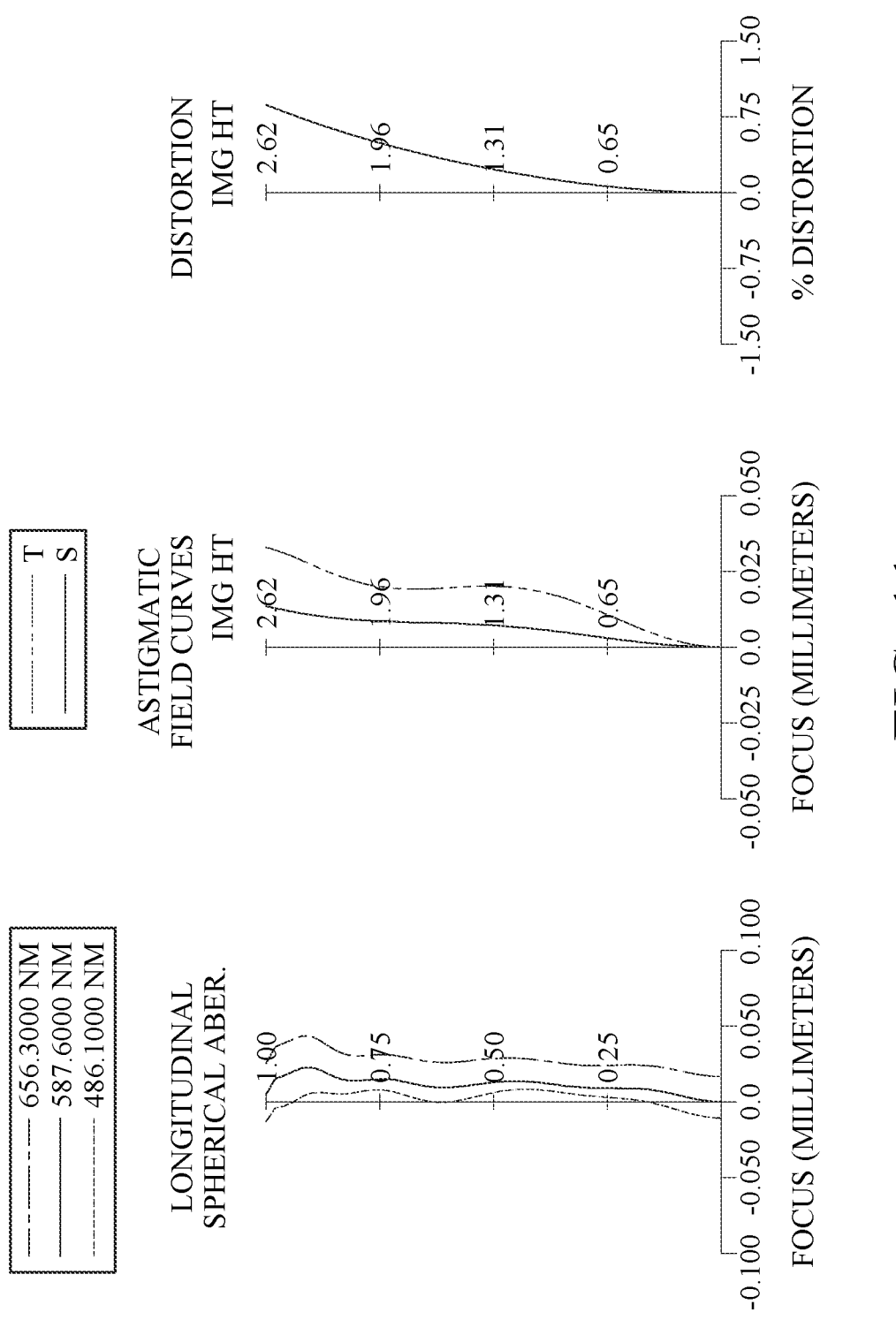
FIG. 11 shows spherical aberration curves, astigmatic field curves and a distortion curve of the image capturing unit corresponding to the infinite object distance according to the 4th embodiment.
Figure 12:
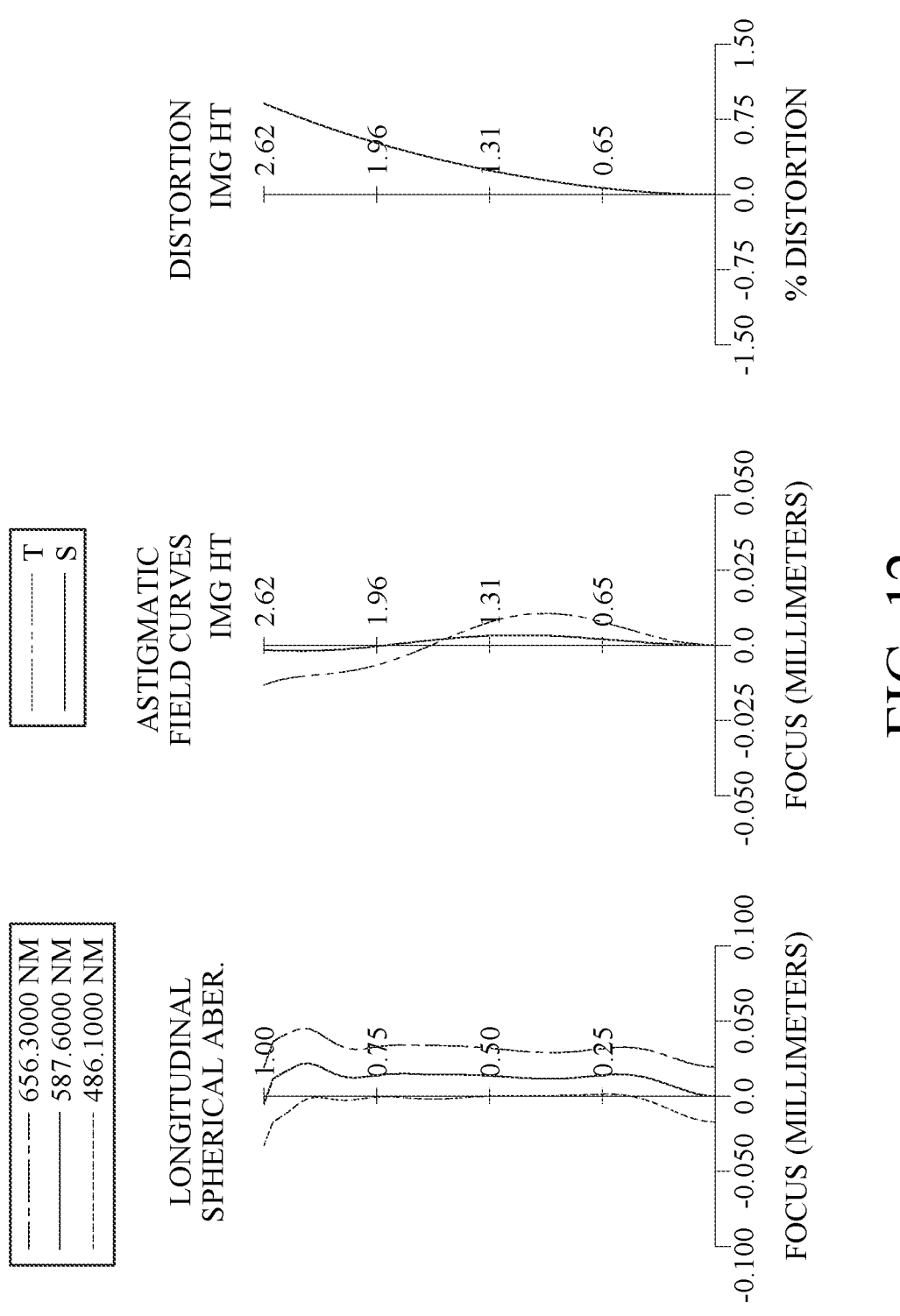
FIG. 12 shows spherical aberration curves, astigmatic field curves and a distortion curve of the image capturing unit corresponding to the short object distance according to the 4th embodiment.

FIG. 10 is a schematic view of an image capturing unit respectively at the first state (corresponding to an infinite object distance) and the second state (corresponding to a short object distance) according to the 4th embodiment of the present disclosure. FIG. 11 shows, in order from left to right, spherical aberration curves, astigmatic field curves and a distortion curve of the image capturing unit at the first state according to the 4th embodiment. FIG. 12 shows, in order from left to right, spherical aberration curves, astigmatic field curves and a distortion curve of the image capturing unit at the second state according to the 4th embodiment. The upper part of FIG. 10 shows the photographing lens assembly at the first state, and the lower part of FIG. 10 shows the photographing lens assembly at the second state. In FIG. 10, the image capturing unit 4 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 10, the second lens group G2 moves relative to the first lens group G1 along an optical axis in the movement focus process. Furthermore, through the movement focus process, the photographing lens assembly has a first state as shown in the upper part of FIG. 10 and a second state as shown in the lower part of FIG. 10. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point. The image-side surface of the first lens element E1 has two inflection points.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The reflective element E6 is made of glass material and is a prism which provides an optical path folding function. For simplicity, the light-folding effect generated by the reflective element E6 in FIG. 10 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 4th embodiment are shown in Table 4A and Table 4B, and the aspheric surface data are shown in Table 4C below.

TABLE 4A

| | | | | | | Abbe | Focal |
|---|---|---|---|---|---|---|---|
| Surface # | | Curvature Radius | | Thickness | Material | Index | # | Length |

4th Embodiment

| Surface # | | Curvature Radius | | Thickness | Material | Index | Abbe # | Focal Length |
|---|---|---|---|---|---|---|---|---|
| 0 | Object | Plano | | D0 | | | | |
| 1 | Ape. Stop | Plano | | −0.760 | | | | |
| 2 | Lens 1 | 4.8886 | (ASP) | 1.226 | Glass | 1.569 | 56.0 | 11.83 |
| 3 | | 16.2523 | (ASP) | 0.061 | | | | |
| 4 | Lens 2 | 13.6334 | (ASP) | 0.682 | Plastic | 1.544 | 56.0 | 14.90 |
| 5 | | −19.6490 | (ASP) | D1 | | | | |
| 6 | Lens 3 | 3.6846 | (ASP) | 0.750 | Plastic | 1.650 | 21.8 | −10.25 |
| 7 | | 2.1819 | (ASP) | 1.109 | | | | |
| 8 | Lens 4 | −3.4703 | (ASP) | 0.462 | Plastic | 1.660 | 20.4 | 37.69 |
| 9 | | −3.2066 | (ASP) | 0.045 | | | | |
| 10 | Lens 5 | −4.8239 | (ASP) | 0.300 | Plastic | 1.639 | 23.5 | −26.43 |
| 11 | | −6.9182 | (ASP) | 0.030 | | | | |
| 12 | Stop | Plano | | D2 | | | | |
| 13 | Reflective element | Plano | | 12.000 | Glass | 1.516 | 64.1 | — |
| 14 | | Plano | | 0.200 | | | | |
| 15 | Filter | Plano | | 0.210 | Glass | 1.516 | 64.1 | — |

TABLE 4A-continued

| | | 4th Embodiment | | | | | |
|---|---|---|---|---|---|---|---|
| Surface # | | Curvature Radius | Thickness | Material | Index | Abbe # | Focal Length |
| 16 | | Plano | 0.512 | | | | |
| 17 | Image | Plano | — | | | | |

Note:
Reference wavelength is 587.6 nm (d-line).
An effective radius of the stop S1 (Surface 12) is 1.72 mm.

TABLE 4B

Optical data for photographing lens assembly with infinite object distance and short object distance

| | Infinite object distance (First state) | | Short object distance (Second state) |
|---|---|---|---|
| fL [mm] | 14.56 | fS [mm] | 14.36 |
| FnoL | 2.80 | FnoS | 2.81 |
| HFOVL [deg.] | 10.1 | HFOVS [deg.] | 10.1 |
| D0 [mm] | ∞ | D0 [mm] | 1000.000 |
| D1 [mm] | 0.100 | D1 [mm] | 0.162 |
| D2 [mm] | 0.190 | D2 [mm] | 0.128 |
| TDL [mm] | 4.735 | TDS [mm] | 4.797 |
| BLL [mm] | 13.142 | BLS [mm] | 13.080 |
| fG1 [mm] | 6.94 | fG1 [mm] | 6.94 |
| fG2 [mm] | −9.46 | fG2 [mm] | −9.46 |
| CRAL [deg.] | 12.7 | CRAS [deg.] | 12.8 |

In Table 4B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

TABLE 4C

| | | Aspheric Coefficients | | |
|---|---|---|---|---|
| Surface # | 2 | 3 | 4 | 5 |
| k= | 2.085340E−01 | 2.015740E+00 | −7.580740E+01 | −5.320880E+01 |
| A4= | −1.800767E−03 | −2.993830E−03 | 1.651688E−02 | 2.193130E−02 |
| A6= | 1.405890E−03 | 1.303673E−03 | −1.576343E−02 | −2.745677E−02 |
| A8= | −3.878407E−04 | −3.953734E−06 | 6.764930E−03 | 1.658994E−02 |
| A10= | 5.284030E−05 | −4.723377E−05 | −1.364872E−03 | −6.201375E−03 |
| A12= | −2.921874E−06 | 4.171793E−06 | 8.630246E−05 | 1.655523E−03 |
| A14= | — | — | 1.309035E−05 | −3.505912E−04 |
| A16= | — | — | −2.521577E−06 | 5.997124E−05 |
| A18= | — | — | 1.256354E−07 | −7.448016E−06 |
| A20= | — | — | — | 5.603643E−07 |
| A22= | — | — | — | −1.846108E−08 |

| Surface # | 6 | 7 | 8 | 9 |
|---|---|---|---|---|
| k= | −6.009080E+00 | 3.957000E−02 | 9.509050E−02 | −1.323770E−01 |
| A4= | −1.402261E−03 | −4.419730E−02 | −1.253869E−02 | 3.077429E−02 |
| A6= | 6.873956E−03 | 4.829912E−02 | 7.146940E−02 | −3.316815E−02 |
| A8= | −7.489700E−04 | −3.364253E−02 | −7.484514E−02 | 3.818076E−02 |
| A10= | −3.547622E−03 | 1.101365E−02 | 4.693045E−02 | −3.398496E−02 |
| A12= | 3.437091E−03 | −2.674388E−04 | −1.740653E−02 | 2.320197E−02 |
| A14= | −1.719362E−03 | −1.146996E−03 | 3.583640E−03 | −1.004243E−02 |
| A16= | 5.196689E−04 | 3.881014E−04 | −3.825068E−04 | 2.404031E−03 |
| A18= | −9.444685E−05 | −4.726434E−05 | 2.717016E−05 | −2.763563E−04 |
| A20= | 9.481954E−06 | 1.190802E−06 | −2.516782E−06 | 1.069182E−05 |
| A22= | −4.040152E−07 | — | — | — |

| Surface # | 10 | 11 |
|---|---|---|
| k= | −1.197210E−01 | 1.491120E+00 |
| A4= | 5.354448E−02 | 1.550583E−02 |
| A6= | −1.369326E−01 | −5.296747E−02 |

TABLE 4C-continued

| Aspheric Coefficients | | |
| --- | --- | --- |
| A8= | 1.444862E−01 | 5.728194E−02 |
| A10= | −9.526059E−02 | −3.605648E−02 |
| A12= | 4.329129E−02 | 1.452559E−02 |
| A14= | −1.298077E−02 | −3.661620E−03 |
| A16= | 2.238565E−03 | 5.239618E−04 |
| A18= | −1.639116E−04 | −3.233700E−05 |

In the 4th embodiment, the equation of the aspheric surface profiles of the aforementioned lens elements is the same as the equation of the 1st embodiment.

Moreover, these parameters shown in Table 4D can be calculated from Table 4A to Table 4C as the following values and satisfy the following conditions:

TABLE 4D

| Schematic Parameters | | | |
| --- | --- | --- | --- |
| fL [mm] | 14.56 | TDL/BLL | 0.36 |
| FnoL | 2.80 | SL/TL | 0.96 |
| HFOVL [deg.] | 10.1 | f1/f2 | 0.79 |
| CRAL [deg.] | 12.7 | f2/f3 | −1.45 |
| fS [mm] | 14.36 | fL/|f45| | 0.20 |
| FnoS | 2.81 | (|f1| + |f3|)/(|f4| + |f5|) | 0.34 |
| HFOVS [deg.] | 10.1 | f3/R5 | −2.78 |
| CRAS [deg.] | 12.8 | R5/R6 | 1.69 |
| fG1 [mm] | 6.94 | (R1 — R5)/(R1 + R5) | 0.14 |
| fG2 [mm] | −9.46 | (R5 — R9)/(R5 + R9) | −7.47 |
| fL/fS | 1.01 | Dr1r4/Dr5rL | 0.74 |
| fG1/fG2 | −0.73 | CT3/T34 | 0.68 |
| fL/BLL | 1.11 | CT1/(CT4 + CT5) | 1.61 |
| fS/BLS | 1.10 | V1/V2 | 1.00 |
| TDL/TDS | 0.99 | V2/V4 | 2.74 |
| FnoL/FnoS | 1.00 | Y1R1/YNR2 | 1.48 |
| TL/ImgH | 6.83 | ImgH/Y1R1 | 1.01 |
| TL/fL | 1.23 | |Sag3R1/Sag3R2| | 0.70 |

Please be noted that in this embodiment, Dr5rL is an axial distance between the object-side surface of the third lens element E3 and the image-side surface of the fifth lens element E5, and YNR2 is a maximum effective radius of the image-side surface of the fifth lens element E5.

5th Embodiment

Figure 13:
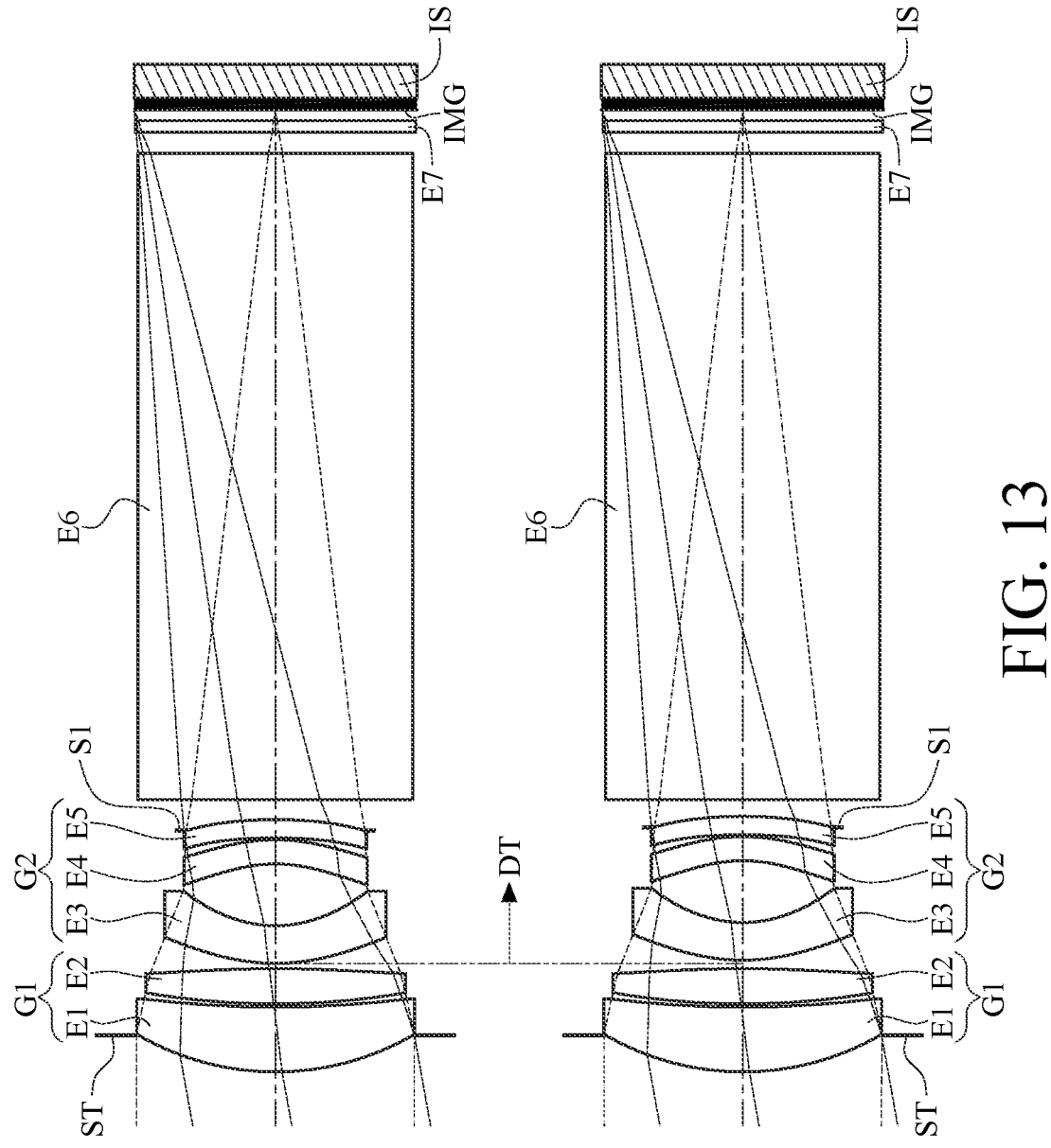
FIG. 13 is a schematic view of an image capturing unit respectively corresponding to an infinite object distance and a short object distance according to the 5th embodiment of the present disclosure.
Figure 14:
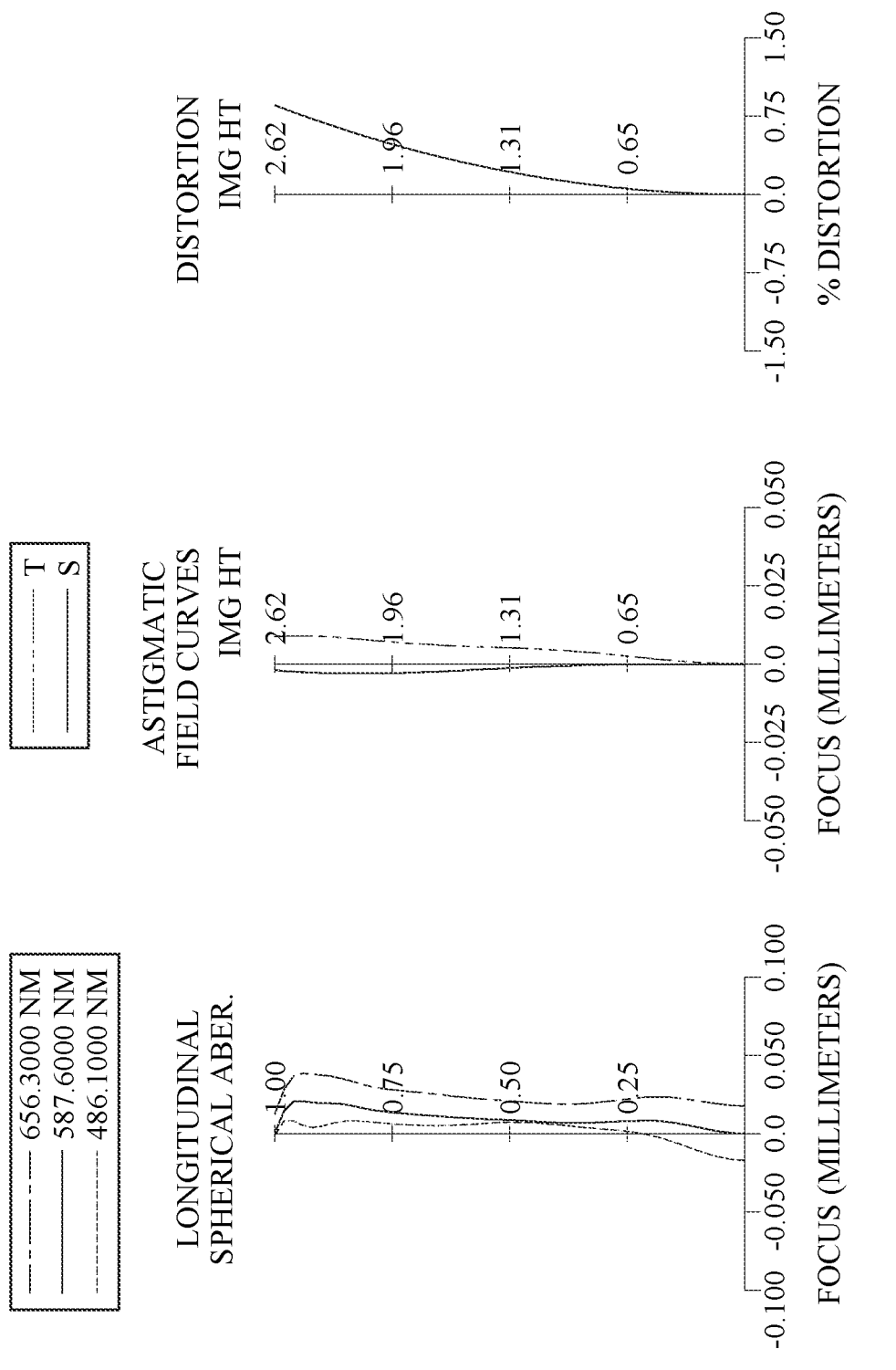
FIG. 14 shows spherical aberration curves, astigmatic field curves and a distortion curve of the image capturing unit corresponding to the infinite object distance according to the 5th embodiment.
Figure 15:
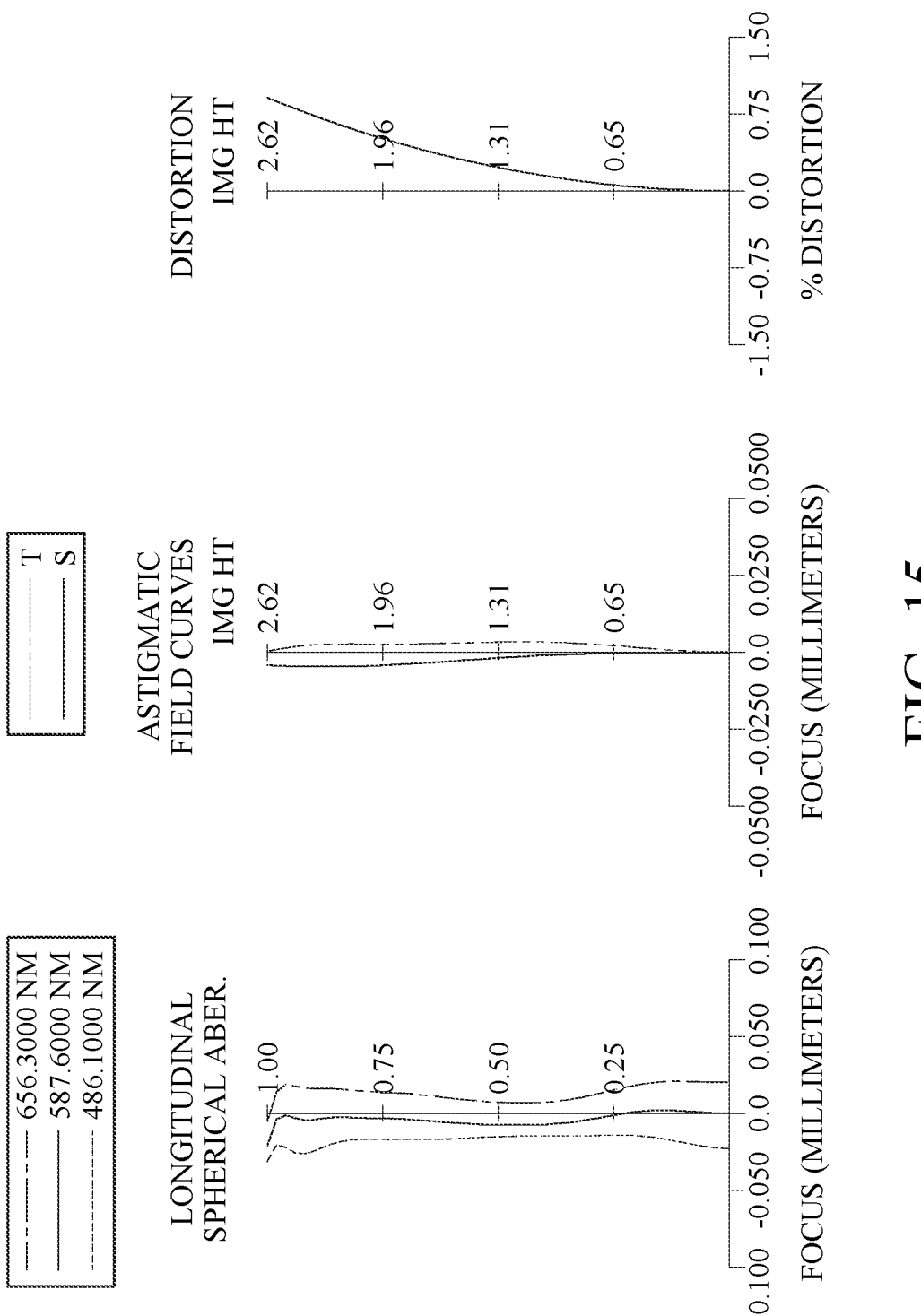
FIG. 15 shows spherical aberration curves, astigmatic field curves and a distortion curve of the image capturing unit corresponding to the short object distance according to the 5th embodiment.

FIG. 13 is a schematic view of an image capturing unit respectively at the first state (corresponding to an infinite object distance) and the second state (corresponding to a short object distance) according to the 5th embodiment of the present disclosure. FIG. 14 shows, in order from left to right, spherical aberration curves, astigmatic field curves and a distortion curve of the image capturing unit at the first state according to the 5th embodiment. FIG. 15 shows, in order from left to right, spherical aberration curves, astigmatic field curves and a distortion curve of the image capturing unit at the second state according to the 5th embodiment. The upper part of FIG. 13 shows the photographing lens assembly at the first state, and the lower part of FIG. 13 shows the photographing lens assembly at the second state. In FIG. 13, the image capturing unit 5 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 13, the second lens group G2 moves relative to the first lens group G1 along an optical axis in the movement focus process. Furthermore, through the movement focus process, the photographing lens assembly has a first state as shown in the upper part of FIG. 13 and a second state as shown in the lower part of FIG. 13. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point. The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The reflective element E6 is made of glass material and is a prism which provides an optical path folding function. For simplicity, the light-folding effect generated by the reflective element E6 in FIG. 13 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 5th embodiment are shown in Table 5A and Table 5B, and the aspheric surface data are shown in Table 5C below.

TABLE 5A

| | 5th Embodiment | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Ape. Stop | Plano | | −0.685 | | | | |
| 2 | Lens 1 | 5.0925 | (SPH) | 1.206 | Glass | 1.589 | 61.3 | 11.33 |
| 3 | | 19.6154 | (SPH) | 0.060 | | | | |
| 4 | Lens 2 | 14.2560 | (ASP) | 0.653 | Plastic | 1.545 | 56.1 | 16.62 |
| 5 | | −24.4358 | (ASP) | D1 | | | | |
| 6 | Lens 3 | 3.6157 | (ASP) | 0.700 | Plastic | 1.614 | 25.6 | −11.62 |
| 7 | | 2.2227 | (ASP) | 1.146 | | | | |
| 8 | Lens 4 | −2.8080 | (ASP) | 0.450 | Plastic | 1.639 | 23.5 | −34.17 |
| 9 | | −3.4240 | (ASP) | 0.035 | | | | |
| 10 | Lens 5 | −8.7864 | (ASP) | 0.341 | Plastic | 1.544 | 56.0 | 101.75 |
| 11 | | −7.6865 | (ASP) | −0.210 | | | | |
| 12 | Stop | Plano | | D2 | | | | |
| 13 | Reflective element | Plano | | 12.000 | Glass | 1.516 | 64.1 | — |
| 14 | | Plano | | 0.400 | | | | |
| 15 | Filter | Plano | | 0.210 | Glass | 1.516 | 64.1 | — |
| 16 | | Plano | | 0.205 | | | | |
| 17 | Image | Plano | | — | | | | |

Note:
Reference wavelength is 587.6 nm (d-line).
An effective radius of the stop S1 (Surface 12) is 1.70 mm.

TABLE 5B

| Optical data for photographing lens assembly with infinite object distance and short object distance | | | |
|---|---|---|---|
| | Infinite object distance (First state) | | Short object distance (Second state) |
| fL [mm] | 14.42 | fS [mm] | 14.25 |
| FnoL | 2.80 | FnoS | 2.82 |
| HFOVL [deg.] | 10.2 | HFOVS [deg.] | 10.2 |
| D0 [mm] | ∞ | D0 [mm] | 1000.000 |
| D1 [mm] | 0.100 | D1 [mm] | 0.160 |
| D2 [mm] | 0.580 | D2 [mm] | 0.520 |
| TDL [mm] | 4.691 | TDS [mm] | 4.751 |
| BLL [mm] | 13.185 | BLS [mm] | 13.125 |
| fG1 [mm] | 7.04 | fG1 [mm] | 7.04 |
| fG2 [mm] | −10.11 | fG2 [mm] | −10.11 |
| CRAL [deg.] | 12.6 | CRAS [deg.] | 12.6 |

In Table 5B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

TABLE 5C

| Aspheric Coefficients | | | | |
|---|---|---|---|---|
| Surface # | 4 | 5 | 6 | 7 |
| k= | −5.992330E+01 | 0.000000E+00 | −6.635620E+00 | 0.000000E+00 |
| A4= | 4.557444E−03 | −3.024540E−04 | 1.329406E−03 | −2.453705E−02 |
| A6= | −1.093848E−03 | 3.176843E−03 | 3.844267E−03 | 6.576135E−03 |
| A8= | −2.605862E−04 | −4.082573E−03 | −3.339118E−03 | −5.709058E−04 |
| A10= | 3.064640E−04 | 2.793255E−03 | 2.109375E−03 | −1.199072E−03 |
| A12= | −1.088735E−04 | −1.173962E−03 | −9.584756E−04 | 6.527130E−04 |
| A14= | 2.068412E−05 | 3.204864E−04 | 2.931731E−04 | −1.074187E−04 |
| A16= | −2.086803E−06 | −5.704909E−05 | −5.989941E−05 | −4.056640E−05 |
| A18= | 8.747174E−08 | 6.401295E−06 | 7.777223E−06 | 1.502016E−05 |
| A20= | — | −4.128833E−07 | −5.506651E−07 | −9.876196E−07 |
| A22= | | 1.176086E−08 | 1.418697E−08 | — |
| Surface # | 8 | 9 | 10 | 11 |
| k= | 0.000000E+00 | 0.000000E+00 | 0.000000E+00 | 0.000000E+00 |
| A4= | 9.037574E−03 | 1.541667E−02 | 1.369281E−02 | 4.795040E−03 |
| A6= | 1.695801E−02 | −4.091291E−03 | −2.703164E−02 | −9.457036E−03 |
| A8= | −8.468806E−03 | 1.051471E−02 | 2.448529E−02 | 6.932902E−03 |
| A10= | 2.187510E−03 | −1.481273E−02 | −2.403890E−02 | −6.737858E−03 |
| A12= | −4.839025E−04 | 1.162857E−02 | 1.765526E−02 | 4.956798E−03 |
| A14= | 5.324972E−04 | −4.854893E−03 | −7.282460E−03 | −1.960396E−03 |
| A16= | −4.067311E−04 | 9.758980E−04 | 1.506429E−03 | 3.817319E−04 |
| A18= | 1.233310E−04 | −6.512495E−05 | −1.222832E−04 | −2.905865E−05 |
| A20= | −1.280058E−05 | −2.228947E−06 | — | — |

In the 5th embodiment, the equation of the aspheric surface profiles of the aforementioned lens elements is the same as the equation of the 1st embodiment.

Moreover, these parameters shown in Table 5D can be calculated from Table 5A to Table 5C as the following values and satisfy the following conditions:

TABLE 5D

| Schematic Parameters | | | |
|---|---|---|---|
| fL [mm] | 14.42 | TDL/BLL | 0.36 |
| FnoL | 2.80 | SL/TL | 0.96 |
| HFOVL [deg.] | 10.2 | f1/f2 | 0.68 |
| CRAL [deg.] | 12.6 | f2/f3 | −1.43 |
| fS [mm] | 14.25 | fL/|f45| | 0.26 |
| FnoS | 2.82 | (|f1| + |f3|)/(|f4| + |f5|) | 0.17 |
| HFOVS [deg.] | 10.2 | f3/R5 | −3.21 |
| CRAS [deg.] | 12.6 | R5/R6 | 1.63 |
| fG1 [mm] | 7.04 | (R1 − R5)/(R1 + R5) | 0.17 |
| fG2 [mm] | −10.11 | (R5 − R9)/(R5 + R9) | −2.40 |
| fL/fS | 1.01 | Dr1r4/Dr5rL | 0.72 |
| fG1/fG2 | −0.70 | CT3/T34 | 0.61 |
| fL/BLL | 1.09 | CT1/(CT4 + CT5) | 1.52 |
| fS/BLS | 1.09 | V1/V2 | 1.09 |
| TDL/TDS | 0.99 | V2/V4 | 2.39 |
| FnoL/FnoS | 0.99 | Y1R1/YNR2 | 1.52 |
| TL/ImgH | 6.82 | ImgH/Y1R1 | 1.02 |
| TL/fL | 1.24 | |Sag3R1/Sag3R2| | 0.74 |

Please be noted that in this embodiment, Dr5rL is an axial distance between the object-side surface of the third lens element E3 and the image-side surface of the fifth lens element E5, and YNR2 is a maximum effective radius of the image-side surface of the fifth lens element E5.

6th Embodiment

Figure 16:
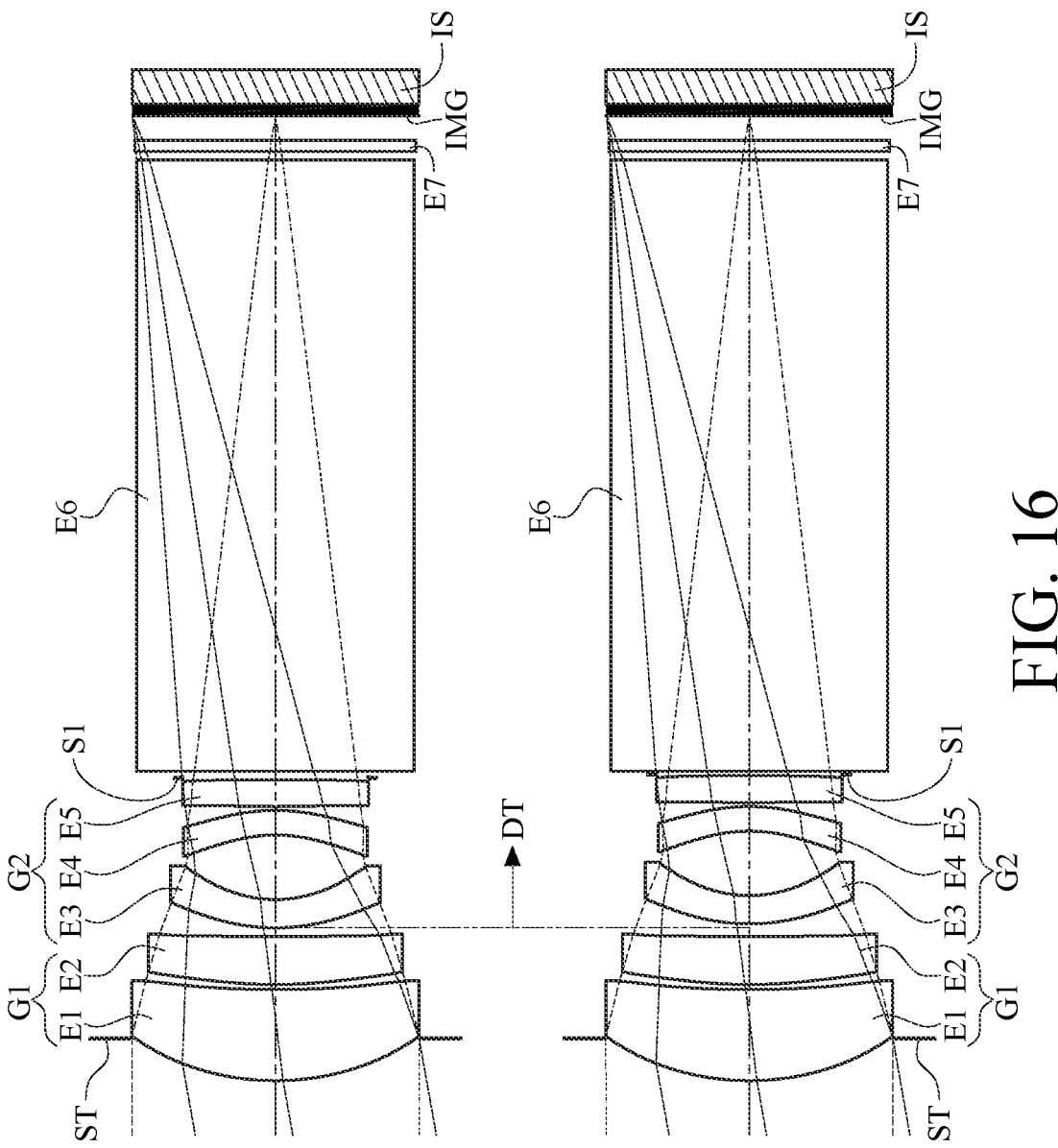
FIG. 16 is a schematic view of an image capturing unit respectively corresponding to an infinite object distance and a short object distance according to the 6th embodiment of the present disclosure.
Figure 17:
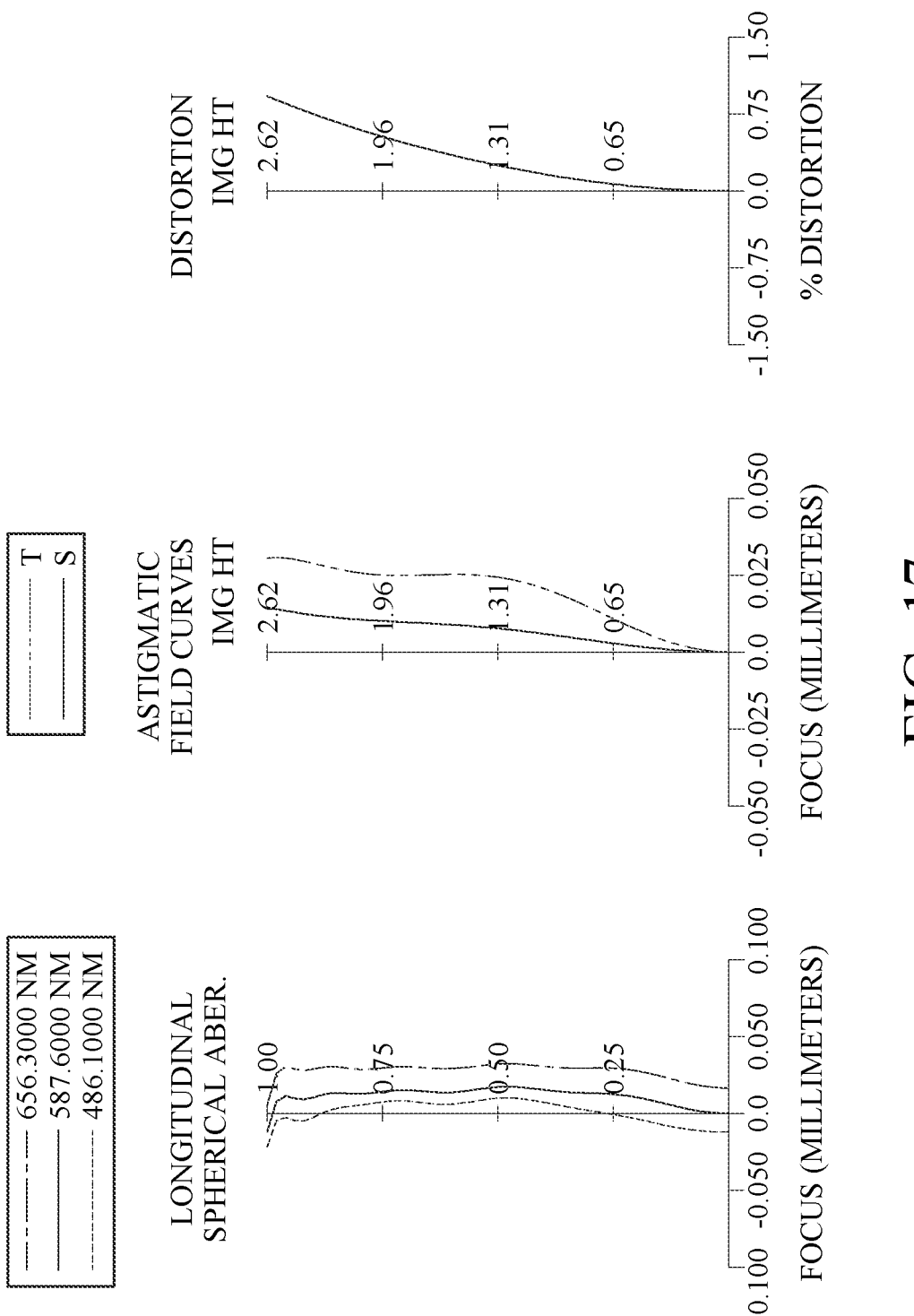
FIG. 17 shows spherical aberration curves, astigmatic field curves and a distortion curve of the image capturing unit corresponding to the infinite object distance according to the 6th embodiment.
Figure 18:
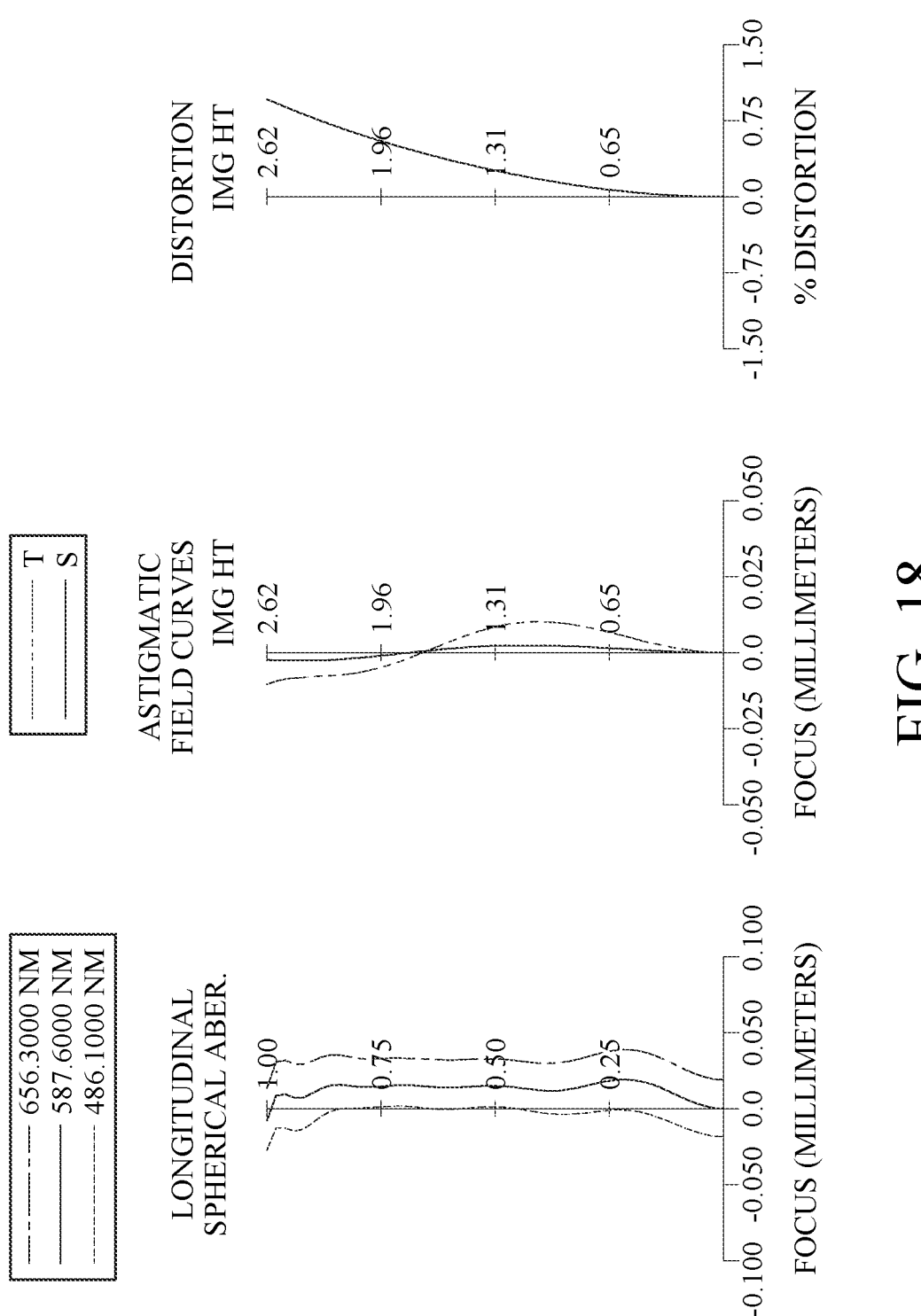
FIG. 18 shows spherical aberration curves, astigmatic field curves and a distortion curve of the image capturing unit corresponding to the short object distance according to the 6th embodiment.

FIG. 16 is a schematic view of an image capturing unit respectively at the first state (corresponding to an infinite object distance) and the second state (corresponding to a short object distance) according to the 6th embodiment of the present disclosure. FIG. 17 shows, in order from left to right, spherical aberration curves, astigmatic field curves and a distortion curve of the image capturing unit at the first state according to the 6th embodiment. FIG. 18 shows, in order from left to right, spherical aberration curves, astigmatic field curves and a distortion curve of the image capturing unit at the second state according to the 6th embodiment. The upper part of FIG. 16 shows the photographing lens assembly at the first state, and the lower part of FIG. 16 shows the photographing lens assembly at the second state. In FIG. 16, the image capturing unit 6 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 16, the second lens group G2 moves relative to the first lens group G1 along an optical axis in the movement focus process. Furthermore, through the movement focus process, the photographing lens assembly has a first state as shown in the upper part of FIG. 16 and a second state as shown in the lower part of FIG. 16. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The image-side surface of the second lens element E2 has two inflection points.

surface of the fifth lens element E5 has two inflection points. The image-side surface of the fifth lens element E5 has one inflection point.

The reflective element E6 is made of glass material and is a prism which provides an optical path folding function. For simplicity, the light-folding effect generated by the reflective element E6 in FIG. 16 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 6th embodiment are shown in Table 6A and Table 6B, and the aspheric surface data are shown in Table 6C below.

TABLE 6A

| | | | | | | Abbe | Focal |
|---|---|---|---|---|---|---|---|
| Surface # | | Curvature Radius | Thickness | Material | Index | # | Length |
| | | 6th Embodiment | | | | | |
| 0 | Object | Plano | D0 | | | | |
| 1 | Ape. Stop | Plano | −0.772 | | | | |
| 2 | Lens 1 | 4.8391 (ASP) | 1.668 | Glass | 1.589 | 61.3 | 10.96 |
| 3 | | 16.8309 (ASP) | 0.093 | | | | |
| 4 | Lens 2 | 9.2142 (ASP) | 0.874 | Plastic | 1.544 | 56.0 | 19.25 |
| 5 | | 74.0741 (ASP) | D1 | | | | |
| 6 | Lens 3 | 3.4939 (ASP) | 0.519 | Plastic | 1.639 | 23.5 | −11.05 |
| 7 | | 2.2016 (ASP) | 1.182 | | | | |
| 8 | Lens 4 | −2.7947 (ASP) | 0.451 | Plastic | 1.669 | 19.5 | −29.70 |
| 9 | | −3.4624 (ASP) | 0.070 | | | | |
| 10 | Lens 5 | 29.5035 (ASP) | 0.489 | Plastic | 1.669 | 19.5 | 47.00 |
| 11 | | 475.2740 (ASP) | 0.030 | | | | |
| 12 | Stop | Plano | D2 | | | | |
| 13 | Reflective element | Plano | 11.200 | Glass | 1.516 | 64.1 | — |
| 14 | | Plano | 0.150 | | | | |
| 15 | Filter | Plano | 0.210 | Glass | 1.516 | 64.1 | — |
| 16 | | Plano | 0.447 | | | | |
| 17 | Image | Plano | — | | | | |

Note:
Reference wavelength is 587.6 nm (d-line).
An effective radius of the stop S1 (Surface 12) is 1.71 mm.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side

TABLE 6B

| Optical data for photographing lens assembly with infinite object distance and short object distance | | | |
|---|---|---|---|
| | Infinite object distance (First state) | | Short object distance (Second state) |
| fL [mm] | 14.48 | fS [mm] | 14.29 |
| FnoL | 2.76 | FnoS | 2.77 |
| HFOVL [deg.] | 10.1 | HFOVS [deg.] | 10.1 |
| D0 [mm] | ∞ | D0 [mm] | 1000.000 |
| D1 [mm] | 0.163 | D1 [mm] | 0.235 |
| D2 [mm] | 0.127 | D2 [mm] | 0.055 |
| TDL [mm] | 5.509 | TDS [mm] | 5.581 |
| BLL [mm] | 12.164 | BLS [mm] | 12.092 |
| fG1 [mm] | 7.33 | fG1 [mm] | 7.33 |
| fG2 [mm] | −10.34 | fG2 [mm] | −10.34 |
| CRAL [deg.] | 13.0 | CRAS [deg.] | 13.0 |

In Table 6B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

Moreover, these parameters shown in Table 6D can be calculated from Table 6A to Table 6C as the following values and satisfy the following conditions:

TABLE 6D

| Schematic Parameters | | | |
|---|---|---|---|
| fL [mm] | 14.48 | TDL/BLL | 0.45 |
| FnoL | 2.76 | SL/TL | 0.96 |
| HFOVL [deg.] | 10.1 | f1/f2 | 0.57 |
| CRAL [deg.] | 13.0 | f2/f3 | −1.74 |
| fS [mm] | 14.29 | fL/|f45| | 0.16 |
| FnoS | 2.77 | (|f1| + |f3|)/(|f4| + |f5|) | 0.29 |
| HFOVS [deg.] | 10.1 | f3/R5 | −3.16 |
| CRAS [deg.] | 13.0 | R5/R6 | 1.59 |
| fG1 [mm] | 7.33 | (R1 − R5)/(R1 + R5) | 0.16 |
| fG2 [mm] | −10.34 | (R5 − R9)/(R5 + R9) | −0.79 |
| fL/fS | 1.01 | Dr1r4/Dr5rL | 0.97 |
| fG1/fG2 | −0.71 | CT3/T34 | 0.44 |
| fL/BLL | 1.19 | CT1/(CT4 + CT5) | 1.77 |
| fS/BLS | 1.18 | V1/V2 | 1.09 |
| TDL/TDS | 0.99 | V2/V4 | 2.88 |
| FnoL/FnoS | 1.00 | Y1R1/YNR2 | 1.53 |
| TL/ImgH | 6.75 | ImgH/Y1R1 | 1.00 |
| TL/fL | 1.22 | |Sag3R1/Sag3R2| | 0.74 |

Please be noted that in this embodiment, Dr5rL is an axial distance between the object-side surface of the third lens

TABLE 6C

| Aspheric Coefficients | | | |
|---|---|---|---|
| Surface # | 2 | 3 | 4 | 5 |
|---|---|---|---|---|
| k= | 2.576030E−01 | −8.998940E+00 | −5.822720E+01 | −7.680390E+01 |
| A4= | −5.829926E−04 | −1.692427E−03 | 1.394126E−02 | 2.179123E−02 |
| A6= | 4.841593E−04 | −2.320933E−03 | −1.567584E−02 | −4.590392E−02 |
| A8= | −9.590064E−05 | 3.304509E−03 | 9.580318E−03 | 5.286225E−02 |
| A10= | 9.698017E−06 | −1.447854E−03 | −3.191918E−03 | −4.215090E−02 |
| A12= | −4.473988E−07 | 3.018419E−04 | 5.643943E−04 | 2.425958E−02 |
| A14= | — | −3.099518E−05 | −4.500748E−05 | −1.001363E−02 |
| A16= | — | 1.267370E−06 | 3.086184E−07 | 2.908880E−03 |
| A18= | — | — | 1.096995E−07 | −5.768395E−04 |
| A20= | — | — | — | 7.408528E−05 |
| A22= | — | — | — | −5.545767E−06 |
| A24= | — | — | — | 1.836329E−07 |

| Surface # | 6 | 7 | 8 | 9 |
|---|---|---|---|---|
| k= | −5.489630E+00 | −1.900200E−02 | 8.312440E−02 | −7.683510E−02 |
| A4= | 5.936749E−03 | −3.800674E−02 | −3.870796E−04 | 1.731243E−02 |
| A6= | −2.275979E−02 | 2.093839E−02 | 5.243635E−02 | 9.112727E−03 |
| A8= | 5.099667E−02 | 1.544092E−02 | −5.643813E−02 | −2.802711E−02 |
| A10= | −5.471836E−02 | −4.064257E−02 | 2.837713E−02 | 2.509945E−02 |
| A12= | 3.571788E−02 | 3.431899E−02 | −8.228441E−04 | −7.561054E−03 |
| A14= | −1.529300E−02 | −1.628873E−02 | −6.311065E−03 | −1.329841E−03 |
| A16= | 4.328230E−03 | 4.633745E−03 | 3.131996E−03 | 1.397112E−03 |
| A18= | −7.800331E−04 | −7.439664E−04 | −6.455152E−04 | −3.225482E−04 |
| A20= | 8.097835E−05 | 5.205346E−05 | 5.105245E−05 | 2.547678E−05 |
| A22= | −3.678816E−06 | — | — | — |

| Surface # | 10 | 11 |
|---|---|---|
| k= | 4.769610E+01 | −9.900000E+01 |
| A4= | 1.848862E−02 | 4.298411E−03 |
| A6= | −3.633329E−02 | −1.500591E−02 |
| A8= | 1.137246E−02 | 9.061060E−03 |
| A10= | 1.212053E−02 | −1.637264E−03 |
| A12= | −1.140322E−02 | −2.866463E−04 |
| A14= | 3.836463E−03 | 5.515961E−05 |
| A16= | −5.818087E−04 | 2.879189E−05 |
| A18= | 3.282691E−05 | −5.541907E−06 |

In the 6th embodiment, the equation of the aspheric surface profiles of the aforementioned lens elements is the same as the equation of the 1st embodiment.

element E3 and the image-side surface of the fifth lens element E5, and YNR2 is a maximum effective radius of the image-side surface of the fifth lens element E5.

7th Embodiment

Figure 19:
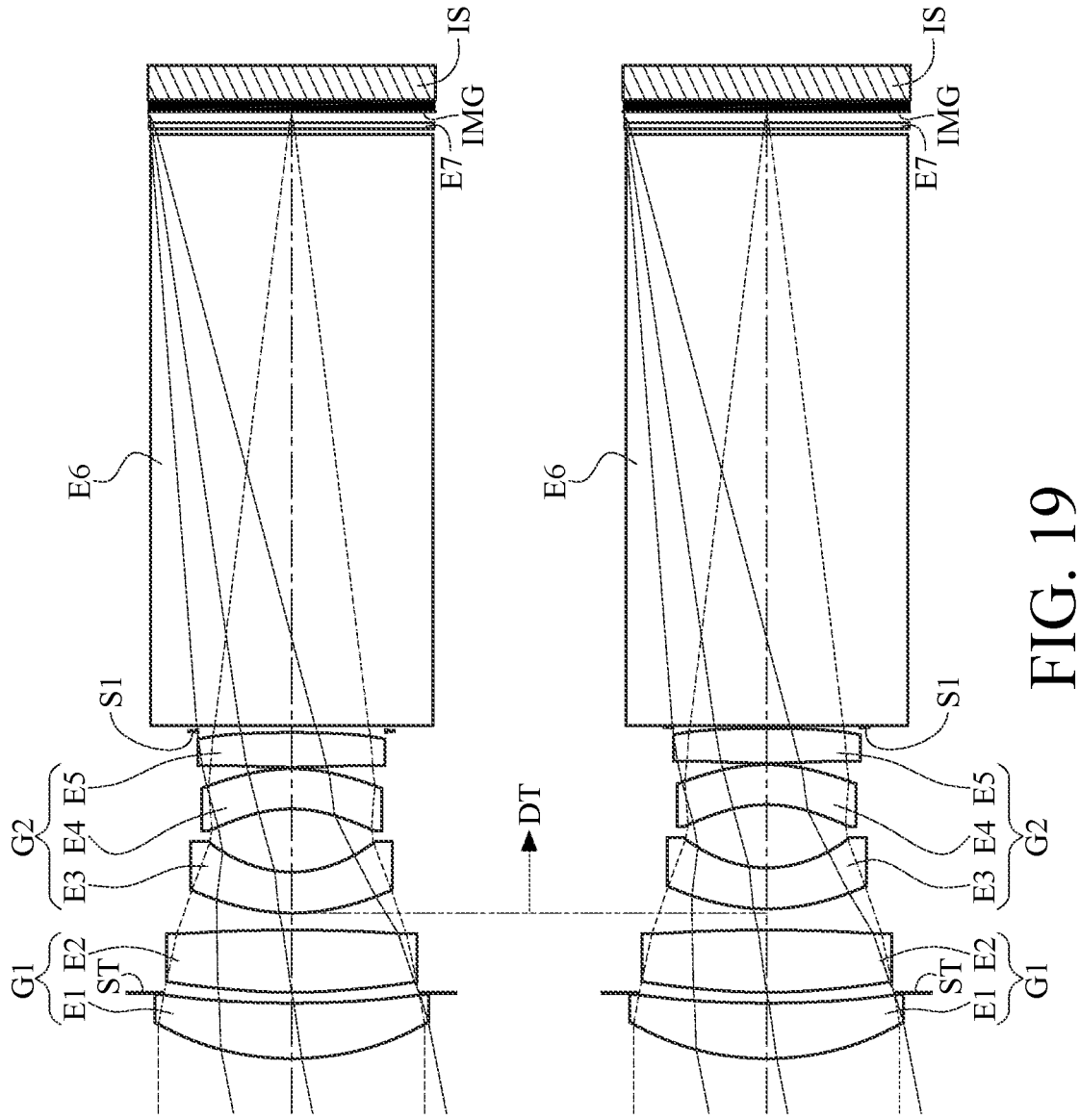
FIG. 19 is a schematic view of an image capturing unit respectively corresponding to an infinite object distance and a short object distance according to the 7th embodiment of the present disclosure.
Figure 20:
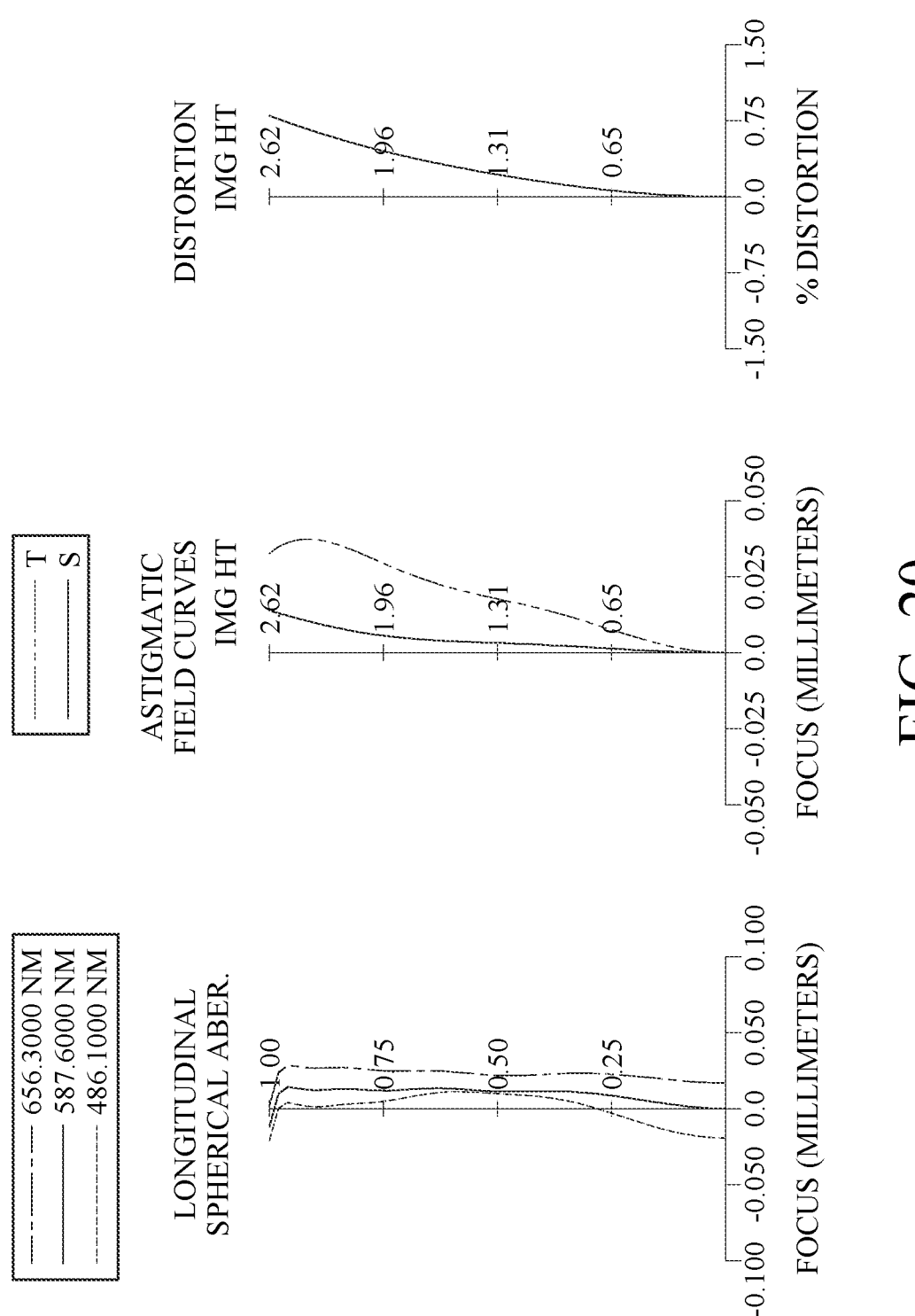
FIG. 20 shows spherical aberration curves, astigmatic field curves and a distortion curve of the image capturing unit corresponding to the infinite object distance according to the 7th embodiment.
Figure 21:
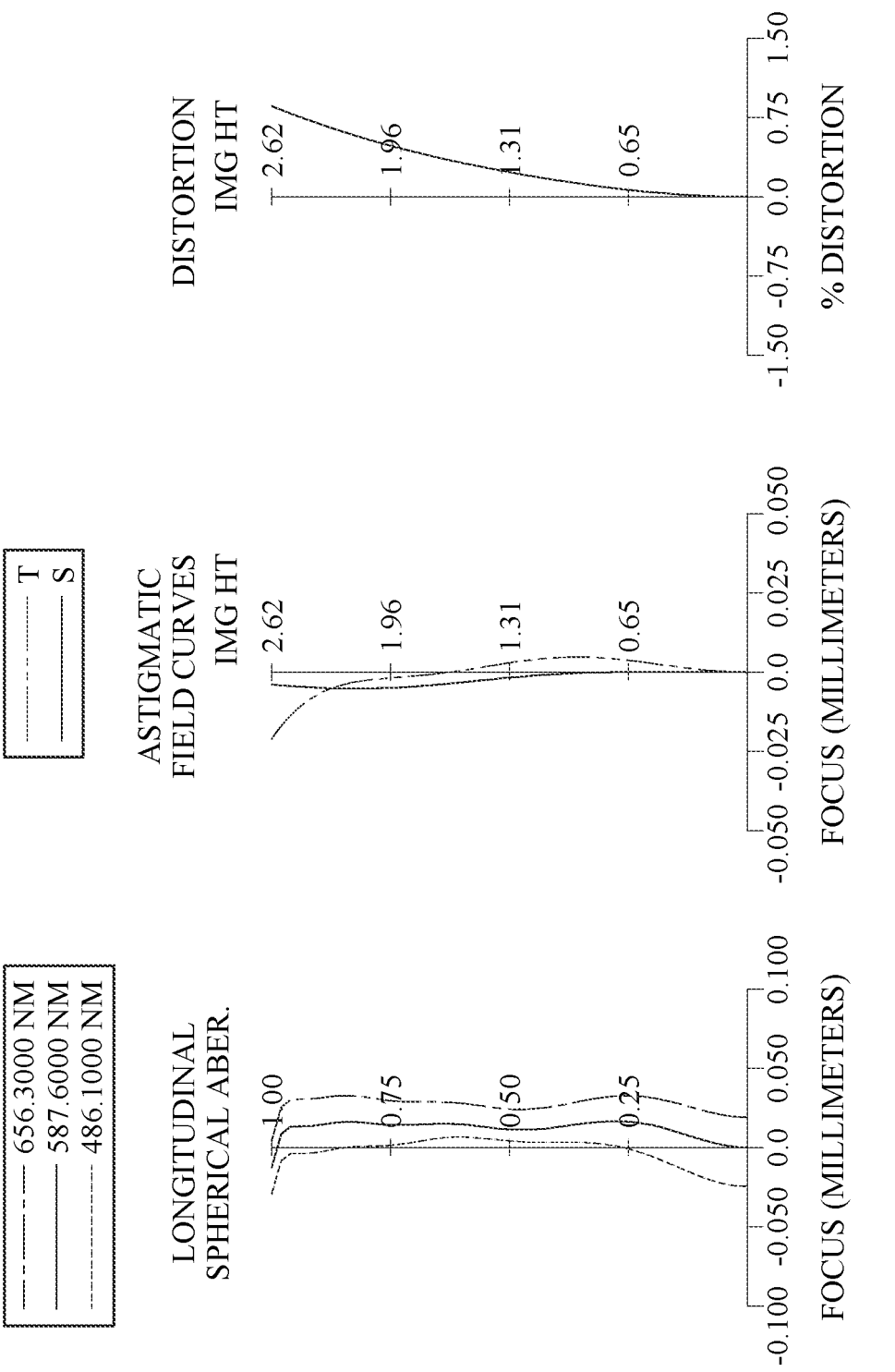
FIG. 21 shows spherical aberration curves, astigmatic field curves and a distortion curve of the image capturing unit corresponding to the short object distance according to the 7th embodiment.

FIG. 19 is a schematic view of an image capturing unit respectively at the first state (corresponding to an infinite object distance) and the second state (corresponding to a short object distance) according to the 7th embodiment of the present disclosure. FIG. 20 shows, in order from left to right, spherical aberration curves, astigmatic field curves and a distortion curve of the image capturing unit at the first state according to the 7th embodiment. FIG. 21 shows, in order from left to right, spherical aberration curves, astigmatic field curves and a distortion curve of the image capturing unit at the second state according to the 7th embodiment. The upper part of FIG. 19 shows the photographing lens assembly at the first state, and the lower part of FIG. 19 shows the photographing lens assembly at the second state. In FIG. 19, the image capturing unit 7 includes the photographing lens assembly (its reference numeral is omitted) of the present disclosure and an image sensor IS. The photographing lens assembly includes, in order from an object side to an image side along an optical path, a first lens element E1, an aperture stop ST, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 19, the second lens group G2 moves relative to the first lens group G1 along an optical axis in the movement focus process. Furthermore, through the movement focus process, the photographing lens assembly has a first state as shown in the upper part of FIG. 19 and a second state as shown in the lower part of FIG. 19. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has two inflection points.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points.

The reflective element E6 is made of glass material and is a prism which provides an optical path folding function. For simplicity, the light-folding effect generated by the reflective element E6 in FIG. 19 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 7th embodiment are shown in Table 7A and Table 7B, and the aspheric surface data are shown in Table 7C below.

TABLE 7A

| | | | | | | Abbe | Focal |
|---|---|---|---|---|---|---|---|
| Surface # | | Curvature Radius | Thickness | Material | Index | # | Length |
| 0 | Object | Plano | D0 | | | | |
| 1 | Lens 1 | 5.1465 (ASP) | 1.014 | Glass | 1.523 | 58.7 | 13.22 |
| 2 | | 18.7539 (ASP) | 0.188 | | | | |
| 3 | Ape. Stop | Plano | 0.008 | | | | |
| 4 | Lens 2 | 11.5521 (ASP) | 1.139 | Plastic | 1.544 | 56.0 | 14.71 |
| 5 | | −25.1274 (ASP) | D1 | | | | |
| 6 | Lens 3 | 3.6234 (ASP) | 0.750 | Plastic | 1.614 | 25.6 | −9.83 |
| 7 | | 2.0853 (ASP) | 1.154 | | | | |
| 8 | Lens 4 | −2.4531 (ASP) | 0.733 | Plastic | 1.669 | 19.5 | −29.28 |
| 9 | | −3.1402 (ASP) | 0.030 | | | | |

TABLE 7A-continued

7th Embodiment

| Surface # | | Curvature Radius | Thickness | Material | Index | Abbe # | Focal Length |
|---|---|---|---|---|---|---|---|
| 10 | Lens 5 | 22.6190 (ASP) | 0.631 | Plastic | 1.544 | 56.0 | 21.47 |
| 11 | | −23.9126 (ASP) | 0.030 | | | | |
| 12 | Stop | Plano | D2 | | | | |
| 13 | Reflective element | Plano | 10.800 | Glass | 1.516 | 64.1 | — |
| 14 | | Plano | 0.100 | | | | |
| 15 | Filter | Plano | 0.110 | Glass | 1.516 | 64.1 | — |
| 16 | | Plano | 0.207 | | | | |
| 17 | Image | Plano | — | | | | |

Note:
Reference wavelength is 587.6 nm (d-line).
An effective radius of the stop S1 (Surface 12) is 1.72 mm.

TABLE 7B

Optical data for photographing lens assembly with infinite object distance and short object distance

| | Infinite object distance (First state) | | Short object distance (Second state) |
|---|---|---|---|
| fL [mm] | 13.05 | fS [mm] | 12.93 |
| FnoL | 2.69 | FnoS | 2.70 |
| HFOVL [deg.] | 11.2 | HFOVS [deg.] | 11.2 |
| D0 [mm] | ∞ | D0 [mm] | 1000.000 |
| D1 [mm] | 0.309 | D1 [mm] | 0.386 |
| D2 [mm] | 0.100 | D2 [mm] | 0.030 |
| TDL [mm] | 5.956 | TDS [mm] | 6.033 |
| BLL [mm] | 11.347 | BLS [mm] | 11.277 |
| fG1 [mm] | 7.31 | fG1 [mm] | 7.31 |
| fG2 [mm] | −14.27 | fG2 [mm] | −14.27 |
| CRAL [deg.] | 12.7 | CRAS [deg.] | 12.7 |

In Table 7B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

TABLE 7C

Aspheric Coefficients

| Surface # | 1 | 2 | 4 | 5 |
|---|---|---|---|---|
| k= | 2.014800E−01 | 2.029120E+00 | −6.698230E+01 | −1.977840E+01 |
| A4= | −1.113844E−03 | 4.084348E−03 | 1.622554E−02 | 1.652942E−02 |
| A6= | 8.591749E−04 | −7.295722E−03 | −1.673824E−02 | −2.564704E−02 |
| A8= | −2.823431E−04 | 3.970255E−03 | 7.990909E−03 | 2.055315E−02 |
| A10= | 8.088527E−05 | −9.198924E−04 | −1.900226E−03 | −1.052000E−02 |
| A12= | −1.280471E−05 | 9.453372E−05 | 2.068664E−04 | 3.642649E−03 |
| A14= | 7.089051E−07 | −3.481822E−06 | −2.723467E−06 | −8.510491E−04 |
| A16= | — | — | −1.324462E−06 | 1.288139E−04 |
| A18= | — | — | 8.621933E−08 | −1.140021E−05 |
| A20= | — | — | — | 4.482524E−07 |

| Surface # | 6 | 7 | 8 | 9 |
|---|---|---|---|---|
| k= | −5.473040E+00 | −1.008560E−02 | −6.905210E−02 | −2.972020E−02 |
| A4= | 8.981243E−03 | −3.082577E−02 | 4.186228E−03 | 2.590181E−02 |
| A6= | −1.347248E−02 | 1.248579E−02 | 3.715137E−02 | −1.709126E−02 |
| A8= | 1.809746E−02 | 4.980751E−03 | −4.251676E−02 | 1.336324E−02 |
| A10= | −1.334367E−02 | −1.544551E−02 | 3.459486E−02 | −4.684779E−03 |
| A12= | 6.139852E−03 | 1.302617E−02 | −2.166948E−02 | −1.630264E−03 |
| A14= | −1.942743E−03 | −6.906916E−03 | 9.803792E−03 | 2.400422E−03 |
| A16= | 4.526942E−04 | 2.530612E−03 | −2.816188E−03 | −1.015701E−03 |
| A18= | −7.787158E−05 | −5.724522E−04 | 4.398567E−04 | 2.001638E−04 |
| A20= | 8.722071E−06 | 5.792438E−05 | −2.692266E−05 | −1.560940E−05 |
| A22= | −4.556358E−07 | — | — | — |

TABLE 7C-continued

| Aspheric Coefficients | | |
| --- | --- | --- |
| Surface # | 10 | 11 |
| k= | 8.504760E+01 | 9.900000E+01 |
| A4= | 2.461614E−02 | 4.410822E−04 |
| A6= | −5.269668E−02 | −1.005567E−02 |
| A8= | 4.721703E−02 | 6.848932E−03 |
| A10= | −2.730593E−02 | −2.229523E−03 |
| A12= | 1.047669E−02 | 2.544975E−04 |
| A14= | −2.582584E−03 | 3.840562E−05 |
| A16= | 3.720153E−04 | −1.190809E−05 |
| A18= | −2.374996E−05 | 7.585384E−07 |

In the 7th embodiment, the equation of the aspheric surface profiles of the aforementioned lens elements is the same as the equation of the 1st embodiment.

Moreover, these parameters shown in Table 7D can be calculated from Table 7A to Table 7C as the following values and satisfy the following conditions:

TABLE 7D

| Schematic Parameters | | | |
| --- | --- | --- | --- |
| fL [mm] | 13.05 | TDL/BLL | 0.52 |
| FnoL | 2.69 | SL/TL | 0.93 |
| HFOVL [deg.] | 11.2 | f1/f2 | 0.90 |
| CRAL [deg.] | 12.7 | f2/f3 | −1.50 |
| fS [mm] | 12.93 | fL/|f45| | 0.24 |
| FnoS | 2.70 | (|f1| + |f3|)/(|f4| + |f5|) | 0.45 |
| HFOVS [deg.] | 11.2 | f3/R5 | −2.71 |
| CRAS [deg.] | 12.7 | R5/R6 | 1.74 |
| fG1 [mm] | 7.31 | (R1 − R5)/(R1 + R5) | 0.17 |
| fG2 [mm] | −14.27 | (R5 − R9)/(R5 + R9) | −0.72 |
| fL/fS | 1.01 | Dr1r4/Dr5rL | 0.71 |
| fG1/fG2 | −0.51 | CT3/T34 | 0.65 |
| fL/BLL | 1.15 | CT1/(CT4 + CT5) | 0.74 |
| fS/BLS | 1.15 | V1/V2 | 1.05 |
| TDL/TDS | 0.99 | V2/V4 | 2.88 |
| FnoL/FnoS | 1.00 | Y1R1/YNR2 | 1.44 |
| TL/ImgH | 6.61 | ImgH/Y1R1 | 1.05 |
| TL/fL | 1.33 | |Sag3R1/Sag3R2| | 0.72 |

Please be noted that in this embodiment, Dr5rL is an axial distance between the object-side surface of the third lens element E3 and the image-side surface of the fifth lens element E5, and YNR2 is a maximum effective radius of the image-side surface of the fifth lens element E5.

8th Embodiment

Figure 22:
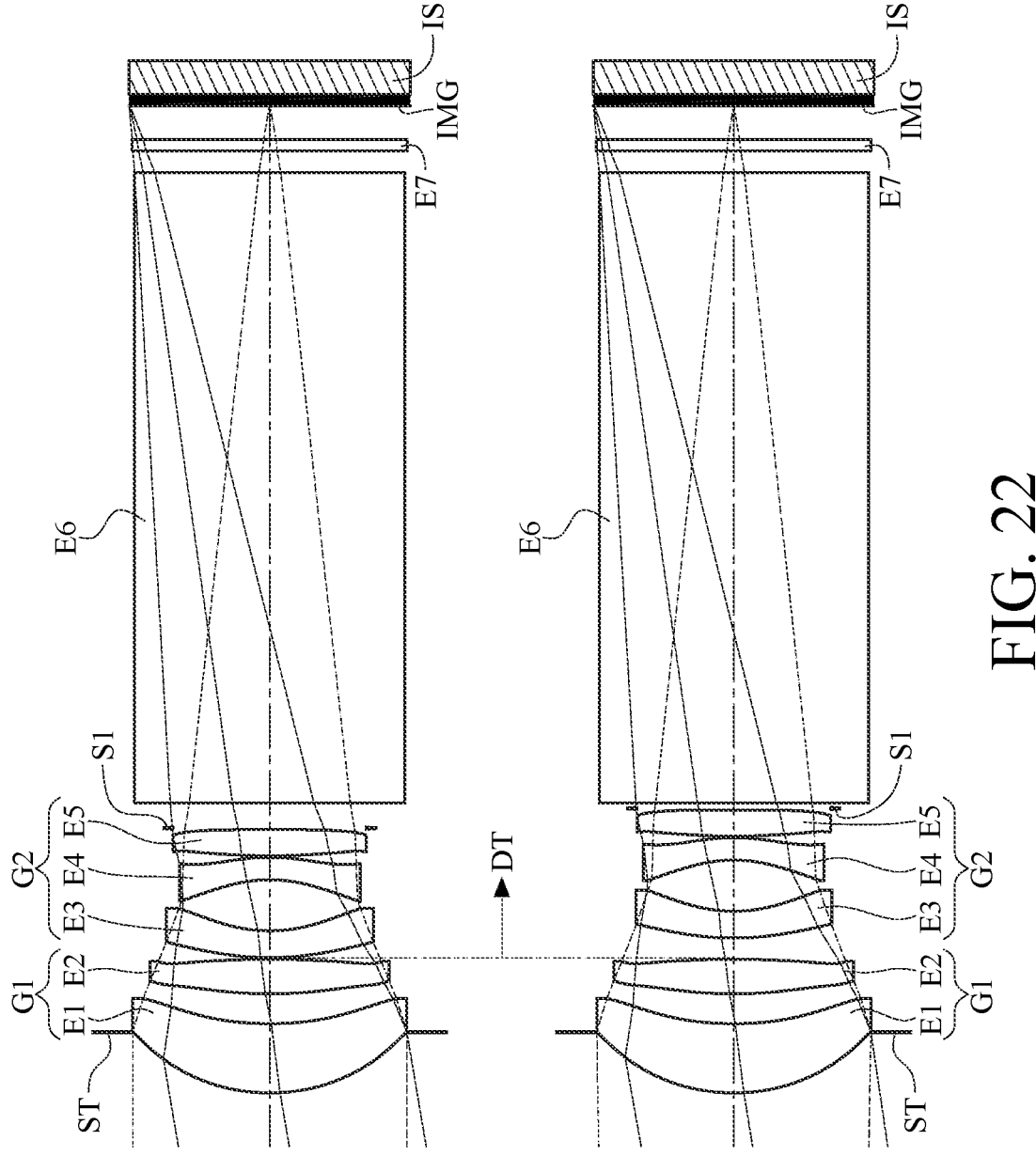
FIG. 22 is a schematic view of an image capturing unit respectively corresponding to an infinite object distance and a short object distance according to the 8th embodiment of the present disclosure.
Figure 23:
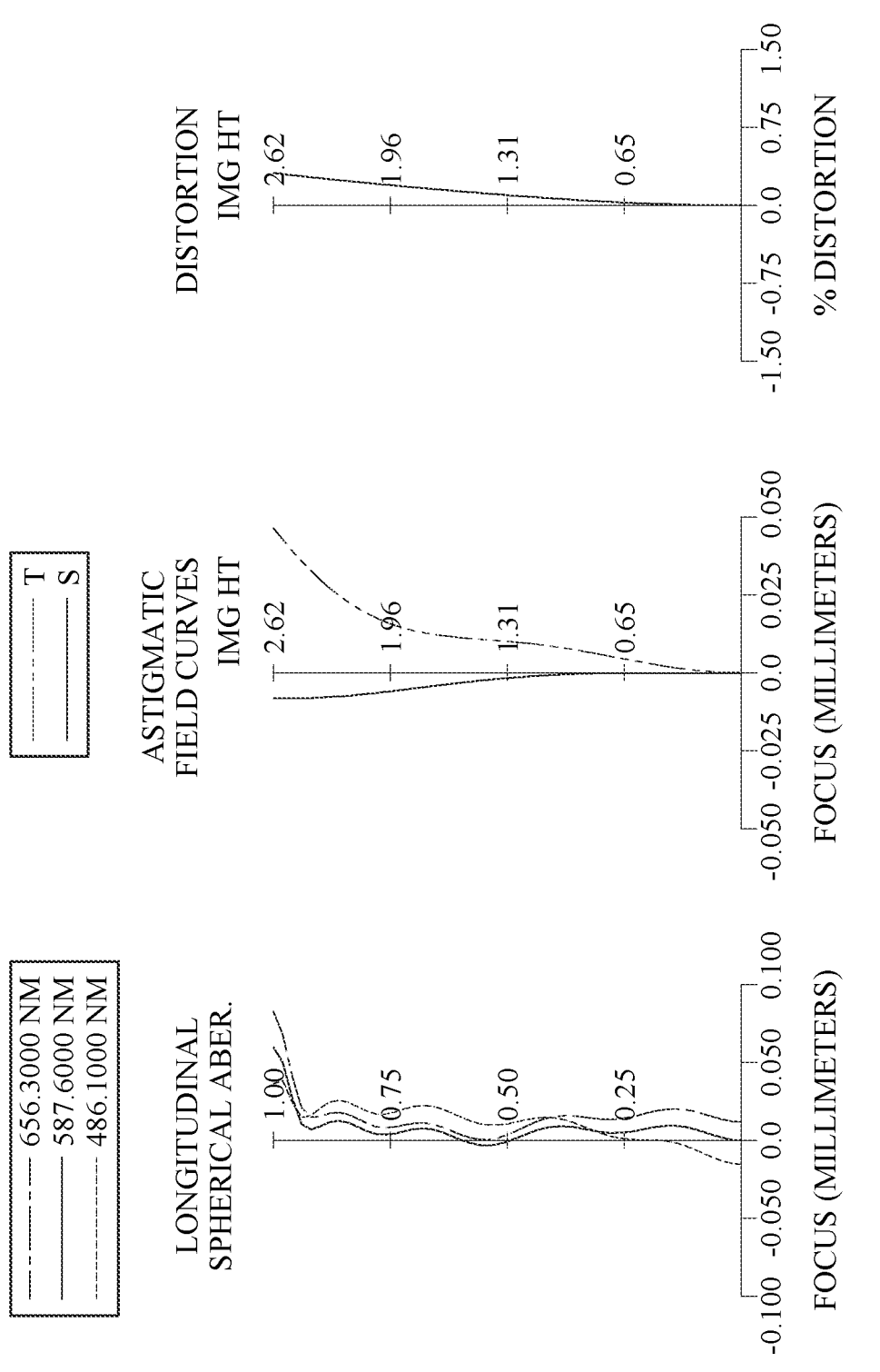
FIG. 23 shows spherical aberration curves, astigmatic field curves and a distortion curve of the image capturing unit corresponding to the infinite object distance according to the 8th embodiment.
Figure 24:
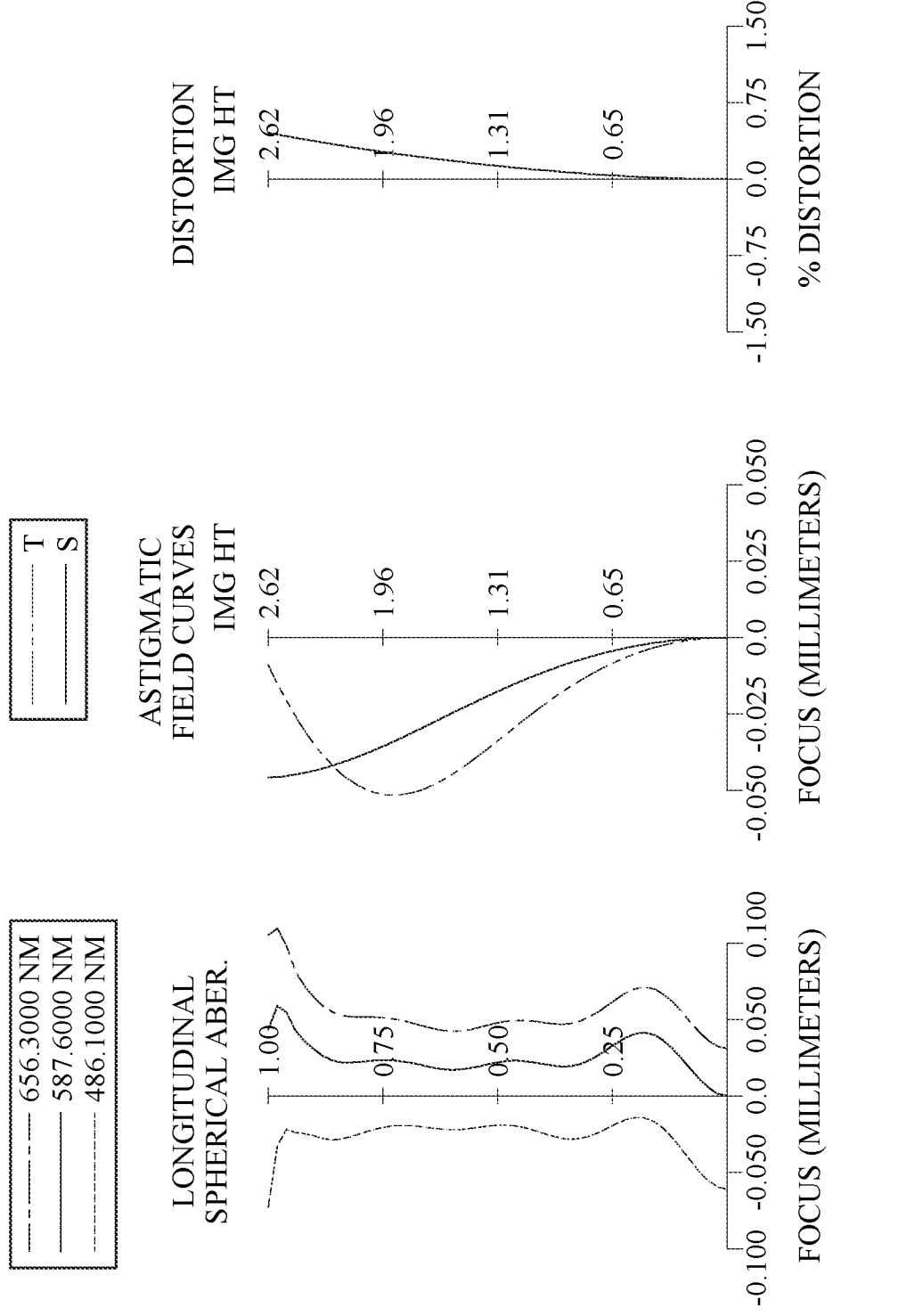
FIG. 24 shows spherical aberration curves, astigmatic field curves and a distortion curve of the image capturing unit corresponding to the short object distance according to the 8th embodiment.

FIG. 22 is a schematic view of an image capturing unit respectively at the first state (corresponding to an infinite object distance) and the second state (corresponding to a short object distance) according to the 8th embodiment of the present disclosure. FIG. 23 shows, in order from left to right, spherical aberration curves, astigmatic field curves and a distortion curve of the image capturing unit at the first state according to the 8th embodiment. FIG. 24 shows, in order from left to right, spherical aberration curves, astigmatic field curves and a distortion curve of the image capturing unit at the second state according to the 8th embodiment. The upper part of FIG. 22 shows the photographing lens assembly at the first state, and the lower part of FIG. 22 shows the photographing lens assembly at the second state. In FIG. 22, the image capturing unit 8 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3, the fourth lens element E4 and the fifth lens element E5. Moreover, the first lens group G1 has positive refractive power, and the second lens group G2 has negative refractive power. The photographing lens assembly includes five lens elements (E1, E2, E3, E4, and E5) with no additional lens element disposed between each of the adjacent five lens elements.

The focal length of the photographing lens assembly is variable by changing an axial distance between the two lens groups (G1 and G2) in a movement focus process. As shown in FIG. 22, the second lens group G2 moves relative to the first lens group G1 along an optical axis in the movement focus process. Furthermore, through the movement focus process, the photographing lens assembly has a first state as shown in the upper part of FIG. 22 and a second state as shown in the lower part of FIG. 22. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has two inflection points.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has three inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The reflective element E6 is made of glass material and is a prism which provides an optical path folding function. For simplicity, the light-folding effect generated by the reflective element E6 in FIG. 22 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 8th embodiment are shown in Table 8A and Table 8B, and the aspheric surface data are shown in Table 8C below.

TABLE 8B

| Optical data for photographing lens assembly with infinite object distance and short object distance | | | |
|---|---|---|---|
| | Infinite object distance (First state) | | Short object distance (Second state) |
| fL [mm] | 15.34 | fS [mm] | 13.9 |
| FnoL | 3.00 | FnoS | 3.09 |
| HFOVL [deg.] | 9.6 | HFOVS [deg.] | 9.4 |
| D0 [mm] | ∞ | D0 [mm] | 150.000 |
| D1 [mm] | 0.030 | D1 [mm] | 0.397 |
| D2 [mm] | 0.467 | D2 [mm] | 0.100 |
| TDL [mm] | 4.924 | TDS [mm] | 5.291 |
| BLL [mm] | 13.541 | BLS [mm] | 13.174 |
| fG1 [mm] | 6.57 | fG1 [mm] | 6.57 |
| fG2 [mm] | −8.27 | fG2 [mm] | −8.27 |
| CRAL [deg.] | 12.3 | CRAS [deg.] | 12.4 |

In Table 8B, the optical data is the same as the data of the 1st embodiment. Please be noted that in this embodiment, TDL is an axial distance between the object-side surface of the first lens element E1 and the image-side surface of the fifth lens element E5 in the photographing lens assembly with the infinite object distance, TDS is an axial distance between the object-side surface of the first lens element E1 and the image-side surface of the fifth lens element E5 in the photographing lens assembly with the short object distance, BLL is an axial distance between the image-side surface of the fifth lens element E5 and the image surface IMG in the photographing lens assembly with the infinite object distance, and BLS is an axial distance between the image-side surface of the fifth lens element E5 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

TABLE 8A

| | 8th Embodiment | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Ape. Stop | Plano | −1.138 | | | | |
| 2 | Lens 1 | 3.6022 (ASP) | 1.296 | Plastic | 1.544 | 56.0 | 12.00 |
| 3 | | 7.0182 (ASP) | 0.560 | | | | |
| 4 | Lens 2 | 12.1097 (ASP) | 0.644 | Plastic | 1.544 | 56.0 | 11.75 |
| 5 | | −13.2773 (ASP) | D1 | | | | |
| 6 | Lens 3 | 5.2098 (ASP) | 0.501 | Plastic | 1.614 | 25.6 | −9.85 |
| 7 | | 2.6961 (ASP) | 0.958 | | | | |
| 8 | Lens 4 | −2.5977 (ASP) | 0.415 | Plastic | 1.680 | 18.2 | −8.19 |
| 9 | | −5.1812 (ASP) | 0.030 | | | | |
| 10 | Lens 5 | 7.5351 (ASP) | 0.490 | Plastic | 1.697 | 16.3 | 10.88 |
| 11 | | 1182.9736 (ASP) | 0.030 | | | | |
| 12 | Stop | Plano | D2 | | | | |
| 13 | Reflective element | Plano | 11.800 | Glass | 1.516 | 64.1 | — |
| 14 | | Plano | 0.400 | | | | |
| 15 | Filter | Plano | 0.210 | Glass | 1.516 | 64.1 | — |
| 16 | | Plano | 0.634 | | | | |
| 17 | Image | Plano | — | | | | |

Note:
Reference wavelength is 587.6 nm (d-line).
An effective radius of the stop S1 (Surface 12) is 1.82 mm.

TABLE 8C

| Aspheric Coefficients | | | | |
|---|---|---|---|---|
| Surface # | 2 | 3 | 4 | 5 |
| k= | 2.712340E−01 | 4.009580E+00 | −1.700750E+01 | −9.900000E+01 |
| A4= | 4.300603E−03 | 2.985058E−02 | 1.341305E+00 | 6.687785E−01 |
| A6= | −2.550485E−03 | −2.712810E−02 | −8.294796E+00 | −5.711490E+00 |
| A8= | 1.307176E−03 | 1.810437E−02 | 3.229831E+01 | 2.842040E+01 |
| A10= | −4.843916E−04 | −9.135265E−03 | −9.111506E+01 | −9.977496E+01 |
| A12= | 1.165660E−04 | 3.243020E−03 | 1.810627E+02 | 2.543063E+02 |
| A14= | −1.617295E−05 | −7.686727E−04 | −2.456172E+02 | −4.723433E+02 |
| A16= | 9.608437E−07 | 1.138220E−04 | 2.176971E+02 | 6.339074E+02 |
| A18= | 1.946827E−08 | −9.438854E−06 | −1.165963E+02 | −5.979392E+02 |
| A20= | −3.798622E−09 | 3.328068E−07 | 3.254931E+01 | 3.752793E+02 |
| A22= | — | — | −3.248874E+00 | −1.402443E+02 |
| A24= | — | — | — | 2.353696E+01 |

| Surface # | 6 | 7 | 8 | 9 |
|---|---|---|---|---|
| k= | −1.114740E+01 | −6.405010E−02 | −1.505140E−01 | −1.806800E+00 |
| A4= | 6.754993E−02 | −2.058090E−01 | 1.758457E−01 | −9.421225E−01 |
| A6= | −5.615321E−01 | 2.612513E−01 | −4.445704E−01 | 6.941486E+00 |
| A8= | 4.169524E+00 | −4.853600E−01 | 4.636874E+00 | −2.910618E+01 |
| A10= | −1.900905E+01 | −3.862558E+00 | −1.374866E+01 | 1.004101E+02 |
| A12= | 5.275381E+01 | 2.135614E+01 | 2.217230E+01 | −2.505892E+02 |
| A14= | −9.211050E+01 | −4.773756E+01 | −2.931677E+01 | 4.121971E+02 |
| A16= | 1.020552E+02 | 5.569380E+01 | 4.040044E+01 | −4.266818E+02 |
| A18= | −6.969180E+01 | −3.336846E+01 | −4.319205E+01 | 2.641367E+02 |
| A20= | 2.680450E+01 | 8.129542E+00 | 2.572921E+01 | −8.815231E+01 |
| A22= | −4.454269E+00 | — | −6.173366E+00 | 1.197352E+01 |

| Surface # | 10 | 11 |
|---|---|---|
| k= | −9.024160E+01 | 9.900000E+01 |
| A4= | −7.822032E−01 | 1.922986E−02 |
| A6= | 5.687820E+00 | −1.105621E+00 |
| A8= | −2.547238E+01 | 7.427689E+00 |
| A10= | 8.541345E+01 | −3.583909E+01 |
| A12= | −2.073211E+02 | 1.237754E+02 |
| A14= | 3.424516E+02 | −2.998445E+02 |
| A16= | −3.685333E+02 | 4.957427E+02 |
| A18= | 2.465108E+02 | −5.413771E+02 |
| A20= | −9.347970E+01 | 3.711870E+02 |
| A22= | 1.547541E+01 | −1.444278E+02 |
| A24= | — | 2.432579E+01 |

In the 8th embodiment, the equation of the aspheric surface profiles of the aforementioned lens elements is the same as the equation of the 1st embodiment.

Moreover, these parameters shown in Table 8D can be calculated from Table 8A to Table 8C as the following values and satisfy the following conditions:

TABLE 8D

| Schematic Parameters | | | |
|---|---|---|---|
| fL [mm] | 15.34 | TDL/BLL | 0.36 |
| FnoL | 3.00 | SL/TL | 0.94 |
| HFOVL [deg.] | 9.6 | f1/f2 | 1.02 |
| CRAL [deg.] | 12.3 | f2/f3 | −1.19 |
| fS [mm] | 13.90 | fL/|f45| | 0.37 |
| FnoS | 3.09 | (|f1| + |f3|)/(|f4| + |f5|) | 1.15 |
| HFOVS [deg.] | 9.4 | f3/R5 | −1.89 |
| CRAS [deg.] | 12.4 | R5/R6 | 1.93 |
| fG1 [mm] | 6.57 | (R1 − R5)/(R1 + R5) | −0.18 |
| fG2 [mm] | −8.27 | (R5 − R9)/(R5 + R9) | −0.18 |
| fL/fS | 1.10 | Dr1r4/Dr5rL | 1.04 |
| fG1/fG2 | −0.79 | CT3/T34 | 0.52 |
| fL/BLL | 1.13 | CT1/(CT4 + CT5) | 1.43 |
| fS/BLS | 1.06 | V1/V2 | 1.00 |
| TDL/TDS | 0.93 | V2/V4 | 3.08 |
| FnoL/FnoS | 0.97 | Y1R1/YNR2 | 1.40 |
| TL/ImgH | 7.05 | ImgH/Y1R1 | 1.02 |
| TL/fL | 1.20 | |Sag3R1/Sag3R2| | 0.70 |

Please be noted that in this embodiment, Dr5rL is an axial distance between the object-side surface of the third lens element E3 and the image-side surface of the fifth lens element E5, and YNR2 is a maximum effective radius of the image-side surface of the fifth lens element E5.

9th Embodiment

Figure 25:
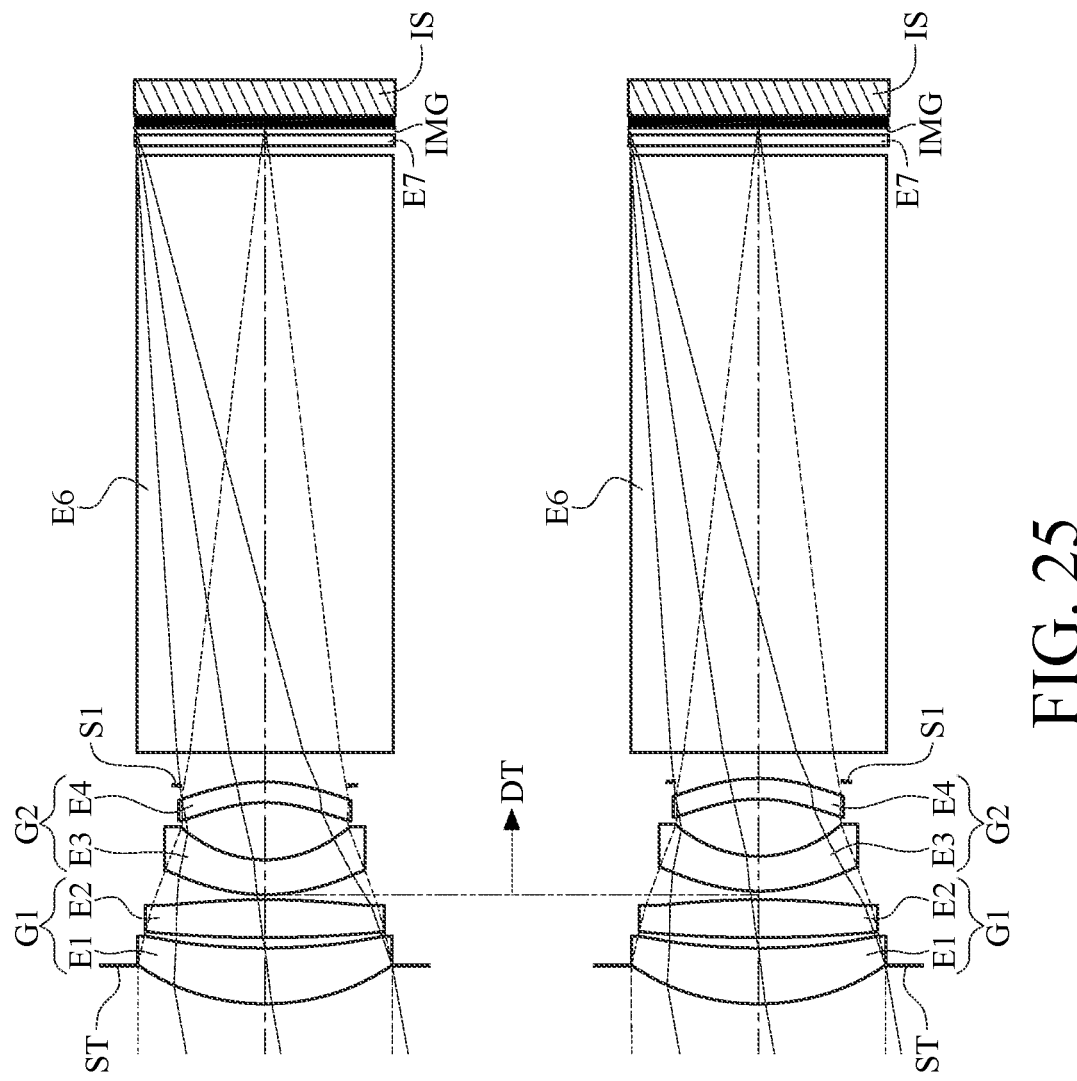
FIG. 25 is a schematic view of an image capturing unit respectively corresponding to an infinite object distance and a short object distance according to the 9th embodiment of the present disclosure.
Figure 26:
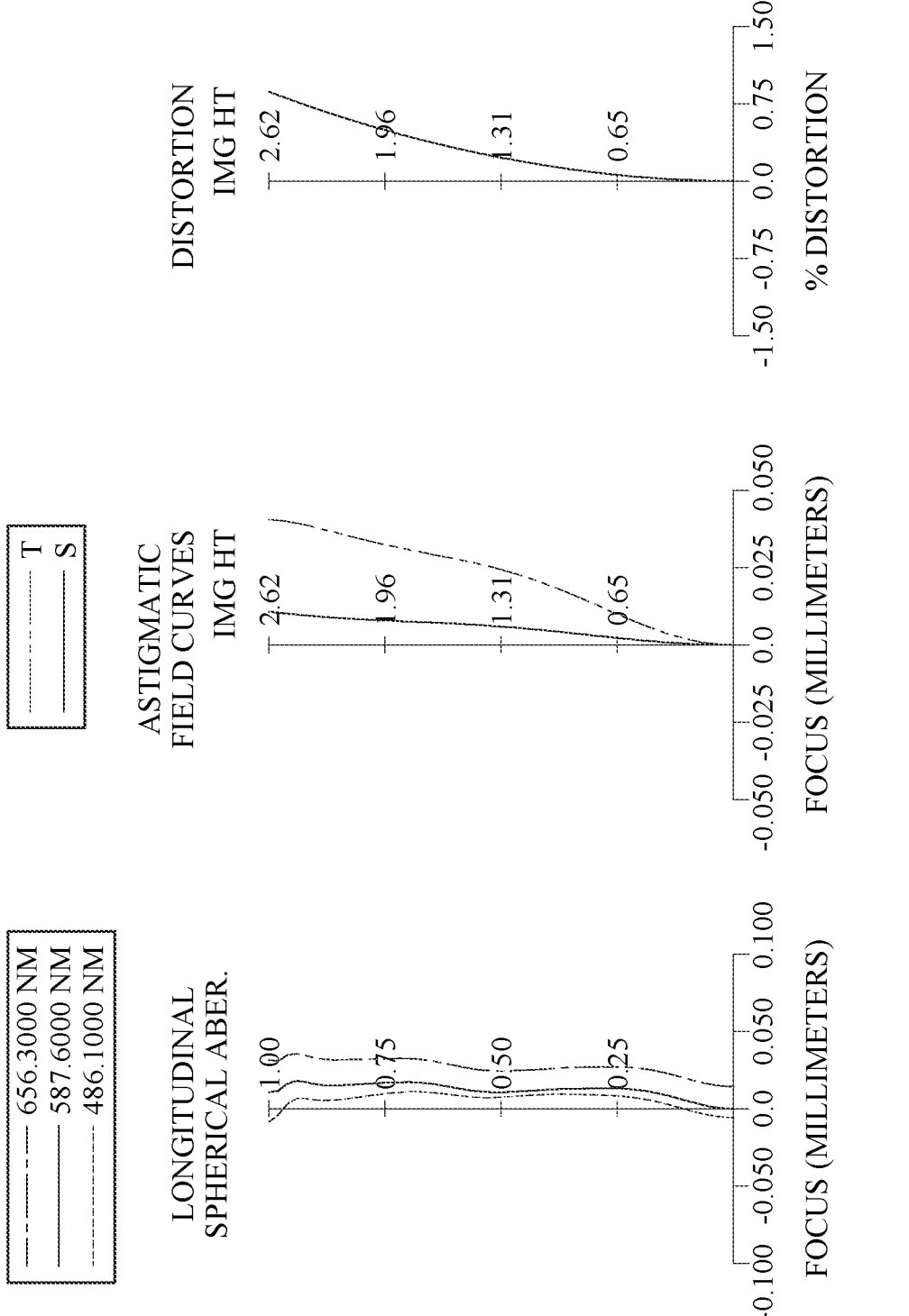
FIG. 26 shows spherical aberration curves, astigmatic field curves and a distortion curve of the image capturing unit corresponding to the infinite object distance according to the 9th embodiment.
Figure 27:
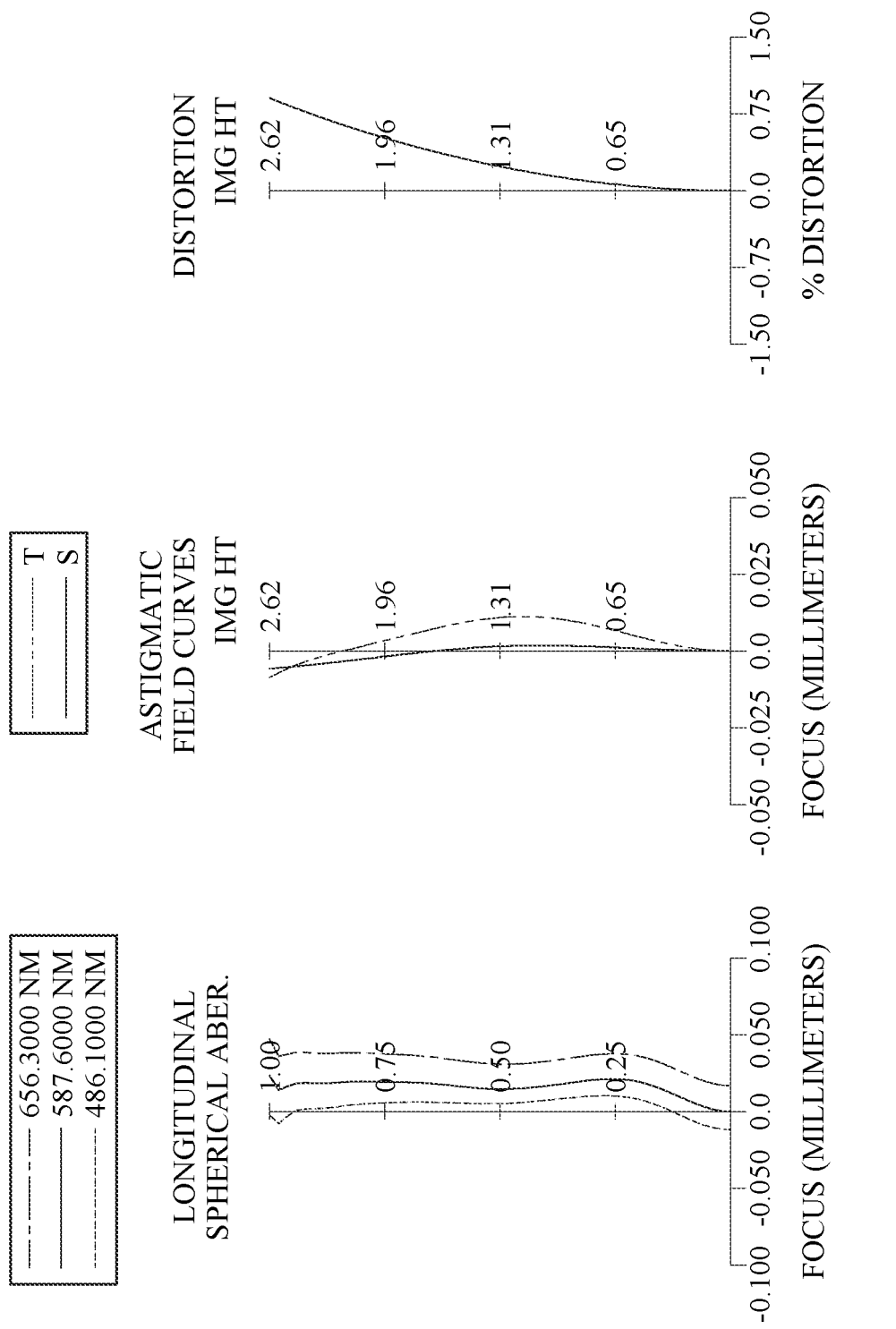
FIG. 27 shows spherical aberration curves, astigmatic field curves and a distortion curve of the image capturing unit corresponding to the short object distance according to the 9th embodiment.

FIG. 25 is a schematic view of an image capturing unit respectively at the first state (corresponding to an infinite object distance) and the second state (corresponding to a short object distance) according to the 9th embodiment of the present disclosure. FIG. 26 shows, in order from left to right, spherical aberration curves, astigmatic field curves and a distortion curve of the image capturing unit at the first state according to the 9th embodiment. FIG. 27 shows, in order from left to right, spherical aberration curves, astigmatic field curves and a distortion curve of the image capturing unit at the second state according to the 9th embodiment. The upper part of FIG. 25 shows the photographing lens assembly at the first state, and the lower part of FIG. 25 shows the photographing lens assembly at the second state. In FIG. 25, the image capturing unit 9 includes the photographing lens assembly (its reference numeral is omitted) of the present disclosure and an image sensor IS. The photographing lens assembly includes, in order from an object side to an image side along an optical path, an aperture stop ST, a first lens element E1, a second lens element E2, a third lens element E3, a fourth lens element E4, a stop S1, a reflective element E6, a filter E7 and an image surface IMG. Further, the photographing lens assembly includes, in order from the object side to the image side along the optical path, a first lens group G1 and a second lens group G2. The first lens group G1 includes the first lens element E1 and the second lens element E2, and the second lens group G2 includes the third lens element E3 and the fourth lens element E4. Moreover, the first lens group G1 has positive refractive power, and the second lens group G2 has negative refractive power. The photographing lens assembly includes four lens elements (E1, E2, E3, and E4) with no additional lens element disposed between each of the adjacent four lens elements.

The focal length of the photographing lens assembly is variable by changing an axial distance between the two lens groups (G1 and G2) in a movement focus process. As shown in FIG. 25, the second lens group G2 moves relative to the first lens group G1 along an optical axis in the movement focus process. Furthermore, through the movement focus process, the photographing lens assembly has a first state as shown in the upper part of FIG. 25 and a second state as shown in the lower part of FIG. 25. In addition, when the photographing lens assembly changes its first state to the second state during the movement focus process, the second lens group G2 moves by a distance DT along the optical axis toward the image side relative to the first lens group G1. Please be noted that there is no relative movement between lens elements of any of the two lens groups in the movement focus process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point. The image-side surface of the first lens element E1 has two inflection points.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric.

The reflective element E6 is made of glass material and is a prism which provides an optical path folding function. For simplicity, the light-folding effect generated by the reflective element E6 in FIG. 25 is omitted. The reflective element E6 can have various forms such as the descriptions referring to FIG. 48 to FIG. 57, and thus will not be repeated again.

The filter E7 is made of glass material and located between the reflective element E6 and the image surface IMG, and will not affect the focal length of the photographing lens assembly. The image sensor IS is disposed on or near the image surface IMG.

The detailed optical data of the 9th embodiment are shown in Table 9A and Table 9B, and the aspheric surface data are shown in Table 9C below.

TABLE 9A

| | | | | | | |
|---|---|---|---|---|---|---|
| | | 9th Embodiment | | | | |
| Surface # | | Curvature Radius | Thickness | Material | Index | Abbe # | Focal Length |
| 0 | Object | Plano | D0 | | | | |
| 1 | Ape. Stop | Plano | −0.764 | | | | |
| 2 | Lens 1 | 4.6394 (ASP) | 1.121 | Glass | 1.589 | 61.3 | 11.94 |
| 3 | | 12.4069 (ASP) | 0.211 | | | | |
| 4 | Lens 2 | 34.3276 (ASP) | 0.762 | Plastic | 1.544 | 56.0 | 15.99 |
| 5 | | −11.5612 (ASP) | D1 | | | | |
| 6 | Lens 3 | 3.5692 (ASP) | 0.700 | Plastic | 1.642 | 22.5 | −11.57 |
| 7 | | 2.2255 (ASP) | 1.150 | | | | |
| 8 | Lens 4 | −2.9642 (ASP) | 0.415 | Plastic | 1.669 | 19.5 | −70.34 |
| 9 | | −3.3410 (ASP) | −0.070 | | | | |
| 10 | Stop | Plano | D2 | | | | |
| 11 | Reflective element | Plano | 12.000 | Glass | 1.516 | 64.1 | — |
| 12 | | Plano | 0.200 | | | | |
| 13 | Filter | Plano | 0.210 | Glass | 1.516 | 64.1 | — |
| 14 | | Plano | 0.146 | | | | |
| 15 | Image | Plano | — | | | | |

Note:

Reference wavelength is 587.6 nm (d-line).

An effective radius of the stop S1 (Surface 10) is 1.70 mm.

TABLE 9B

| Optical data for photographing lens assembly with infinite object distance and short object distance | | | |
|---|---|---|---|
| | Infinite object distance First state) | | Short object distance (Second state) |
| fL [mm] | 14.30 | fS [mm] | 14.11 |
| FnoL | 2.80 | FnoS | 2.82 |
| HFOVL [deg.] | 10.3 | HFOVS [deg.] | 10.2 |
| D0 [mm] | ∞ | D0 [mm] | 1000.000 |
| D1 [mm] | 0.100 | D1 [mm] | 0.171 |
| D2 [mm] | 0.657 | D2 [mm] | 0.586 |
| TDL [mm] | 4.46 | TDS [mm] | 4.53 |
| BLL [mm] | 13.14 | BLS [mm] | 13.07 |
| fG1 [mm] | 7.27 | fG1 [mm] | 7.27 |
| fG2 [mm] | −10.34 | fG2 [mm] | −10.34 |
| CRAL [deg.] | 13.0 | CRAS [deg.] | 13.0 |

In Table 9B, the optical data is the same as the data of the 1st embodiment. Please be noted that in this embodiment, TDL is an axial distance between the object-side surface of the first lens element E1 and the image-side surface of the fourth lens element E4 in the photographing lens assembly with the infinite object distance, TDS is an axial distance between the object-side surface of the first lens element E1 and the image-side surface of the fourth lens element E4 in the photographing lens assembly with the short object distance, BLL is an axial distance between the image-side surface of the fourth lens element E4 and the image surface IMG in the photographing lens assembly with the infinite object distance, and BLS is an axial distance between the image-side surface of the fourth lens element E4 and the image surface IMG in the photographing lens assembly with the short object distance. Moreover, the photographing lens assembly of this embodiment can further have other focal lengths corresponding to the intermediate range of the first state and the second state in other movement focusing conditions besides the first state and the second state for different object distances.

In the 9th embodiment, the equation of the aspheric surface profiles of the aforementioned lens elements is the same as the equation of the 1st embodiment.

Moreover, these parameters shown in Table 9D can be calculated from Table 9A to Table 9C as the following values and satisfy the following conditions:

TABLE 9D

| Schematic Parameters | | | |
|---|---|---|---|
| fL [mm] | 14.30 | TDL/BLL | 0.34 |
| FnoL | 2.80 | SL/TL | 0.96 |
| HFOVL [deg.] | 10.3 | f1/f2 | 0.75 |
| CRAL [deg.] | 13.0 | f2/f3 | −1.38 |
| fS [mm] | 14.11 | fL/\|f45\| | — |
| FnoS | 2.82 | (\|f1\| + \|f3\|)/(\|f4\| + \|f5\|) | — |
| HFOVS [deg.] | 10.2 | f3/R5 | −3.24 |
| CRAS [deg.] | 13.0 | R5/R6 | 1.60 |
| fG1 [mm] | 7.27 | (R1 — R5)/(R1 + R5) | 0.13 |
| fG2 [mm] | −10.34 | (R5 — R9)/(R5 + R9) | — |
| fL/fS | 1.01 | Dr1r4/Dr5rL | 0.92 |
| fG1/fG2 | −0.70 | CT3/T34 | 0.61 |
| fL/BLL | 1.09 | CT1/(CT4 + CT5) | — |
| fS/BLS | 1.08 | V1/V2 | 1.09 |
| TDL/TDS | 0.98 | V2/V4 | 2.87 |
| FnoL/FnoS | 0.99 | Y1R1/YNR2 | 1.46 |
| TL/ImgH | 6.72 | ImgH/Y1R1 | 1.03 |
| TL/fL | 1.23 | \|Sag3R1/Sag3R2\| | 0.74 |

Please be noted that in this embodiment, Dr5rL is an axial distance between the object-side surface of the third lens element E3 and the image-side surface of the fourth lens element E4, and YNR2 is a maximum effective radius of the image-side surface of the fourth lens element E4.

10th Embodiment

Figure 28:
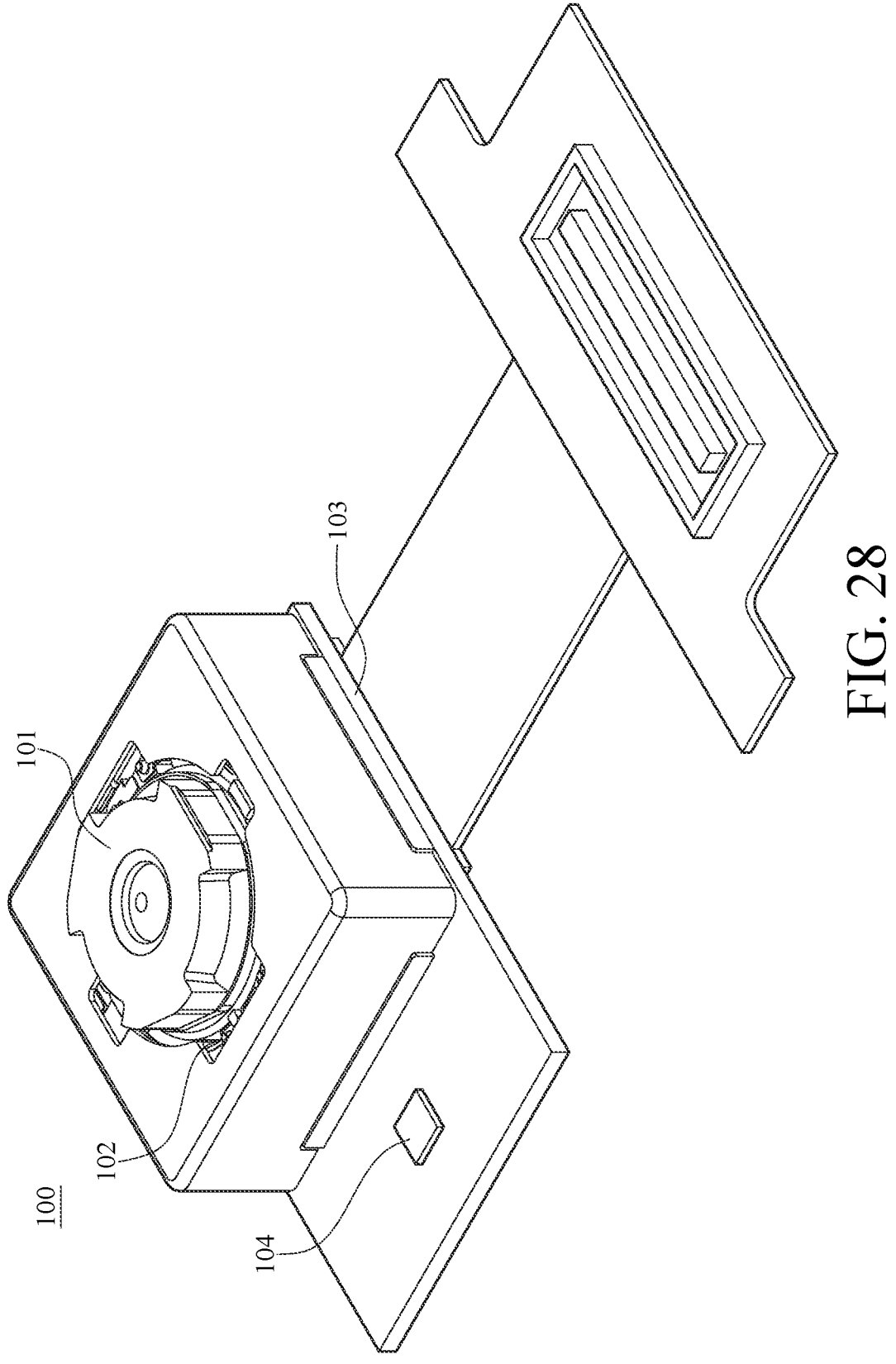
FIG. 28 is a perspective view of an image capturing unit according to the 10th embodiment of the present disclosure.

FIG. 28 is a perspective view of an image capturing unit according to the 10th embodiment of the present disclosure. In this embodiment, an image capturing unit 100 is a camera module including a lens unit 101, a driving device 102, an

TABLE 9C

| Aspheric Coefficients | | | | |
|---|---|---|---|---|
| Surface # | 2 | 3 | 4 | 5 |
| k= | 1.044910E−01 | 1.604380E+00 | −6.996400E+01 | −5.853590E+01 |
| A4= | −1.657918E−03 | −3.551170E−03 | 8.274800E−03 | 1.419883E−02 |
| A6= | 7.617794E−04 | 3.147127E−03 | −2.993061E−03 | −1.406759E−02 |
| A8= | −1.592868E−04 | −1.367556E−03 | −2.232592E−04 | 7.828564E−03 |
| A10= | 2.479273E−05 | 3.749951E−04 | 4.662390E−04 | −2.878110E−03 |
| A12= | −1.848316E−06 | −5.477100E−05 | −1.514988E−04 | 6.483378E−04 |
| A14= | — | 3.056300E−06 | 2.415929E−05 | −5.993821E−05 |
| A16= | — | — | −1.865715E−06 | −8.673007E−06 |
| A18= | — | — | 3.078105E−08 | 3.267457E−06 |
| A20= | — | — | 3.358523E−09 | −3.791450E−07 |
| A22= | — | — | — | 1.643202E−08 |

| Surface # | 6 | 7 | 8 | 9 |
|---|---|---|---|---|
| k= | −5.565190E+00 | 5.695130E−02 | 1.612420E−01 | 2.156350E−01 |
| A4= | 3.325089E−03 | −3.211755E−02 | 1.267391E−02 | 1.125349E−02 |
| A6= | −1.038584E−03 | 1.796832E−02 | 3.723302E−03 | −9.287393E−04 |
| A8= | 9.025523E−04 | −9.787404E−03 | 9.837911E−03 | 1.047454E−02 |
| A10= | 2.375483E−03 | 8.855524E−03 | −1.551770E−02 | −1.392140E−02 |
| A12= | −3.335692E−03 | −8.611601E−03 | 1.091891E−02 | 9.490071E−03 |
| A14= | 1.909730E−03 | 5.058285E−03 | −4.397940E−03 | −3.889173E−03 |
| A16= | −6.100791E−04 | −1.695314E−03 | 1.024818E−03 | 9.617284E−04 |
| A18= | 1.141597E−04 | 3.034402E−04 | −1.252633E−04 | −1.323977E−04 |
| A20= | −1.177352E−05 | −2.271266E−05 | 5.820963E−06 | 7.774948E−06 |
| A22= | 5.198040E−07 | — | — | — | image sensor 103 and an image stabilizer 104. The lens unit 101 includes the photographing lens assembly disclosed in the 1st embodiment, a barrel and a holder member (their reference numerals are omitted) for holding the photographing lens assembly. However, the lens unit 101 may alternatively be provided with the photographing lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photographing lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

11th Embodiment

Figure 29:
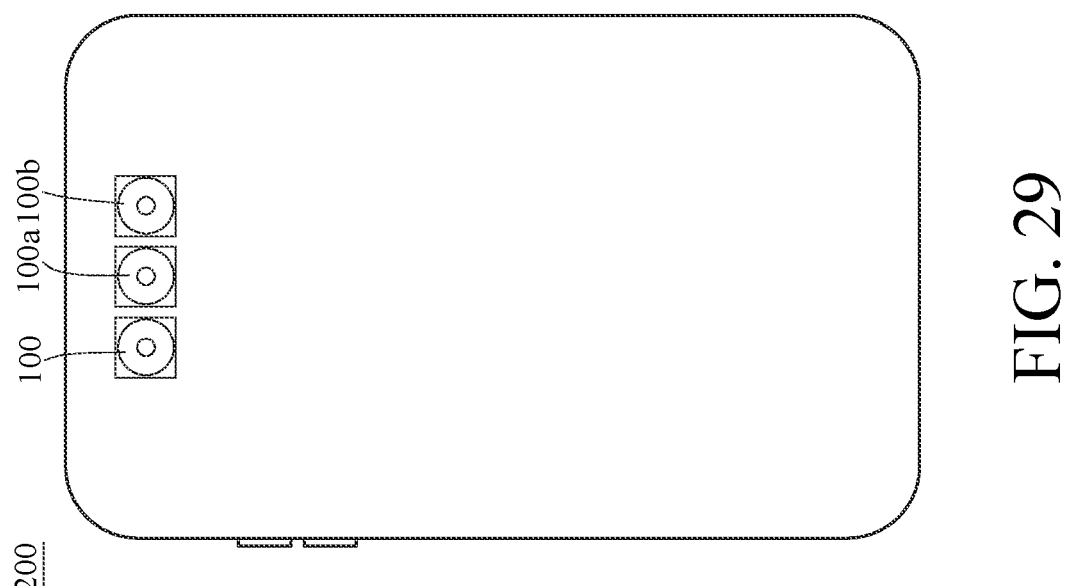
FIG. 29 is one perspective view of an electronic device according to the 11th embodiment of the present disclosure.
Figure 30:
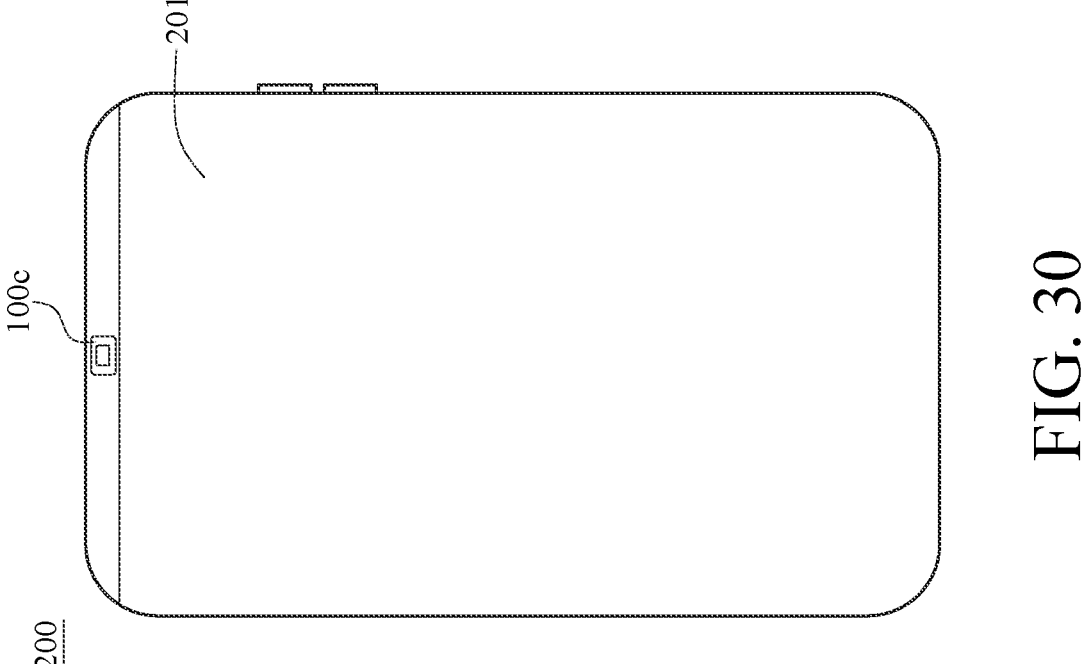
FIG. 30 is another perspective view of the electronic device in FIG. 29.

FIG. 29 is one perspective view of an electronic device according to the 11th embodiment of the present disclosure. FIG. 30 is another perspective view of the electronic device in FIG. 29.

In this embodiment, an electronic device 200 is a smartphone including the image capturing unit 100 disclosed in the 10th embodiment, an image capturing unit 100a, an image capturing unit 100b, an image capturing unit 100c and a display unit 201. As shown in FIG. 29, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 30, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the photographing lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an optical lens assembly such as the photographing lens assembly of the present disclosure, a barrel and a holder member for holding the photographing lens assembly.

The image capturing unit 100 is a telephoto image capturing unit, the image capturing unit 100a is a wide-angle image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 30, the image capturing unit 100c can have a non-circular opening, and the lens barrel or the lens elements in the image capturing unit 100c can have one or more trimmed edges at outer diameter positions thereof for corresponding to the non-circular opening. Therefore, it is favorable for further reducing the length of the image capturing unit 100c along single axis, thereby reducing the overall size of the lens, increasing the area ratio of the display unit 201 with respect to the electronic device 200, reducing the thickness of the electronic device 200, and achieving compactness of the overall module. The detail can be referred to the description related to FIG. 37 and FIG. 38, which will not be repeated again. In this embodiment, the electronic device 200 includes multiple image capturing units 100, 100a, 100b and 100c, but the present disclosure is not limited to the number and arrangement of image capturing units.

12th Embodiment

Figure 31:
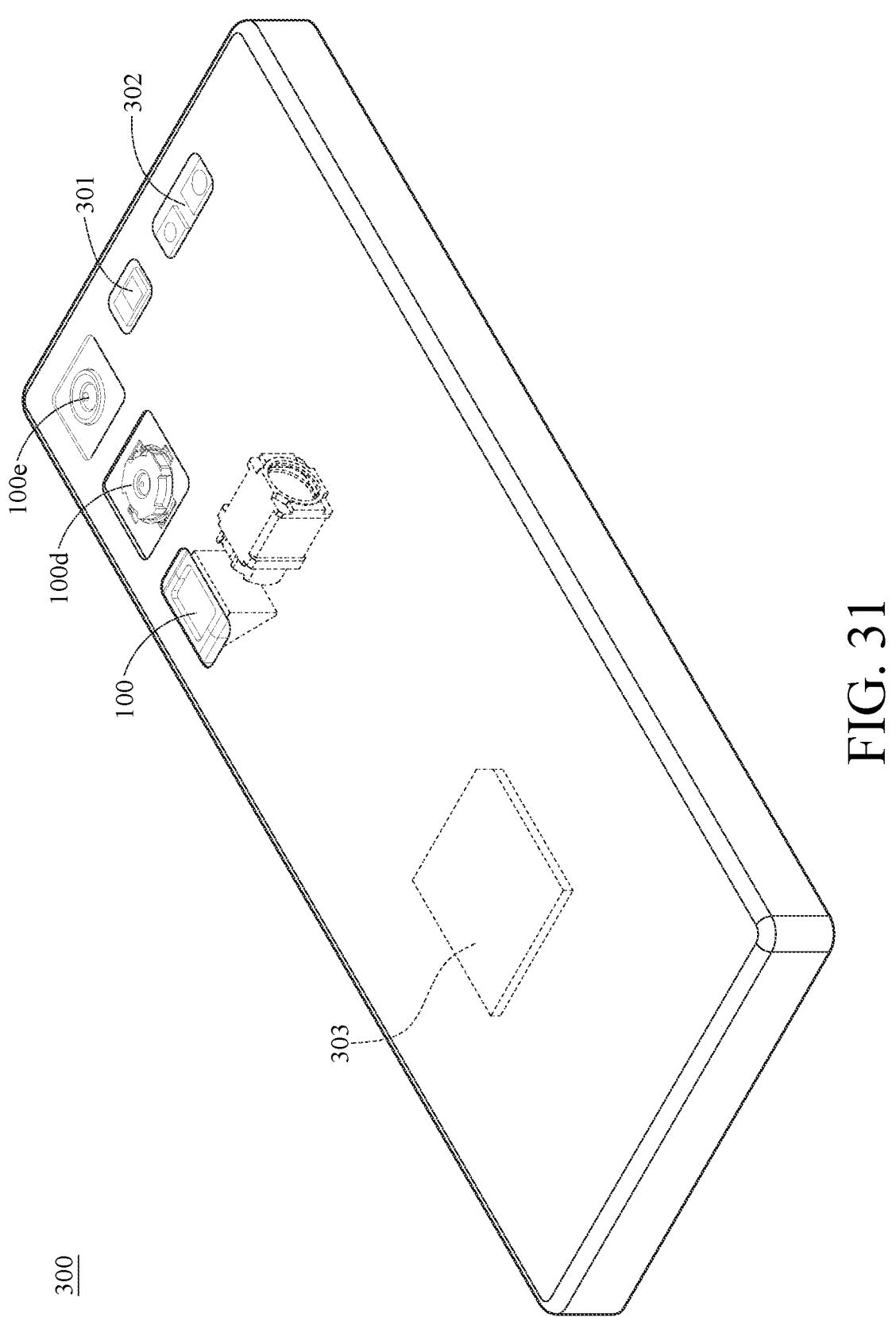
FIG. 31 is one perspective view of an electronic device according to the 12th embodiment of the present disclosure.
Figure 32:
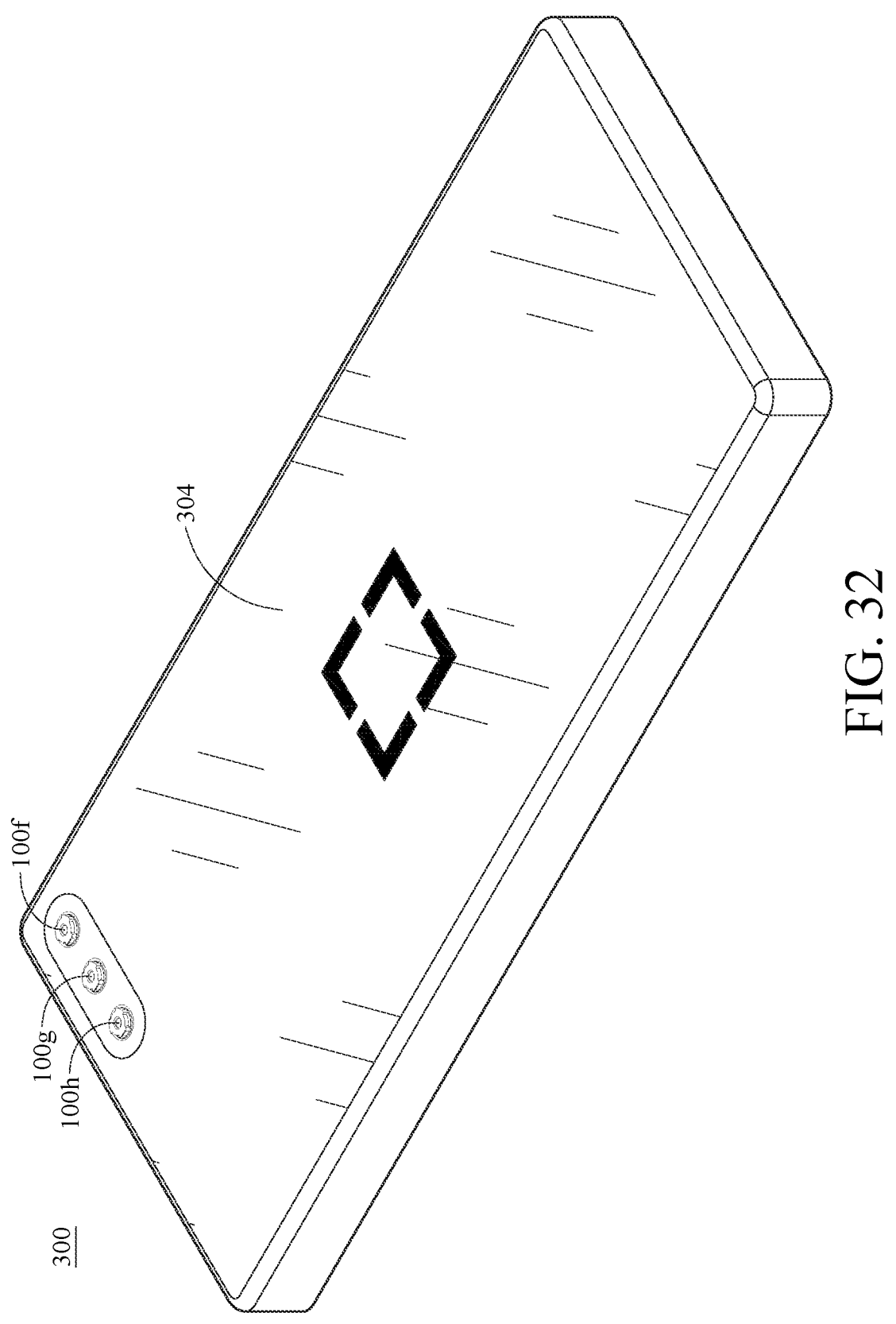
FIG. 32 is another perspective view of the electronic device in FIG. 31.
Figure 33:
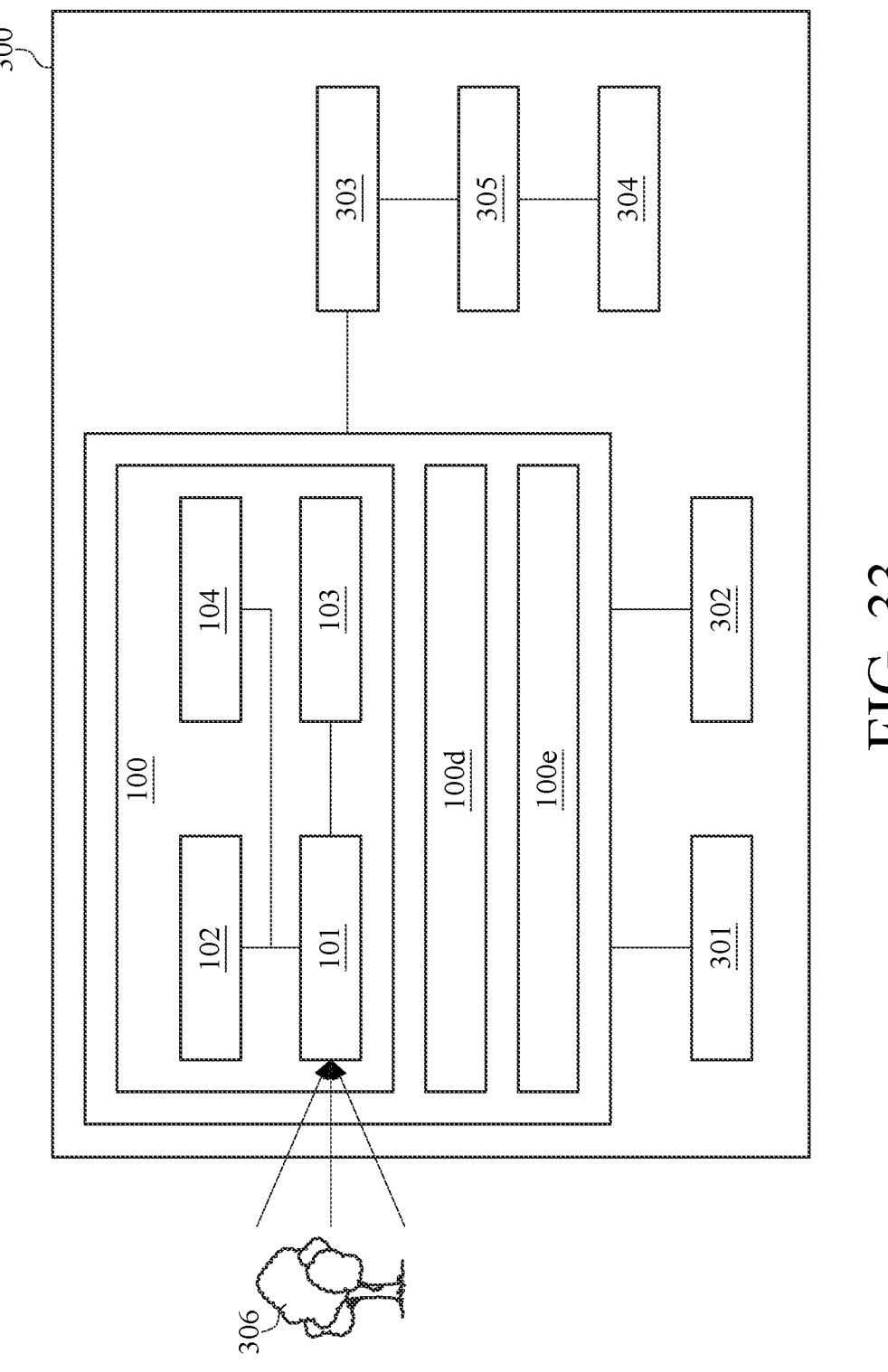
FIG. 33 is a block diagram of the electronic device in FIG. 31.

FIG. 31 is one perspective view of an electronic device according to the 12th embodiment of the present disclosure. FIG. 32 is another perspective view of the electronic device in FIG. 31. FIG. 33 is a block diagram of the electronic device in FIG. 31.

In this embodiment, an electronic device 300 is a smartphone including the image capturing unit 100 disclosed in the 10th embodiment, an image capturing unit 100d, an image capturing unit 100e, an image capturing unit 100f, an image capturing unit 100g, an image capturing unit 100h, a flash module 301, a focus assist module 302, an image signal processor 303, a display module 304 and an image software processor 305. The image capturing unit 100, the image capturing unit 100d and the image capturing unit 100e are disposed on the same side of the electronic device 300. The focus assist module 302 can be a laser rangefinder or a ToF (time of flight) module, but the present disclosure is not limited thereto. The image capturing unit 100f, the image capturing unit 100g, the image capturing unit 100h and the display module 304 are disposed on the opposite side of the electronic device 300, and the display module 304 can be a user interface, such that the image capturing units 100f, 100g, 100h can be front-facing cameras of the electronic device 300 for taking selfies, but the present disclosure is not limited thereto. Furthermore, each of the image capturing units 100d, 100e, 100f, 100g and 100h can include the photographing lens assembly of the present disclosure and can have a configuration similar to that of the image capturing unit 100. In detail, each of the image capturing units 100d, 100e, 100f, 100g and 100h can include a lens unit, a driving device, an image sensor and an image stabilizer, and each of the lens unit can include an optical lens assembly such as the photographing lens assembly of the present disclosure, a barrel and a holder member for holding the photographing lens assembly.

The image capturing unit 100 is a telephoto image capturing unit, the image capturing unit 100d is a wide-angle image capturing unit, the image capturing unit 100e is an ultra-wide-angle image capturing unit, the image capturing unit 100f is a wide-angle image capturing unit, the image capturing unit 100g is an ultra-wide-angle image capturing unit, and the image capturing unit 100h is a ToF image capturing unit. In this embodiment, the image capturing units 100, 100d and 100e have different fields of view, such that the electronic device 300 can have various magnification ratios so as to meet the requirement of optical zoom functionality.

Moreover, the image capturing unit 100 can be a telephoto image capturing unit having an optical path folding element configuration such as a reflective element configuration, such that the total track length of the image capturing unit 100 is not limited by the thickness of the electronic device 300. Moreover, the optical path folding element configuration of the image capturing unit 100 can be similar to, for example, one of the structures shown in FIG. 39 to FIG. 57, which can be referred to foregoing descriptions corresponding to FIG. 39 to FIG. 57, and the details in this regard will not be provided again. In addition, the image capturing unit 100h can determine depth information of the imaged object. In this embodiment, the electronic device 300 includes multiple image capturing units 100, 100d, 100e, 100f, 100g and 100h, but the present disclosure is not limited to the number and arrangement of image capturing units.

When a user captures images of an object 306, the light rays converge in the image capturing unit 100, the image capturing unit 100d or the image capturing unit 100e to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100f, 100g or 100h to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

Figure 34:
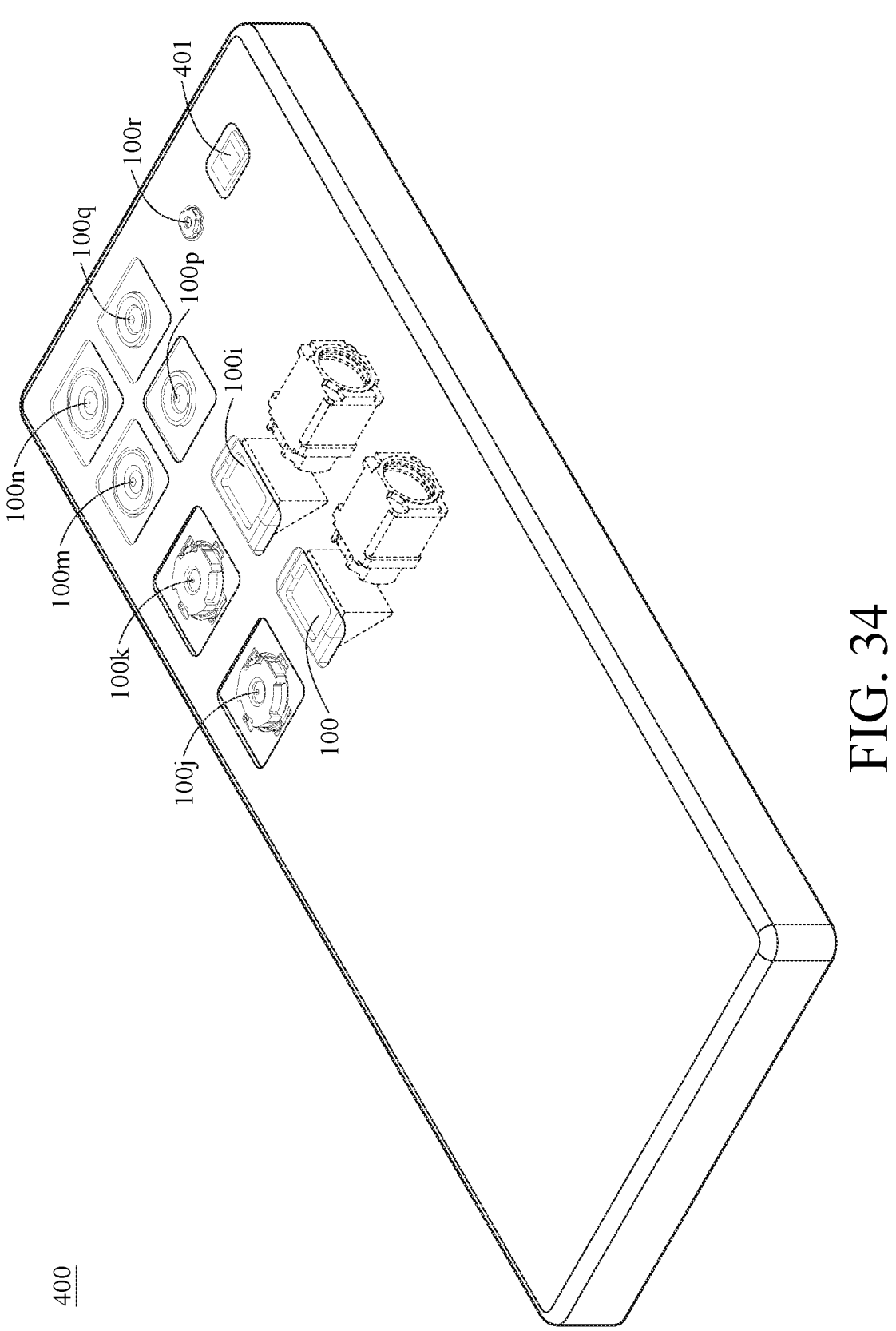
FIG. 34 is one perspective view of an electronic device according to the 13th embodiment of the present disclosure.

FIG. 34 is one perspective view of an electronic device according to the 13th embodiment of the present disclosure.

In this embodiment, an electronic device 400 is a smartphone including the image capturing unit 100 disclosed in the 10th embodiment, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100i, 100j, 100k, 100m, 100n, 100p, 100q and 100r can include the photographing lens assembly of the present disclosure and can have a configuration similar to that of the image capturing unit 100, and the details in this regard will not be provided again.

The image capturing unit 100 is a telephoto image capturing unit, the image capturing unit 100i is a telephoto image capturing unit, the image capturing unit 100j is a wide-angle image capturing unit, the image capturing unit 100k is a wide-angle image capturing unit, the image capturing unit 100m is an ultra-wide-angle image capturing unit, the image capturing unit 100n is an ultra-wide-angle image capturing unit, the image capturing unit 100p is a telephoto image capturing unit, the image capturing unit 100q is a telephoto image capturing unit, and the image capturing unit 100r is a ToF image capturing unit. In this embodiment, the image capturing units 100, 100i, 100j, 100k, 100m, 100n, 100p, and 100q have different fields of view, such that the electronic device 400 can have various magnification ratios so as to meet the requirement of optical zoom functionality. Moreover, each of the image capturing units 100 and 100i can be a telephoto image capturing unit having an optical path folding element configuration such as a reflective element configuration. Moreover, the optical path folding element configuration of each of the image capturing unit 100 and 100i can be similar to, for example, one of the structures shown in FIG. 39 to FIG. 57, which can be referred to foregoing descriptions corresponding to FIG. 39 to FIG. 57, and the details in this regard will not be provided again. In addition, the image capturing unit 100r can determine depth information of the imaged object. In this embodiment, the electronic device 400 includes multiple image capturing units 100, 100i, 100j, 100k, 100m, 100n, 100p, 100q and 100r, but the present disclosure is not limited to the number and arrangement of image capturing units. When a user captures images of an object, the light rays converge in the image capturing unit 100, 100i, 100j, 100k, 100m, 100n, 100p, 100q or 100r to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the photographing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-90 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the third lens element has negative refractive power, the object-side surface of the third lens element is convex in a paraxial region thereof, the image-side surface of the third lens element is concave in a paraxial region thereof, and at least one of the object-side surface and the image-side surface of at least one lens element of the photographing lens assembly is aspheric;

wherein an axial distance between the object-side surface of one lens element closest to the object side and the image-side surface of another lens element closest to the image side in the photographing lens assembly with an infinite object distance is TDL, an axial distance between the image-side surface of the another lens element closest to the image side and an image surface in the photographing lens assembly with the infinite object distance is BLL, an axial distance between the object-side surface of the first lens element and the image surface is TL, a maximum image height of the photographing lens assembly is ImgH, a central thickness of the third lens element is CT3, an axial distance between the third lens element and the fourth lens element is T34, an axial distance between the object-side surface of the first lens element and the image-side surface of the second lens element is Dr1r4, an axial distance between the object-side surface of the third lens element and the image-side surface of the another lens element closest to the image side is Dr5rL, a maximum effective radius of the object-side surface of the first lens element is Y1R1, a maximum effective radius of the image-side surface of the another lens element closest to the image side is YNR2, and the following conditions are satisfied:

$$0.15 < TDL/BLL < 0.70;$$

$$6.0 < TL/ImgH < 9.5;$$

$$0.25 < CT3/T34 < 2.0;$$

$$0.66 < Dr1r4/Dr5rL < 1.50; \text{ and}$$

$$1.0 < Y1R1/YNR2 < 2.0.$$

2. The photographing lens assembly of claim 1, wherein the second lens element has positive refractive power, a focal length of the first lens element is f1, a focal length of the second lens element is f2, and the following condition is satisfied:

$$0.3 < f1/f2 < 1.6.$$

3. The photographing lens assembly of claim 1, wherein the axial distance between the object-side surface of the first lens element and the image surface is TL, a focal length of the photographing lens assembly with the infinite object distance is fL, half of a maximum field of view of the photographing lens assembly with the infinite object distance is HFOVL, and the following conditions are satisfied:

$$1.15 < TL/fL < 1.5; \text{ and}$$

$$5.0 \ [deg.] < HFOVL < 20.0 \ [deg.].$$

4. The photographing lens assembly of claim 1, wherein a focal length of the first lens element is f1, a focal length of the third lens element is f3, a focal length of the fourth lens element is f4, a focal length of the fifth lens element is f5, and the following condition is satisfied:

$$0 < (|f1| + |f3|)/(|f4| + |f5|) < 0.55.$$

5. The photographing lens assembly of claim 1, wherein a curvature radius of the object-side surface of the first lens element is R1, a curvature radius of the object-side surface of the third lens element is R5, and the following condition is satisfied:

$$-0.23 < (R1 - R5)/(R1 + R5) < 0.5.$$

6. The photographing lens assembly of claim 1, wherein the first lens element is made of glass material, a curvature radius of the object-side surface of the third lens element is R5, a curvature radius of the image-side surface of the third lens element is R6, and the following condition is satisfied:

$$0.5 < R5/R6 < 2.3.$$

7. The photographing lens assembly of claim 1, wherein at least one of the second lens element through the fifth lens element is made of plastic material, an Abbe number of the second lens element is V2, an Abbe number of the fourth lens element is V4, and the following condition is satisfied:

$$1.3 < V2/V4 < 4.0.$$

8. The photographing lens assembly of claim 1, further comprising an aperture stop located between an imaged object and the second lens element, wherein an axial distance between the aperture stop and the image surface is SL, the axial distance between the object-side surface of the first lens element and the image surface is TL, and the following condition is satisfied:

$$0.88 < SL/TL < 1.05.$$

9. The photographing lens assembly of claim 1, wherein a displacement in parallel with an optical axis from an axial vertex of the object-side surface of the third lens element to a maximum effective radius position of the object-side surface of the third lens element is Sag3R1, a displacement in parallel with the optical axis from an axial vertex of the image-side surface of the third lens element to a maximum effective radius position of the image-side surface of the third lens element is Sag3R2, and the following condition is satisfied:

$$0.55 < |Sag3R1/Sag3R2| < 0.90.$$

10. The photographing lens assembly of claim 1, wherein the maximum effective radius of the object-side surface of the first lens element is Y1R1, the maximum effective radius of the image-side surface of the another lens element closest to the image side is YNR2, and the following condition is satisfied:

$$1.2 < Y1R1/YNR2 < 1.7.$$

11. The photographing lens assembly of claim 1, wherein the maximum image height of the photographing lens assembly is ImgH, the maximum effective radius of the object-side surface of the first lens element is Y1R1, and the following condition is satisfied:

$$0.7 < ImgH/Y1R1 < 1.3.$$

12. The photographing lens assembly of claim 1, further comprising a reflective element, wherein the reflective element is located between an image object and the image surface.

13. The photographing lens assembly of claim 12, wherein the reflective element is located at an object side of the object-side surface of the first lens element or an image side of the image-side surface of the another lens element closest to the image side.

14. An image capturing unit comprising:
the photographing lens assembly of claim 1; and
an image sensor, disposed on the image surface of the photographing lens assembly.

15. An electronic device comprising:
the image capturing unit of claim 14.

16. A photographing lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
wherein the first lens element has positive refractive power, the third lens element has negative refractive power, the object-side surface of the third lens element is convex in a paraxial region thereof, the image-side surface of the third lens element is concave in a paraxial region thereof, the object-side surface of the fourth lens element is concave in a paraxial region thereof, and the image-side surface of the fourth lens element is convex in a paraxial region thereof,
wherein an axial distance between the object-side surface of one lens element closest to the object side and the image-side surface of another lens element closest to the image side in the photographing lens assembly with an infinite object distance is TDL, an axial distance between the image-side surface of the another lens element closest to the image side and an image surface in the photographing lens assembly with the infinite object distance is BLL, an axial distance between the object-side surface of the first lens element and the image surface is TL, a maximum image height of the photographing lens assembly is ImgH, a focal length of the third lens element is f3, a curvature radius of the object-side surface of the third lens element is R5, a curvature radius of the object-side surface of the fifth lens element is R9, and the following conditions are satisfied:

$$0.15 < TDL/BLL < 0.70;$$

$$6.0 < TL/ImgH < 10.0;$$

$$-8.00 < f3/R5 < -1.50; \text{ and}$$

$$-10.0 < (R5 - R9)/(R5 + R9) < -0.50.$$

17. The photographing lens assembly of claim 16, wherein the second lens element has positive refractive power, a focal length of the second lens element is f2, the focal length of the third lens element is f3, and the following condition is satisfied:

$$-2.2 < f2/f3 < 0.$$

18. The photographing lens assembly of claim 16, wherein the image-side surface of the first lens element is concave in a paraxial region thereof, and the object-side surface of the second lens element is convex in a paraxial region thereof.

19. The photographing lens assembly of claim 16, wherein a focal length of the photographing lens assembly with the infinite object distance is fL, a composite focal length of the fourth lens element and the fifth lens element is f45, and the following condition is satisfied:

$$0.14 < fL/|f45| < 0.52.$$

20. The photographing lens assembly of claim 16, wherein the curvature radius of the object-side surface of the third lens element is R5, the curvature radius of the object-side surface of the fifth lens element is R9, and the following condition is satisfied:

$$-5.0 < (R5 - R9)/(R5 + R9) < -0.60.$$

21. The photographing lens assembly of claim 16, wherein a central thickness of the first lens element is CT1, a central thickness of the fourth lens element is CT4, a central thickness of the fifth lens element is CT5, and the following condition is satisfied:

$$1.0 < CT1/(CT4 + CT5) < 2.5.$$

22. The photographing lens assembly of claim 16, wherein an Abbe number of the first lens element is V1, an Abbe number of the second lens element is V2, and the following condition is satisfied:

$$0.5 < V1/V2 < 2.0.$$

23. The photographing lens assembly of claim 16, wherein a chief ray angle of a maximum field of view on the image surface of the photographing lens assembly with the infinite object distance is CRAL, and the following condition is satisfied:

$$1.0 \ [deg.] < CRAL < 20.0 [deg.].$$

24. The photographing lens assembly of claim 16, further comprising a reflective element, wherein the reflective element is located between the another lens element closest to the image side and the image surface.

25. A photographing lens assembly comprising two lens groups, the two lens groups being, in order from an object side to an image side along an optical path, a first lens group and a second lens group, the two lens groups comprising at least four lens elements, the first lens group comprising at least one lens element, the second lens group comprising at least one lens element, and each of the at least four lens elements having an object-side surface facing toward the object side and an image-side surface facing toward the image side;

wherein the photographing lens assembly has a first state corresponding to an infinite object distance and a second state corresponding to a short object distance; when an imaged object at infinity moves to be at a close distance, the photographing lens assembly performs a movement focus process to change the first state to the second state thereof; the second lens group moves towards the image side with respect to the first lens group along a direction in parallel with an optical axis during the movement focus process in which the first state is changed to the second state, and all lens elements of each of the first lens group and the second lens group have no relative movement with respect to one another during the movement focus process;

wherein a lens element of the second lens group closest to the object side has the image-side surface being concave in a paraxial region thereof;

wherein the photographing lens assembly further comprises a reflective element located between the imaged object and an image surface, and the reflective element has at least two reflective surfaces;

wherein an axial distance between the object-side surface of one lens element closest to the object side and the image-side surface of another lens element closest to the image side in the photographing lens assembly with the infinite object distance is TDL, an axial distance between the image-side surface of the another lens element closest to the image side and the image surface in the photographing lens assembly with the infinite object distance is BLL, a focal length of the photographing lens assembly with the infinite object distance is fL, a focal length of the photographing lens assembly with the short object distance is fS, and the following conditions are satisfied:

$$0.15 < TDL/BLL < 0.70; \ \text{and}$$

$$0.90 < fL/fS < 1.20.$$

26. The photographing lens assembly of claim 25, wherein the two lens groups comprise five lens elements, the five lens elements are, in order from the object side to the image side along the optical path, a first lens element, a second lens element, a third lens element, a fourth lens element and a fifth lens element, the first lens group comprises the first lens element and the second lens element, and the second lens group comprises the third lens element, the fourth lens element and the fifth lens element.

27. The photographing lens assembly of claim 25, wherein the focal length of the photographing lens assembly with the infinite object distance is fL, the focal length of the photographing lens assembly with the short object distance is fS, and the following condition is satisfied:

$$0.95 < fL/fS < 1.15.$$

28. The photographing lens assembly of claim 25, wherein the axial distance between the object-side surface of the one lens element closest to the object side and the image-side surface of the another lens element closest to the image side in the photographing lens assembly with the infinite object distance is TDL, an axial distance between the object-side surface of the one lens element closest to the object side and the image-side surface of the another lens element closest to the image side in the photographing lens assembly with the short object distance is TDS, and the following condition is satisfied:

$$0.90 < TDL/TDS < 1.00.$$

29. The photographing lens assembly of claim 25, wherein a focal length of the first lens group is fG1, a focal length of the second lens group is fG2, and the following condition is satisfied:

$$-1.00 < fG1/fG2 < -0.40.$$

30. The photographing lens assembly of claim 25, wherein the focal length of the photographing lens assembly with the infinite object distance is fL, the focal length of the photographing lens assembly with the short object distance is fS, the axial distance between the image-side surface of the another lens element closest to the image side and the image surface in the photographing lens assembly with the infinite object distance is BLL, an axial distance between the image-side surface of the another lens element closest to the image side and the image surface in the photographing lens assembly with the short object distance is BLS, and the following conditions are satisfied:

$$0.90 < fL/BLL < 130; \text{ and}$$

$$0.90 < fS/BLS < 1.30.$$

31. The photographing lens assembly of claim 25, wherein an f-number of the photographing lens assembly with the infinite object distance is FnoL, an f-number of the photographing lens assembly with the short object distance is FnoS, and the following condition is satisfied:

$$0.90 < FnoL/FnoS < 1.10.$$

32. The photographing lens assembly of claim 25, wherein the reflective element is located between the another lens element closest to the image side and the image surface.

33. The photographing lens assembly of claim 32, wherein the reflective element has at least three reflective surfaces.

* * * * *